(12) United States Patent
Feng

(10) Patent No.: US 10,445,476 B2
(45) Date of Patent: Oct. 15, 2019

(54) LICENSE SHARING METHOD AND APPARATUS

(71) Applicant: Huawei Technologies Co., Ltd., Shenzhen (CN)

(72) Inventor: Aijuan Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 15/435,511

(22) Filed: Feb. 17, 2017

(65) Prior Publication Data
US 2017/0161470 A1    Jun. 8, 2017

Related U.S. Application Data

(63) Continuation of application No. PCT/CN2015/078779, filed on May 12, 2015.

(30) Foreign Application Priority Data

Aug. 19, 2014  (CN) .......................... 2014 1 0409013

(51) Int. Cl.
*H04L 29/06*  (2006.01)
*G06F 21/10*  (2013.01)

(52) U.S. Cl.
CPC .................................. *G06F 21/105* (2013.01)

(58) Field of Classification Search
CPC .......... G06F 21/105; G06F 21/10; G06F 21/45
See application file for complete search history.

(56) References Cited

U.S. PATENT DOCUMENTS

| 5,260,999 A | 11/1993 | Wyman |
| 7,831,517 B1 * | 11/2010 | Vijay ..................... G06F 21/121 |
| | | 705/59 |

(Continued)

FOREIGN PATENT DOCUMENTS

| CN | 101002421 A | 7/2007 |
| CN | 101119317 A | 2/2008 |

(Continued)

OTHER PUBLICATIONS

Machine Translation and Abstract of Chinese Publication No. CN101119317, Feb. 6, 2008, 22 pages.

(Continued)

*Primary Examiner* — Taghi T Arani
*Assistant Examiner* — Lin Chang
(74) *Attorney, Agent, or Firm* — Conley Rose, P.C.

(57) ABSTRACT

A license sharing method and apparatus are disclosed. The method includes receiving, by a license server, a first registration request sent by a first apparatus, where the first registration request includes an identity of the first apparatus, attribute information of a license used by the first apparatus, and information of a manufacturer of the first apparatus; obtaining, by the license server according to the attribute information of the license, license resources to be used by the first apparatus, where the license resources belong to one license in a license library; establishing, by the license server, an association relationship between the identity of the first apparatus and the license; and sending, by the license server, a first registration response to the first apparatus.

20 Claims, 34 Drawing Sheets

(56) References Cited

U.S. PATENT DOCUMENTS

| | | | |
|---|---|---|---|
| 8,006,085 B2* | 8/2011 | Lee | G06F 21/10 713/158 |
| 8,180,886 B2* | 5/2012 | Overcash | H04L 63/1425 709/224 |
| 8,650,296 B1* | 2/2014 | Herington | G06F 9/5077 709/226 |
| 8,898,784 B1* | 11/2014 | Alexander | H04L 63/145 709/232 |
| 9,301,135 B2* | 3/2016 | Sato | H04W 4/70 |
| 2002/0087882 A1* | 7/2002 | Schneier | G06F 21/552 726/23 |
| 2005/0039047 A1* | 2/2005 | Raikar | H04L 63/1408 726/4 |
| 2005/0102240 A1* | 5/2005 | Misra | G06Q 30/06 705/59 |
| 2006/0069594 A1* | 3/2006 | Yamasaki | G06F 9/5027 709/226 |
| 2006/0294017 A1* | 12/2006 | Kim | G06F 21/10 705/59 |
| 2007/0219917 A1 | 9/2007 | Liu et al. | |
| 2009/0327971 A1* | 12/2009 | Shostack | G06F 21/577 715/853 |
| 2012/0185593 A1* | 7/2012 | Zhu | G06F 21/105 709/224 |
| 2013/0145030 A1* | 6/2013 | Ohira | H04M 1/72533 709/225 |
| 2014/0143863 A1* | 5/2014 | Deb | G06F 21/552 726/22 |
| 2015/0012863 A1* | 1/2015 | Yoshida | G08C 17/02 715/771 |
| 2015/0095332 A1* | 4/2015 | Beisiegel | H04Q 9/00 707/737 |
| 2015/0295786 A1* | 10/2015 | Levesque | H04L 63/20 455/410 |
| 2015/0319185 A1* | 11/2015 | Kirti | H04L 63/1416 726/23 |
| 2017/0222889 A1* | 8/2017 | Zong | H04L 41/5051 |

FOREIGN PATENT DOCUMENTS

| | | | | |
|---|---|---|---|---|
| CN | 101170446 A | | 4/2008 | |
| CN | 101170717 A | | 4/2008 | |
| CN | 101340278 A | | 1/2009 | |
| CN | 101430746 A | | 5/2009 | |
| CN | 102763397 A | | 10/2012 | |
| CN | 103345598 | * | 10/2013 | G06F 21/30 |
| CN | 103838987 A | | 6/2014 | |
| WO | WO-2008043311 A1 | * | 4/2008 | G06F 21/10 |

OTHER PUBLICATIONS

Machine Translation and Abstract of Chinese Publication No. CN101170446, Apr. 30, 2008, 55 pages.

Machine Translation and Abstract of Chinese Publication No. CN101170717, Apr. 30, 2008, 15 pages.

Machine Translation and Abstract of Chinese Publication No. CN103838987, Jun. 4, 2014, 18 pages.

Foreign Communication From a Counterpart Application, Chinese Application No. 201410409013.4, Chinese Office Action dated Feb. 28, 2018, 9 pages.

Foreign Communication From a Counterpart Application, PCT Application No. PCT/CN2015/078779, English Translation of International Search Report dated Aug. 12, 2015, 2 pages.

Foreign Communication From a Counterpart Application, PCT Application No. PCT/CN2015/078779, English Translation of Written Opinion dated Aug. 12, 2015, 6 pages.

* cited by examiner

```
┌─────────────────────────────────────────────┐
│ A license server periodically sends a third │
│ request message to a first apparatus and a  │
│ second apparatus separately, where the      │
│ third request message sent to the first     │──── S1201
│ apparatus is used to obtain license         │
│ resources of each statistical type that are │
│ actually used by the first apparatus, and   │
│ the third request message sent to the       │
│ second apparatus is used to obtain license  │
│ resources of each statistical type that are │
│ actually used by the second apparatus       │
└─────────────────────────────────────────────┘
                      │
                      ▼
┌─────────────────────────────────────────────┐
│ The license server receives the license     │
│ resources of each statistical type that are │
│ actually used by the first apparatus and    │
│ sent by the first apparatus; the license    │──── S1202
│ server receives the license resources of    │
│ each statistical type that are actually     │
│ used by the second apparatus and sent by    │
│ the second apparatus                        │
└─────────────────────────────────────────────┘
                      │
                      ▼
┌─────────────────────────────────────────────┐
│ The license server summates the license     │
│ resources of each statistical type that are │
│ actually used by the first apparatus and    │
│ the license resources of each statistical   │
│ type that are actually used by the second   │──── S1203
│ apparatus, and obtains resources already    │
│ used in the license resources of each       │
│ statistical type in a license               │
└─────────────────────────────────────────────┘
                      │
                      ▼
┌─────────────────────────────────────────────┐
│ The license server determines whether a     │
│ value of the resources already used in the  │
│ license resources of each statistical type  │
│ in the license is greater than or equal to  │
│ a corresponding alarm threshold, where the  │──── S1204
│ license resources of each statistical type  │
│ correspond to an alarm threshold, and the   │
│ license resources of each statistical type  │
│ correspond to a preset peak condition       │
└─────────────────────────────────────────────┘
                      │
                      ▼
                    TO
                  FIG. 18B
```

FIG. 18A

CONT. FROM FIG. 26A

2108. Determine whether a value of the resources already used in the license resources of each statistical type in the license is greater than or equal to a corresponding alarm threshold, where the license resources of each statistical type correspond to an alarm threshold, and the license resources of each statistical type correspond to a preset peak condition 2109. If the license server determines that a value of resources already used in license resources of a first statistical type in the license is greater than or equal to an alarm threshold corresponding to the license resources of the first statistical type, the license server determines whether the value of the resources already used in the license resources of the first statistical type exceeds a preset peak condition corresponding to the license resources of the first statistical type; and if yes, perform step S2110, or if not, perform step 2113

TO FIG. 26C

CONT. FROM FIG. 26A

TO FIG. 26C

CONT. FROM FIG. 26A

LICENSE SHARING METHOD AND APPARATUS

CROSS-REFERENCE TO RELATED APPLICATIONS

This application is a continuation of International Application No. PCT/CN2015/078779, filed on May 12, 2015, which claims priority to Chinese Patent Application No. 201410409013.4, filed on Aug. 19, 2014, both of which are hereby incorporated by reference in their entireties.

TECHNICAL FIELD

Embodiments of the present disclosure relate to computer technologies, and in particular, to a license sharing method and apparatus.

BACKGROUND

A license is a manner of selling software. After a customer buys a license from an equipment vendor, the customer is correspondingly authorized to use the software according to a commitment of the equipment vendor. In a conventional telecommunications network, generally, a single network element obtains license resources in an exclusive manner, and the bought license resources are generally more than what is required in a normal usage scenario, but an excessive part cannot be shared among network elements of a same type. When a site needs to be created or expanded, a license needs to be applied for again, and a whole license application period is relatively long.

Currently, to reduce device costs in a system, network devices are generally applied to network functions virtualization (NFV), that is, network elements are based on software, and applications provided by different equipment vendors are all deployed on a cloud-based virtual appliance in a form of software. In NFV, a network element is a virtualized network function (VNF) instance. In a network of an operator, it is required that, when user load decreases somewhere but increases elsewhere, VNF instances of a same type and a same manufacturer should be able to share one license, so that license resources can be fully used. However, the foregoing manner of using license resources exclusively by a single network element cannot meet this requirement.

SUMMARY

Embodiments of the present disclosure provide a license sharing method and apparatus, which are used to solve a technical problem in the prior art that exclusive use of license resources by a single network element causes low resource utilization.

According to a first aspect, an embodiment of the present disclosure provides a license sharing method, including receiving, by a license server, a first registration request sent by a first apparatus, where the first registration request includes an identity of the first apparatus, attribute information of a license used by the first apparatus, and information of a manufacturer of the first apparatus, where the manufacturer of the first apparatus is the same as a manufacturer of the license server; obtaining, by the license server according to the attribute information of the license, license resources to be used by the first apparatus, where the license resources belong to one license in a license library; establishing, by the license server, an association relationship between the identity of the first apparatus and the license; and sending, by the license server, a first registration response to the first apparatus, where the first registration response carries indication information, the indication information is used to indicate that the first apparatus shares the license with a second apparatus, the second apparatus is provided by the manufacturer of the first apparatus, and a type of the second apparatus is the same as a type of the first apparatus.

According to a second aspect, an embodiment of the present disclosure provides a license sharing method, including sending, by a first apparatus, a first registration request to a license server, where the first registration request includes an identity of the first apparatus, attribute information of a license used by the first apparatus, and information of a manufacturer of the first apparatus, where the manufacturer of the first apparatus is the same as a manufacturer of the license server; and receiving, by the first apparatus, a first registration response sent by the license server, where the first registration response carries indication information, the indication information is used to indicate that the first apparatus shares one license with a second apparatus, the second apparatus is provided by the manufacturer of the first apparatus, and a type of the second apparatus is the same as a type of the first apparatus.

According to a third aspect, an embodiment of the present disclosure provides a license server, including a receiving module configured to receive a first registration request sent by a first apparatus, where the first registration request includes an identity of the first apparatus, attribute information of a license used by the first apparatus, and information of a manufacturer of the first apparatus, where the manufacturer of the first apparatus is the same as a manufacturer of the license server; a first obtaining module configured to obtain, according to the attribute information of the license that is received by the receiving module, license resources to be used by the first apparatus, where the license resources belong to one license in a license library; a processing module configured to establish an association relationship between the identity of the first apparatus and the license according to the license resources to be used by the first apparatus that are obtained by the first obtaining module and the identity of the first apparatus received by the receiving module; and a sending module configured to send a first registration response to the first apparatus, where the first registration response carries indication information, the indication information is used to indicate that the first apparatus shares the license with a second apparatus, the second apparatus is provided by the manufacturer of the first apparatus, and a type of the second apparatus is the same as a type of the first apparatus.

According to a fourth aspect, an embodiment of the present disclosure provides a first apparatus, including a sending module configured to send a first registration request to a license license server, where the first registration request includes an identity of the first apparatus, attribute information of a license used by the first apparatus, and information of a manufacturer of the first apparatus, where the manufacturer of the first apparatus is the same as a manufacturer of the license server; and a receiving module configured to receive a first registration response sent by the license server, where the first registration response carries indication information, the indication information is used to indicate that the first apparatus shares one license with a second apparatus, the second apparatus is provided by the manufacturer of the first apparatus, and a type of the second apparatus is the same as a type of the first apparatus.

According to a license sharing method and apparatus provided by embodiments of the present disclosure, a license server receives a first registration request sent by a first apparatus, and obtains, according to attribute information of a license in the first registration request, license resources to be used by the first apparatus, where the license resources belong to one license in a license library; afterward, the license server establishes an association relationship between an identity of the first apparatus and the license, and then sends, to the first apparatus, a first registration response carrying indication information, to indicate to the first apparatus that the first apparatus may share the license with a second apparatus. In a method provided by an embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

FIG. 18A and FIG. 18B are a schematic flowchart of a tenth embodiment of a license sharing method according to an embodiment of the present disclosure;

FIG. 26A, FIG. 26B, and FIG. 26C are a signaling flowchart of an eighteenth embodiment of a license sharing method according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
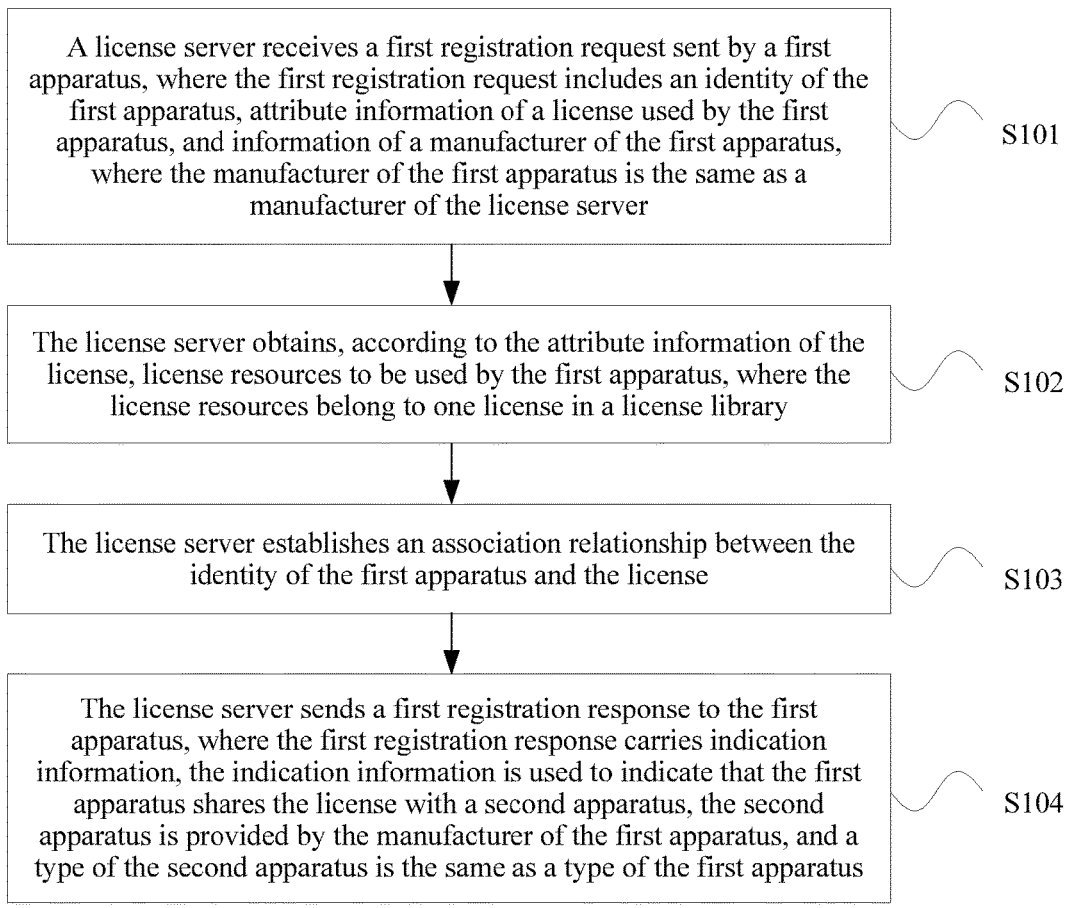
FIG. 1 is a schematic flowchart of a first embodiment of a license sharing method according to an embodiment of the present disclosure.

FIG. 1 is a schematic flowchart of a first embodiment of a license sharing method according to an embodiment of the present disclosure. The method is performed by a license server. The license server may directly interwork with a first apparatus, or may interwork with a first apparatus using a management apparatus. The first apparatus herein may be a physical network element, for example, may be a physical server. The first apparatus may also be a virtual network element. The virtual network element may be a VNF instance. The VNF instance herein runs on universal hardware in a form of software to implement a network function. For example, a VNF instance having functions of a mobility management entity (MME) is deployed in a form of software on one or more virtual machines (VM) and runs to implement the functions of the.

When the first apparatus is a physical network element, the management apparatus corresponding to the first apparatus is an element management system (EMS). The license server may be directly connected to the EMS, and the first apparatus may also be connected to the EMS (referring to FIG. 2). The license server may also be embedded in the EMS, and the first apparatus is also connected to the EMS (referring to FIG. 3).

Figure 7:
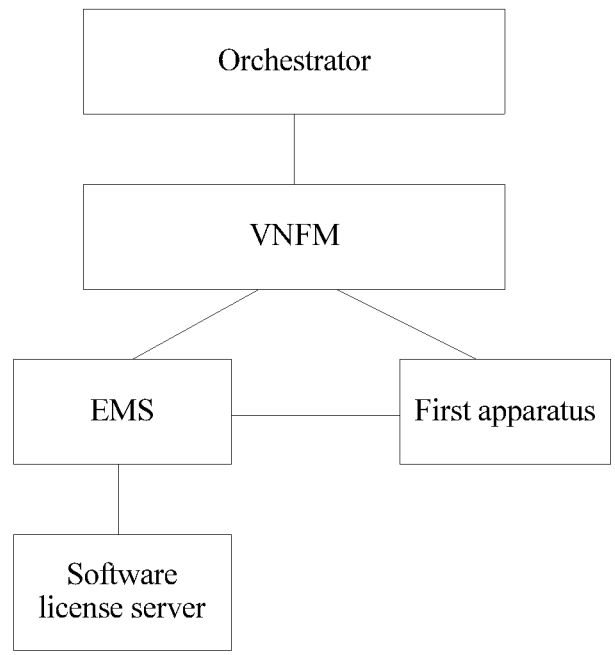
FIG. 7 is a sixth schematic diagram of a network topology of a license server and a first apparatus according to an embodiment of the present disclosure.
Figure 8:
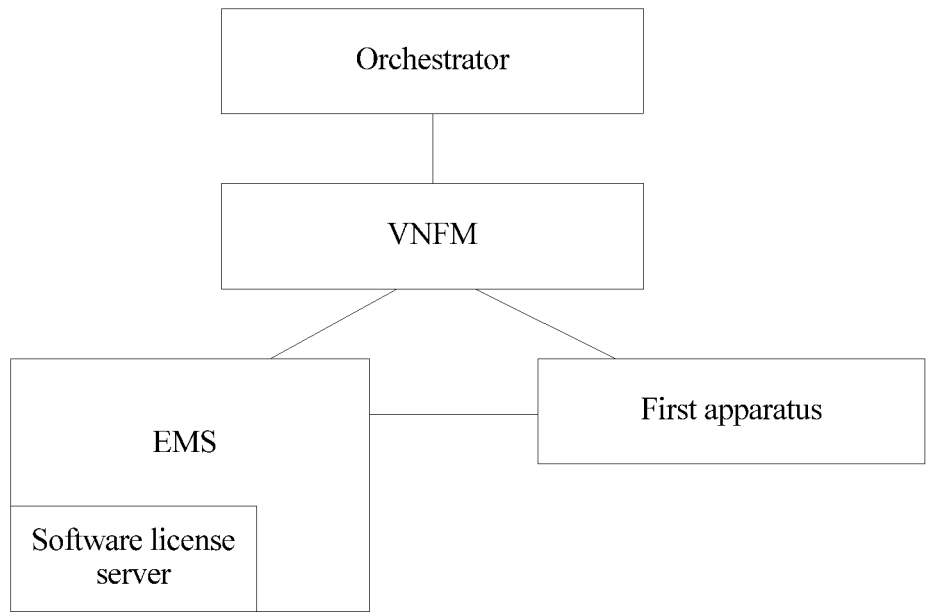
FIG. 8 is a seventh schematic diagram of a network topology of a license server and a first apparatus according to an embodiment of the present disclosure.

When the first apparatus is a virtual network element, the management apparatus corresponding to the first apparatus may be an orchestrator and a VNF manager (VNFM), or may be an orchestrator and a VNFM and an EMS. Optionally, the license server may be directly connected to the orchestrator, the VNFM is directly connected to the orchestrator, and the first apparatus (for example, a VNF instance) is directly connected to the VNFM (referring to a network architecture shown in FIG. 4). Optionally, the license server may also be connected to the orchestrator using the VNFM, and the first apparatus may be directly connected to the VNFM (referring to a network architecture shown in FIG. 5). Optionally, the license server may also be embedded in the VNFM, and connected to the orchestrator using the VNFM, and the first apparatus is directly connected to the VNFM (referring to a network architecture shown in FIG. 6). Optionally, the license server may also be connected to the orchestrator using the EMS and the VNFM, and the first apparatus is directly connected to the VNFM and the EMS separately (referring to a network architecture shown in FIG. 7). Optionally, the license server may also be embedded in the EMS, and connected to the orchestrator using the VNFM, and the first apparatus is directly connected to the VNFM and the EMS separately (referring to a network architecture shown in FIG. 8).

As shown in FIG. 1, FIG. 1 is a flowchart of a license sharing method according to an embodiment of the present disclosure. The method includes the following steps.

S101. A license server receives a first registration request sent by a first apparatus, where the first registration request includes an identity of the first apparatus, attribute information of a license used by the first apparatus, and information of a manufacturer of the first apparatus, where the manufacturer of the first apparatus is the same as a manufacturer of the license server.

In the embodiment of the present disclosure, the information of the manufacturer may be specifically a name of the manufacturer.

Regardless of which manner in FIG. 2 to FIG. 8 is used to connect the license server to the management apparatus, the license server can receive the first registration request sent by the first apparatus, and each first registration request includes the identity of the first apparatus that sends the first registration request, the attribute information of the license used by the first apparatus, and the information of the manufacturer of the first apparatus. The first apparatus is a physical network element or a virtual network element.

Figure 2:
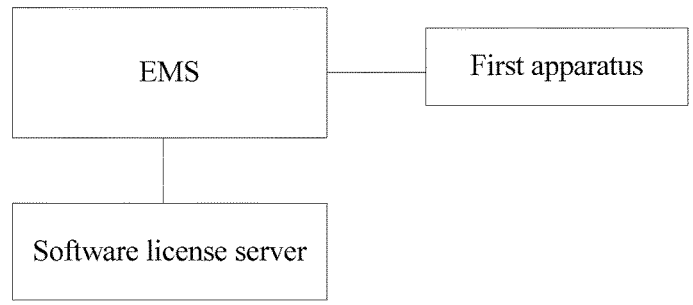
FIG. 2 is a first schematic diagram of a network topology of a license server and a first apparatus according to an embodiment of the present disclosure.
Figure 3:
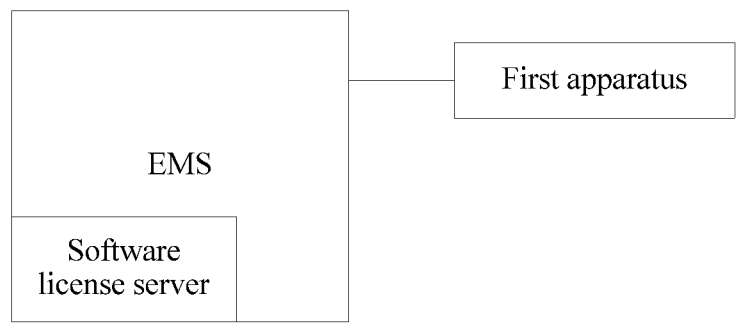
FIG. 3 is a second schematic diagram of a network topology of a license server and a first apparatus according to an embodiment of the present disclosure.

Optionally, if the license server is connected to the management apparatus in the manner in FIG. 2, the first apparatus sends the first registration request to the license server using the EMS. If the license server is connected to the management apparatus in the manner in FIG. 3, the first apparatus may send the first registration request to the license server using the EMS, or may directly send the first registration request to the license server. If the license server is connected to the management apparatus in the manner in FIG. 4, the first apparatus sends the first registration request to the VNFM in the management apparatus, the VNFM sends the first registration request to the orchestrator in the management apparatus, and the orchestrator forwards the first registration request to the license server. If the license server is connected to the management apparatus in the manner in FIG. 5 or FIG. 6, the first apparatus sends the first registration request to the VNFM in the management apparatus, and the VNFM directly forwards the first registration request to the license server. If the license server is connected to the management apparatus in the manner in FIG. 7 or FIG. 8, the first apparatus sends the first registration request to the VNFM in the management apparatus, the VNFM directly forwards the first registration request to the EMS in the management apparatus, and the EMS directly forwards the first registration request to the license server.

It should be noted that, a quantity of first apparatuses is not limited in the embodiment and subsequent embodiments of the present disclosure. In the embodiment of the present disclosure, there may be only one first apparatus, or there may be multiple first apparatuses. Optionally, the first apparatus may directly send the first registration request to the license server, or may indirectly send the first registration request to the license server using the management apparatus. Optionally, the attribute information of the license may be a name of the first apparatus using the license, or may be a version number of the license. The name of the first apparatus may be the identity of the first apparatus, and the identity of the first apparatus is used to identify the first apparatus.

It should be noted that, the manufacturer of the first apparatus sending the first registration request to the license server is the same as the manufacturer of the license server. That is, the first apparatus needs to send the first registration request to the license server manufactured by the manufacturer of the first apparatus.

S102. The license server obtains, according to the attribute information of the license, license resources to be used by the first apparatus, where the license resources belong to one license in a license library.

After a customer buying the first apparatus buys the license from the manufacturer of the first apparatus, the manufacturer of the first apparatus needs to provide a corresponding license file and a certificate for the customer. Afterward, the customer may register, using an open interface of the license server, the bought license on the license server. licenses registered on the license server may constitute a license library. Optionally, the license library may be stored on the license server, or may be stored on another server, as long as the another server can interwork with the license server. Optionally, the customer buying the first apparatus may be an enterprise user or an individual user. The license file includes at least one piece of basic information that can identify a product or an identity of the customer, such as a name of the license, the version number of the license, or a name of the customer. The license library may include at least one license. Each license may include at least one license resource. The license resource may be a license resource of a statistical type, or may be a license resource of a non-statistical type. The license resource of the non-statistical type may include a one-time switch or a relatively fixed resource item, for example, may be a quantity of relay stations in a network. The license resource of the statistical type is generally a time-varying resource related to a current service processing capability, for example, may be a quantity of calls per second in the network. Optionally, for example, a service node may be allowed to provide a call service for a user if the one-time switch is in an ON state. The relatively fixed resource item, for example, may be a relatively fixed quantity of relay stations. For example, the relatively fixed resource item may be 100, that is, the license server may configure 100 relay stations for calls of users. However, when a 101st relay station needs to be configured for a call of a certain user, configuration fails, and the call is interrupted.

When the license server receives the first registration request, the license server searches the license library according to the attribute information of the license used by the first apparatus, to obtain the license resources to be used by the first apparatus. The license resources belong to one license in the license library. For example, the license server may search the license library according to the version number of the license used by the first apparatus, to find license resources in the license that matches the version number of the license, and all licenses and license resources have their own identities. In an implementation manner, the name of the license may be used as an identity of the license. For example, relationships between version numbers of licenses, names of licenses, and license resources may be shown in Table 1. In the example, resource A and resource B belong to a license 1.

TABLE 1

| Version Number of a license | license in the license Library | license Resource in the license Library |
|---|---|---|
| 1.0 | license 1 | Resource A |
| 1.2 | | Resource B |
| ... | license 2 | ... |
| X.X | | Resource X |

For example, if the version number of the license used by the first apparatus is 1.2, the license server may determine, according to the version number, that the license matching the version number of the license is the license 1, and then further determine, according to the version number of the license, that a license resource to be used by the first apparatus is resource B in the license 1.

It should be noted that, the version number (1.0, 1.2, or the like) of the license in Table 1 is only a simple example. A form of the version number of the license is not limited in the embodiment of the present disclosure.

S103. The license server establishes an association relationship between the identity of the first apparatus and the license.

The license server establishes the association relationship between the identity of the first apparatus and the license, for indicating that a certain license resource in the license may be used by the first apparatus. Step S103 is that the license server establishes an association relationship between the identity of the first apparatus and the identity of the license (for example, the name of the license). It should be noted that, the license may include multiple license resources, and first apparatuses having different identities may use different license resources. However, because the license resources belong to the same license, this is equivalent to sharing the license by the first apparatuses having different identities. The association relationship may be shown in Table 2. The first apparatus in Table 2 may use license resources in the license 1.

TABLE 2

| Identity of the First Apparatus | license in the license Library |
|---|---|
| 1# | license 1 |
| 2# | |
| ... | |
| N# | |

It should be noted that, the identity (1#, 2#, or the like) of the first apparatus in Table 2 is only a simple example. A form of the identity of the first apparatus is not limited in the embodiment of the present disclosure.

S104. The license server sends a first registration response to the first apparatus, where the first registration response carries indication information, the indication information is used to indicate that the first apparatus shares the license with a second apparatus, the second apparatus is provided by the manufacturer of the first apparatus, and a type of the second apparatus is the same as a type of the first apparatus.

Optionally, in the embodiment and subsequent embodiments of the present disclosure, that the first apparatus shares the license with a second apparatus means that the first apparatus uses the license used by the second apparatus. After the license server establishes the association relationship between the identity of the first apparatus and the license, the license server sends the first registration response carrying the indication information to the first apparatus. The indication information is used to indicate to the first apparatus that the first apparatus may share the license with the second apparatus. Herein, a manufacturer of the second apparatus is the same as the manufacturer of the first apparatus, and the type of the second apparatus is also the same as the type of the first apparatus. It should be noted that, that the type of the second apparatus is the same as the type of the first apparatus may be that a network function of the second apparatus is the same as a network function of the first apparatus. In addition, in the embodiment, the first apparatus may share one license with the second apparatus. Herein, a sharing time point is not limited, that is, the first apparatus and the second apparatus may share one license at a same time point, or may share one license at different time points.

In the prior art, a network element exclusively uses one license, but license resources that are bought (namely, license resources in the license) are generally more than license resources that actually need to be used. Therefore, when a single network element exclusively uses some license resources in the license, excessive license resources cannot be shared among network elements of a same type. However, in the technical solution provided by the present disclosure, a license to be used by network elements of a same type is registered on a license server, and the network elements of the same type are also registered on the license server. The license server performs unified management, and establishes an association relationship between multiple network elements and the license to indicate that multiple network elements, registered on the server, of the same type and a same manufacturer can all use license resources in the license. Optionally, when multiple network elements need to use the license, the license server allocates corresponding license resources to each network element according to a requirement, or each network element may apply for license resources required by the network element from the license server. In this way, license resources in the same license may be shared by multiple network elements, and maximum utilization of the resources is implemented.

In the license sharing method provided by the embodiment of the present disclosure, a license server receives a first registration request sent by a first apparatus, and obtains, according to attribute information of a license in the first registration request, license resources to be used by the first apparatus, where the license resources belong to one license in a license library; afterward, the license server establishes an association relationship between an identity of the first apparatus and the license, and then sends, to the first apparatus, a first registration response carrying indication information, to indicate to the first apparatus that the first apparatus may share the license with a second apparatus. In the method provided by the embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

On a basis of the embodiment shown in FIG. 1, in a first possible implementation manner of the embodiment of the present disclosure, the embodiment relates to a specific process of direct information interaction between the first apparatus and the license server. An address of the license server is preset on the first apparatus. The foregoing step S101 includes the license server receives the first registration request sent by the first apparatus according to the address of the license server.

If the first apparatus needs to interact with the license server, the first apparatus needs to know the address of the license server. Optionally, the address of the license server may be an Internet Protocol (IP) address or a domain name of the license server, or the like. The first apparatus may obtain the address of the license server in any one of the following manners.

Manner 1: The first apparatus may obtain the address of the license server from the management apparatus in advance.

Manner 2: The management apparatus or another network entity actively sends the address of the license server to the first apparatus.

After the first apparatus learns the address of the license server, the first apparatus sends the first registration request to the license server. The first registration request further includes information of the customer using the first apparatus, in addition to the identity of the first apparatus, the attribute information of the license used by the first apparatus, and the information of the manufacturer of the first apparatus.

Optionally, the information of the customer using the first apparatus may be the name of the customer using the first apparatus.

After the license server receives the first registration request sent by the first apparatus, the license server needs to perform authentication on the first apparatus according to the information of the manufacturer of the first apparatus and the information of the customer using the first apparatus.

Optionally, the authentication process may include the license server determines, according to the information of the manufacturer of the first apparatus and information of the manufacturer of the license server, whether the manufacturer of the first apparatus is the same as the manufacturer of the license server. If the manufacturer of the first apparatus is the same as the manufacturer of the license server, the license server determines, according to the information of the customer using the first apparatus, whether the customer has bought the license. If the customer has bought the license, the license server determines that the first apparatus is authenticated successfully. After the license server determines that the first apparatus is authenticated successfully, the license server obtains, according to the attribute information of the license used by the first apparatus, the license resources to be used by the first apparatus. If the manufacturer of the first apparatus is different from the manufacturer of the license server, or if the customer has not bought the license, the license server determines that the first apparatus fails to be authenticated.

Afterward, the license server establishes the association relationship between the identity of the first apparatus and the license, and sends, to the first apparatus, the first registration response carrying the indication information, to indicate to the first apparatus that the first apparatus may share the license with the second apparatus.

In the license sharing method provided by the embodiment of the present disclosure, a license server receives a first registration request sent by a first apparatus according to an address of the license server, and after authenticating the first apparatus successfully according to information of a manufacturer of the first apparatus and information of a customer using the first apparatus that are in the first registration request, obtains, according to attribute information of a license in the first registration request, license resources to be used by the first apparatus, where the license resources belong to one license in a license library; afterward, the license server establishes an association relationship between an identity of the first apparatus and the license. In addition, the license server sends, to the first apparatus, a first registration response carrying indication information, to indicate to the first apparatus that the first apparatus may share the license with a second apparatus. In the method provided by the embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

On a basis of the embodiment shown in FIG. 1, in a second possible implementation manner of the embodiment of the present disclosure, the embodiment relates to a specific process in which the first apparatus sends the first registration request to the license server using the management apparatus. Further, the first registration request may include an address of the first apparatus. The foregoing step S101 may include the license server receives the first registration request sent by the first apparatus using the management apparatus. The foregoing step S104 may include the license server sends the first registration response to the first apparatus using the management apparatus. The license server sends the first registration response to the management apparatus, and the management apparatus sends the first registration response to the first apparatus according to the address of the first apparatus.

Optionally, the information of the manufacturer of the license server is pre-registered on the management apparatus. After the management apparatus receives the first registration request sent by the first apparatus, the management apparatus learns the information of the manufacturer of the first apparatus according to the received first registration request, or the management apparatus learns the information of the manufacturer of the first apparatus according to a prestored correspondence between the identity of the first apparatus and the information of the manufacturer of the first apparatus, and forwards the first registration request to the license server manufactured by the manufacturer of the first apparatus (because information of manufacturers of multiple license servers is pre-registered on the management apparatus, after the management apparatus learns the manufacturer of the first apparatus, the management apparatus can accurately forward the first registration request to the license server manufactured by the manufacturer of the first apparatus). For example, if there are multiple first apparatuses, and all the first apparatuses are manufactured by manufacturer A, after the management apparatus receives the first registration request sent by the first apparatus, the management apparatus determines, according to manufacturers (manufacturers include A, B, and C) indicated by the pre-registered information of the manufacturers of the license servers and according to the information of the manufacturer of the first apparatus and prestored information of the manufacturers of the license servers, a license server manufactured by manufacturer A, and then sends the first registration request to the license server manufactured by manufacturer A.

Correspondingly, after the license server establishes the association relationship between the identity of the first apparatus and the license, the license server may send the first registration response to the first apparatus using the management apparatus. After receiving the first registration response, the first apparatus can learn, according to the indication information carried in the first registration response, that the first apparatus may share the license with the second apparatus.

The first registration response sent by the license server to the first apparatus may further carry the address of the license server. After receiving the first registration response, the first apparatus records the address of the license server that is carried in the first registration response. In this way, the first apparatus may directly interact with the license server conveniently subsequently.

Figure 9:
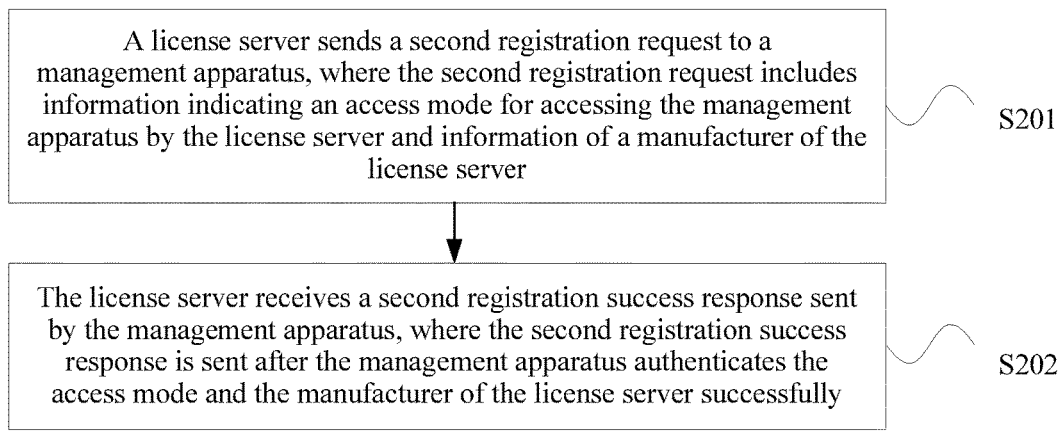
FIG. 9 is a schematic flowchart of a second embodiment of a license sharing method according to an embodiment of the present disclosure.

FIG. 9 is a schematic flowchart of a second embodiment of a license sharing method according to an embodiment of the present disclosure. The embodiment of the present disclosure relates to a specific process in which the license server registers with the management apparatus so that the management apparatus records information of the manufacturer of the license server. Optionally, the method shown in FIG. 9 may be performed before the foregoing step S101.

The method shown in FIG. 9 includes the following steps.

S201. The license server sends a second registration request to the management apparatus, where the second registration request includes information indicating an access mode for accessing the management apparatus by the license server and information of the manufacturer of the license server.

After a license server of each manufacturer is deployed in a network completely, some necessary information of the license server needs to be registered on the management apparatus. Therefore, the license server sends a second registration request to the management apparatus. The second registration request carries information indicating an access mode for accessing the management apparatus by the license server and information of the manufacturer of the license server. Optionally, the access mode for accessing the management apparatus by the license server may be access by the license server using domain name information of the management apparatus, or access using an IP address of the management apparatus, or the like.

S202. The license server receives a second registration success response sent by the management apparatus, where the second registration success response is sent after the management apparatus authenticates the access mode and the manufacturer of the license server successfully.

After receiving the second registration request, the management apparatus performs authentication on the license server according to the access mode for accessing the management apparatus by the license server and the manufacturer of the license server.

Optionally, the management apparatus may perform authentication on the license server in the following manner.

The management apparatus determines whether the manufacturer of the license server is the same as a manufacturer of the license bought by the customer (actually, still determining whether the manufacturer of the license server is the same as the manufacturer of the first apparatus), and if yes, continues to determine whether the management apparatus can be accessed by the license server in the access mode, and if the management apparatus can be accessed, determines that the license server is authenticated successfully. After authenticating the license server successfully, the management apparatus sends a second registration success response to the license server. It should be noted that, if the manufacturer of the license server is different from the manufacturer of the license bought by the customer, or the manufacturer of the license server is the same as the manufacturer of the license bought by the customer but the management apparatus cannot be accessed in the access mode for accessing the management apparatus by the license server, the management apparatus determines that the license server fails to be authenticated.

Optionally, that the management apparatus determines, according to the access mode of the license server, whether the license server can access the management apparatus, may be, if the license server accesses the management apparatus using an IP address, the management apparatus determines whether the IP address is the IP address of the management apparatus, and if yes, it indicates that the management apparatus can be accessed, or if not, the management apparatus cannot be accessed, and authentication fails. If the license server accesses the management apparatus using a domain name, the management apparatus may resolve the domain name to obtain an IP address corresponding to the domain name. The management apparatus determines whether the IP address is the IP address of the management apparatus, and if yes, it indicates that the management apparatus can be accessed, or if not, the management apparatus cannot be accessed, and it is determined that the license server fails to be authenticated.

Optionally, the management apparatus may record the access mode for accessing the management apparatus by the license server and the manufacturer of the license server.

In the license sharing method provided by the embodiment of the present disclosure, a license server receives a first registration request sent by a first apparatus, and obtains, according to attribute information of a license in the first registration request, license resources to be used by the first apparatus, where the license resources belong to one license in a license library; afterward, the license server establishes an association relationship between an identity of the first apparatus and the license, and then sends, to the first apparatus, a first registration response carrying indication information, to indicate to the first apparatus that the first apparatus may share the license with a second apparatus. In the method provided by the embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

Figure 10:
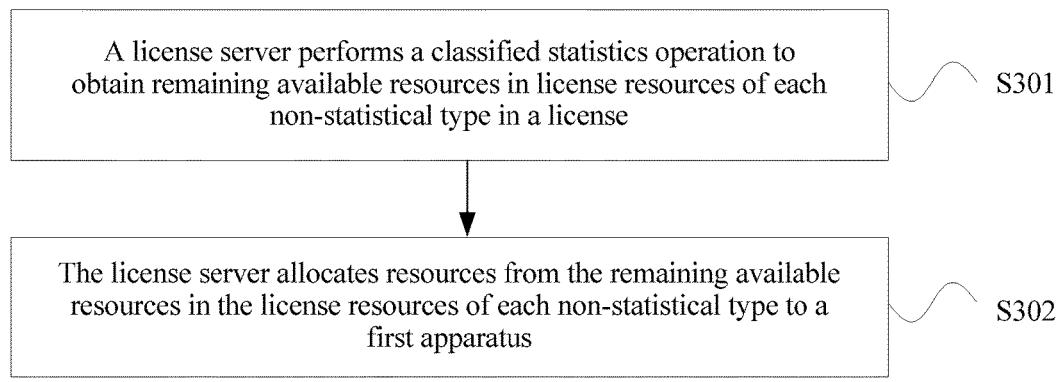
FIG. 10 is a schematic flowchart of a third embodiment of a license sharing method according to an embodiment of the present disclosure.

FIG. 10 is a schematic flowchart of a third embodiment of a license sharing method according to an embodiment of the present disclosure. The method related to the embodiment of the present disclosure is a specific process in which the license server actively allocates license resources in the license to the first apparatus. The license includes license resources of at least one non-statistical type. Optionally, the method shown in FIG. 10 may be performed after the foregoing step S104.

The method shown in FIG. 10 includes the following steps.

S301. The license server performs a classified statistics operation to obtain remaining available resources in license resources of each non-statistical type in the license.

Figure 11:
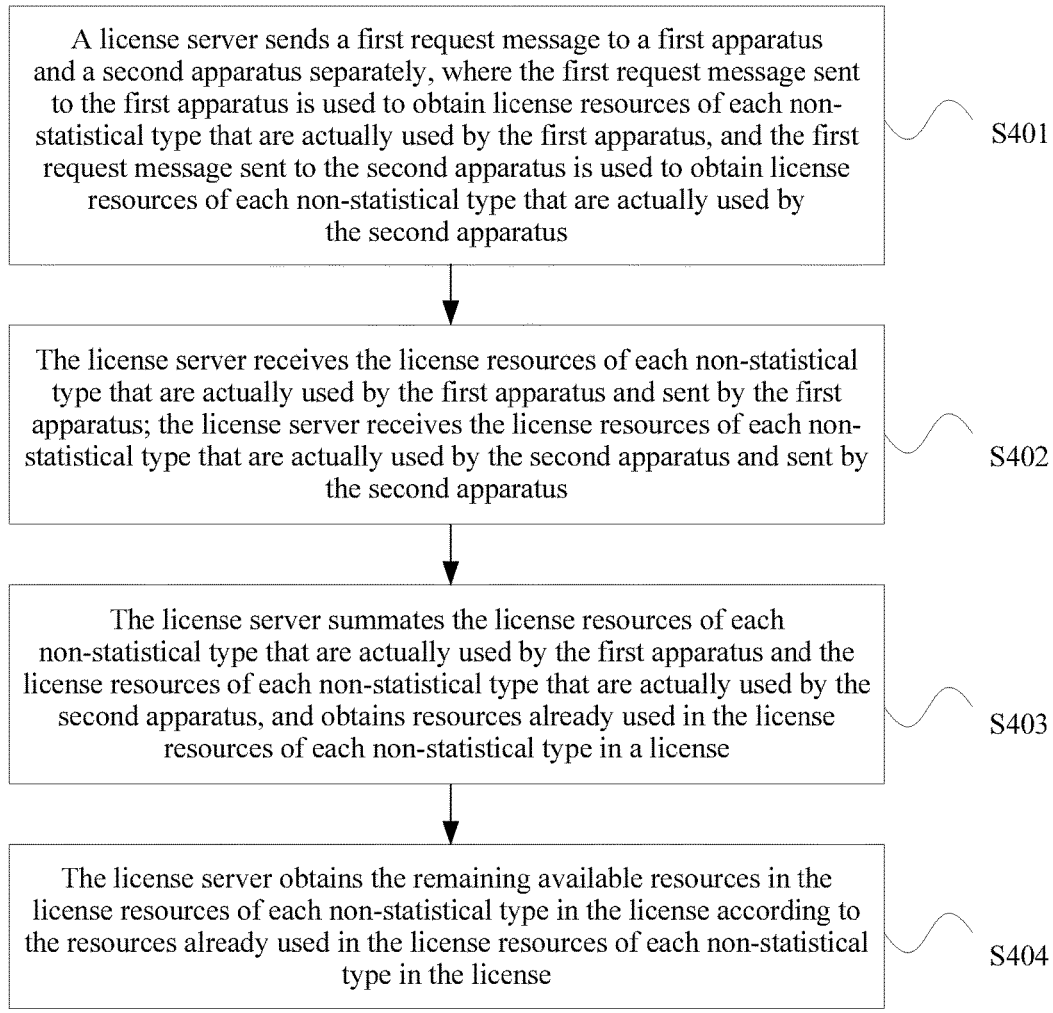
FIG. 11 is a schematic flowchart of performing a classified statistics operation by a license server according to an embodiment of the present disclosure.

For a specific implementation manner of step S301, reference may be made to FIG. 11. FIG. 11 includes the following steps.

S401. The license server sends a first request message to the first apparatus and the second apparatus separately, where the first request message sent to the first apparatus is used to obtain license resources of each non-statistical type that are actually used by the first apparatus, and the first request message sent to the second apparatus is used to obtain license resources of each non-statistical type that are actually used by the second apparatus.

When the license server actively allocates license resources of a non-statistical type to the first apparatus, the license server sends the first request message to the first apparatus and the second apparatus separately, so as to obtain the license resources of each non-statistical type that are actually used by the first apparatus and the license resources of each non-statistical type that are actually used by the second apparatus. Optionally, the license server may directly send the first request message to the first apparatus and the second apparatus separately. Optionally, the license server may also send the first request message to the first apparatus and the second apparatus separately using the management apparatus.

S402. The license server receives the license resources of each non-statistical type that are actually used by the first apparatus and sent by the first apparatus; the license server receives the license resources of each non-statistical type that are actually used by the second apparatus and sent by the second apparatus.

After receiving the first request message, the first apparatus collects statistics on the license resources of each non-statistical type that are actually used by the first apparatus, and reports the license resources of each non-statistical type that are actually used by the first apparatus to the license server. Optionally, the first apparatus may directly report the license resources of each non-statistical type that are actually used by the first apparatus to the license server, or may report the license resources of each non-statistical type that are actually used by the first apparatus to the license server using the management apparatus. After receiving the first request message, the second apparatus performs an operation that is the same as an operation performed by the first apparatus.

S403. The license server summates the license resources of each non-statistical type that are actually used by the first apparatus and the license resources of each non-statistical type that are actually used by the second apparatus, to obtain resources already used in the license resources of each non-statistical type in the license.

For example, it is assumed that two first apparatuses and one second apparatus exist in a network architecture, and are 1#, 2#, and 3#; license resources of three non-statistical types are configured on each of the first apparatuses and the second apparatus, and the three non-statistical types are a, b, and c (the license also includes the license resources of the three non-statistical types a, b, and c, a total quantity of license resources of non-statistical type a is 700, a total quantity of license resources of non-statistical type b is 500, and a total quantity of license resources of non-statistical type c is 600). After the apparatuses 1#, 2#, and 3# receive the first request message sent by the license server, the apparatuses separately collect statistics on license resources of each non-statistical type that are actually used by the apparatuses. That is, the apparatus 1# collects statistics on actual usage of a, b, and c, determines that 100 resources of type a, 200 resources of type b, and 100 resources of type c are actually used by the apparatus 1#; the apparatus 2# also collects statistics on actual usage of a, b, and c, and determines that 50 resources of type a, 150 resources of type b, and 250 resources of type c are actually used by the apparatus 2#; the apparatus 3# also collects statistics on actual usage of a, b, and c, and determines that 20 resources of type a, 120 resources of type b, and 220 resources of type c are actually used by the apparatus 3#. Then the apparatuses 1#, 2#, and 3# separately report their collected actual usage of a, b, and c to the license server. The license server summarizes the actual usage of a, b, and c that is reported by the three apparatuses 1#, 2#, and 3#, and learns resources of types a, b, and c that are already used in the license. A finally obtained result is: in the license, 100+50+20=170 resources of type a are already used, 200+150+120=470 resources of type b are already used, and 100+250+220=570 resources of type c are already used.

S404. The license server obtains the remaining available resources in the license resources of each non-statistical type in the license according to the resources already used in the license resources of each non-statistical type in the license.

Still referring to the foregoing example, the remaining available resources in the license resources of each non-statistical type in the license that are finally obtained by the license server are: in the license, there are 700−170=530 remaining available resources of type a, 500−470=30 remaining available resources of type b, and 600−570=30 remaining available resources of type c.

S302. The license server allocates resources from the remaining available resources in the license resources of each non-statistical type to the first apparatus.

After the license server performs step S301 according to the solution shown in FIG. 10, that is, after the license server determines the remaining available resources in the license resources of each non-statistical type in the license, the license server allocates resources from the remaining available resources in the license resources of each non-statistical type to the first apparatus according to a certain rule. For example, the remaining available resources in the license resources of non-statistical type a in the license are allocated to the first apparatus (remaining available resources in license resources of another non-statistical type in the license may be allocated with reference to this). An allocation rule may be: license resources of non-statistical type a that are allocated to the first apparatus=Remaining available resources T of type a/Quantity of first apparatuses (formula 1); license resources of non-statistical type a that can be used by each first apparatus=Actually used resources A of type a+(Remaining available resources T of type a/Quantity of first apparatuses) (formula 2). Finally, the first apparatus controls a control item according to the available resources allocated by the license server to the first apparatus. Certainly, the license server may also allocate resources from the remaining available resources of type a to the first apparatus according to another allocation principle, for example, allocation according to a requirement. The allocation principle is not limited in the embodiment of the present disclosure.

Figure 12:
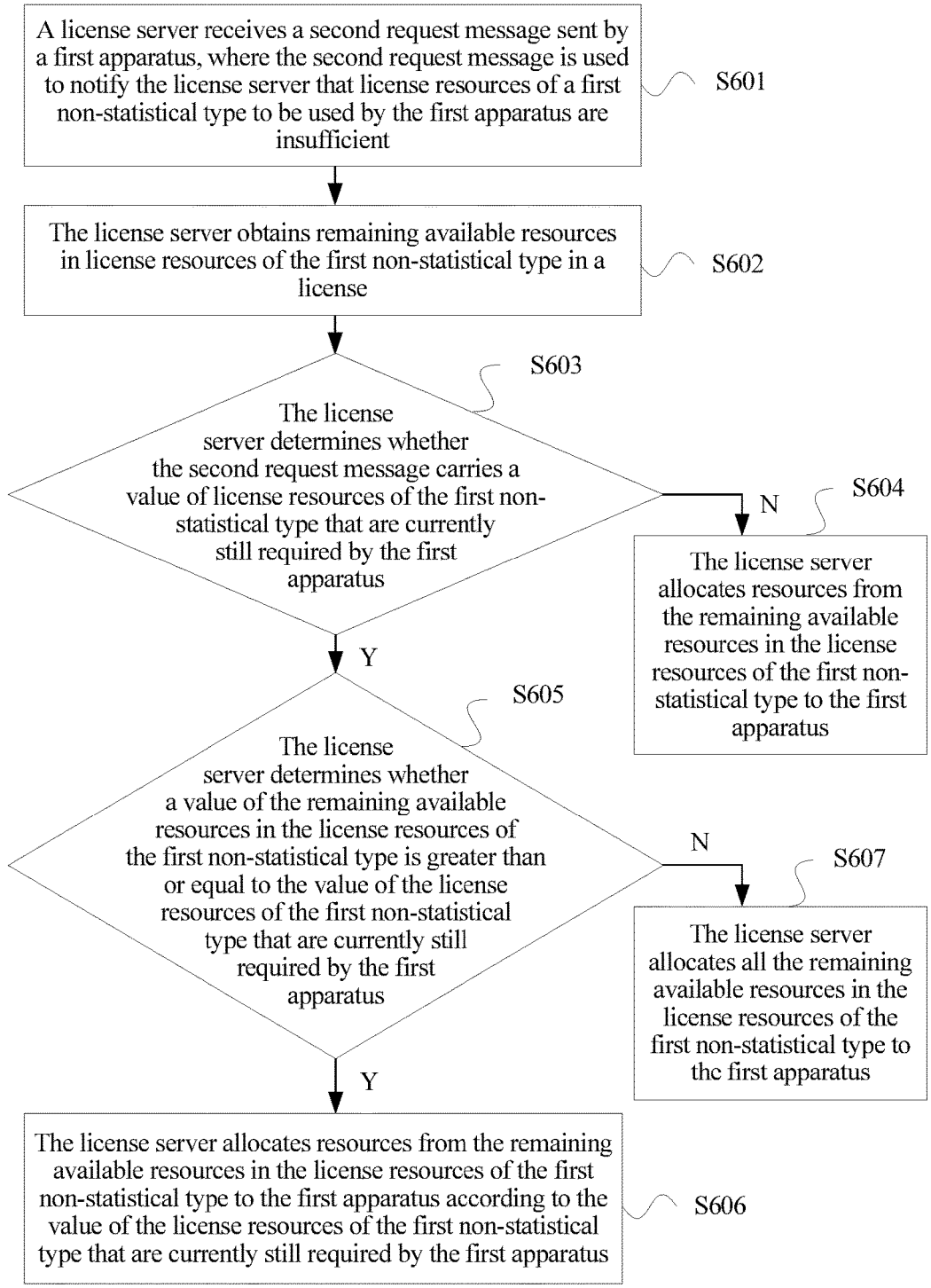
FIG. 12 is a schematic flowchart of a fourth embodiment of a license sharing method according to an embodiment of the present disclosure.

FIG. 12 is a schematic flowchart of a fourth embodiment of a license sharing method according to an embodiment of the present disclosure. The method related to the embodiment is a process of processing by the license server when license resources of a first non-statistical type to be used by the first apparatus are insufficient. Optionally, the embodiment of the present disclosure may be directly based on the embodiment shown in FIG. 9, or may be based on the embodiment shown in FIG. 10.

The method shown in FIG. 12 includes the following steps.

S601. The license server receives a second request message sent by the first apparatus, where the second request message is used to notify the license server that the license resources of the first non-statistical type to be used by the first apparatus are insufficient.

If the first apparatus finds, after running for a period of time, that the license resources of the first non-statistical type to be used by the first apparatus are insufficient, the first apparatus sends the second request message to the license server to notify the license server that the license resources of the first non-statistical type to be used by the first apparatus are insufficient. It should be noted that, herein, the first apparatus may send the second request message to the license server directly, or may send the second request message to the license server using the management apparatus.

S602. The license server obtains remaining available resources in license resources of the first non-statistical type in the license.

The license server may obtain the remaining available resources in the license resources of the first non-statistical type with reference to steps S403 and S404.

S603. The license server determines whether the second request message carries a value of license resources of the first non-statistical type that are currently still required by the first apparatus.

Optionally, the value of the license resources of the first non-statistical type that are currently still required by the first apparatus may be directly reflected in the second request message or may be reflected indirectly. When the second request message carries the value of the license resources of the first non-statistical type that are currently still required by the first apparatus, the value of the license resources of the first non-statistical type that are currently still required by the first apparatus is an explicit value. When the second request message carries a total value of license resources of the first non-statistical type that are required by the first apparatus, the value of the license resources of the first non-statistical type that are currently still required by the first apparatus is an implicit value. In this case, the license server directly subtracts a value of license resources of the first non-statistical type that are already allocated to the first apparatus from the total value of the license resources of the first non-statistical type that are required by the first apparatus, to obtain the value of the license resources of the first non-statistical type that are currently still required by the first apparatus. For example, assuming that 100 license resources of the first non-statistical type are already allocated to the first apparatus, and that 150 license resources of the first non-statistical type are required by the first apparatus in total, 50 license resources of the first non-statistical type are currently still required by the first apparatus. If the second request message carries the value of the license resources of the first non-statistical type that are currently still required by the first apparatus, the value may be 150 (implicitly reflected), or may be 50 (explicitly reflected).

It should be noted that, after the license server allocates the license resources to the first apparatus, the license server records the value of the license allocated to the first apparatus.

S604. If the second request message does not carry the value of the license resources of the first non-statistical type that are currently still required by the first apparatus, the license server allocates resources from the remaining available resources in the license resources of the first non-statistical type to the first apparatus.

Optionally, the license server allocates resources from the obtained remaining available resources in the license resources of the first non-statistical type to the first apparatus according to a certain rule. For the allocation rule, reference may be made to the solution described in the foregoing step S302. Details are not further described herein.

S605. If the second request message carries the value of the license resources of the first non-statistical type that are currently still required by the first apparatus, the license server determines whether a value of the remaining available resources in the license resources of the first non-statistical type is greater than or equal to the value of the license resources of the first non-statistical type that are currently still required by the first apparatus. If yes, step S606 is performed, or if not, step S607 is performed.

S606. The license server allocates resources from the remaining available resources in the license resources of the first non-statistical type to the first apparatus according to the value of the license resources of the first non-statistical type that are currently still required by the first apparatus.

Optionally, after the license server allocates the resources from the remaining available resources in the license resources of the first non-statistical type to the first apparatus according to the value of the license resources of the first non-statistical type that are currently still required by the first apparatus, the license server may further allocate, to the first apparatus, license resources of the first non-statistical type that correspond to a difference between the value of the remaining available resources in the license resources of the first non-statistical type and the value of the license resources of the first non-statistical type that are currently still required by the first apparatus. Such an allocation rule may be reflected by the following formula 3 and formula 4. Formula 3 indicates a value of license resources of the first non-statistical type that need to be allocated to the first apparatus, and formula 4 indicates a value of license resources of the first non-statistical type that can be actually used by the first apparatus.

license resources of the first non-statistical type to be allocated to the first apparatus=$C+(T-C)/$Quantity of first apparatuses.   Formula 3:

license resources of the first non-statistical type that can be actually used by the first apparatus=$A+C+(T-C)/$Quantity of first apparatuses.   Formula 4:

In the foregoing formula 3 and formula 4, A is a value of license resources of the first non-statistical type that are actually used by the first apparatus, T is the value of the remaining available resources in the license resources of the first non-statistical type in the license, and C is the value of the license resources of the first non-statistical type that are currently still required by the first apparatus. It should be noted that, the first apparatus in formula 3 and formula 4 refers to a first apparatus on which license resources of the first non-statistical type are insufficient.

S607. The license server allocates all the remaining available resources in the license resources of the first non-statistical type to the first apparatus.

Figure 13:
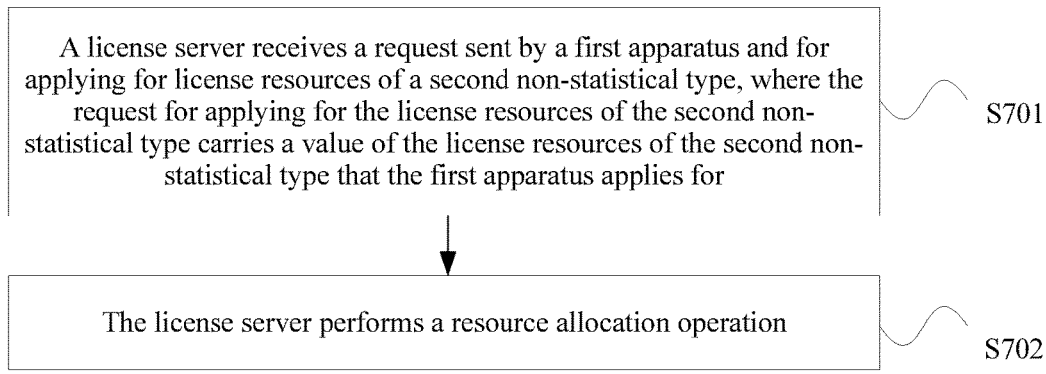
FIG. 13 is a schematic flowchart of a fifth embodiment of a license sharing method according to an embodiment of the present disclosure.

FIG. 13 is a schematic flowchart of a fifth embodiment of a license sharing method according to an embodiment of the present disclosure. The method related to the embodiment is a specific process in which the first apparatus actively applies for license resources from the license server according to a requirement. The license includes license resources of at least one non-statistical type. Optionally, the method shown in FIG. 13 may be performed after step S104.

The method shown in FIG. 13 includes the following steps.

S701. The license server receives a request sent by the first apparatus and for applying for license resources of a second non-statistical type, where the request for applying for the license resources of the second non-statistical type carries a value of the license resources of the second non-statistical type that the first apparatus applies for.

Herein, the license resources of the second non-statistical type are license resources of any non-statistical type in the license.

Certainly, to prevent the first apparatus from sending excessive messages to the license server, the first apparatus may also send the request for applying for the license resources of the second non-statistical type to the license server according to a certain rule. The rule may be sending the request for applying for the license resources of the second non-statistical type to the license server according to a certain time interval, or sending the request for applying for the license resources of the second non-statistical type to the license server when a quantity of occupied license resources of the second non-statistical type reaches a certain numeric value. For example, every time the first apparatus needs to occupy 50 license resources of the second non-statistical type, the first apparatus sends a request for applying for license resources of the second non-statistical type to the license server, or may set a timer and periodically send a request for applying for license resources of the second non-statistical type.

It should be noted that, the application request may be directly sent by the first apparatus to the license server, or may be sent by the first apparatus to the license server using the management apparatus.

S702. The license server performs a resource allocation operation.

The resource allocation operation includes the license server determines whether a value of remaining available resources in license resources of the second non-statistical type in the license is greater than or equal to the value of the license resources of the second non-statistical type that the first apparatus applies for; and if yes, the license server allocates license resources of the second non-statistical type to the first apparatus according to the value of the license resources of the second non-statistical type that the first apparatus applies for.

It should be noted that, when the license server determines that the value of the remaining available resources in the license resources of the second non-statistical type in the license is less than the value of the license resources of the second non-statistical type that the first apparatus applies for, the license server determines that allocation of the license resources of the second non-statistical type to the first apparatus fails, and the license server notifies the first apparatus, in a response manner, that the license resources of the second non-statistical type are insufficient.

Optionally, the license server may further notify the first apparatus of a current available value of license resources of the second non-statistical type on the license server in a response manner, and the first apparatus may first apply for this part of license resources of the second non-statistical type.

Figure 14:
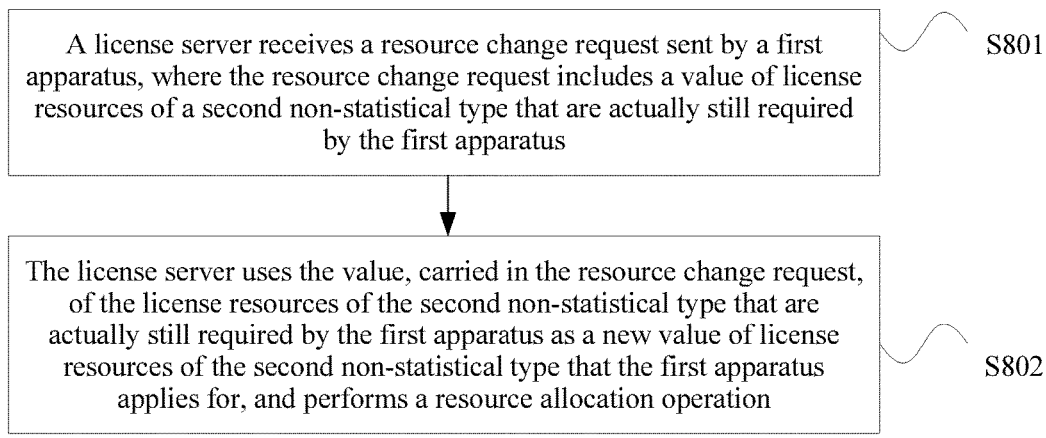
FIG. 14 is a schematic flowchart of a sixth embodiment of a license sharing method according to an embodiment of the present disclosure.

FIG. 14 is a schematic flowchart of a sixth embodiment of a license sharing method according to an embodiment of the present disclosure. The embodiment of the present disclosure relates to a specific process in which the license server processes a resource change request sent by the first apparatus. Optionally, the method shown in FIG. 14 may be performed after the license server allocates the license resources of the second non-statistical type (step S702) to the first apparatus.

The method shown in FIG. 14 includes the following steps.

S801. The license server receives a resource change request sent by the first apparatus, where the resource change request includes a value of license resources of the second non-statistical type that are actually still required by the first apparatus.

If the license resources of the second non-statistical type that are allocated by the license server to the first apparatus do not match a resource value required by the first apparatus, the first apparatus needs to send the resource change request to the license server. Optionally, the first apparatus may directly send the resource change request to the license server, or may send the resource change request to the license server using the management apparatus.

S802. The license server uses the value, carried in the resource change request, of the license resources of the second non-statistical type that are actually still required by the first apparatus as a new value of license resources of the second non-statistical type that the first apparatus applies for, and performs the resource allocation operation.

The license server re-collects an available value of license resources of the second non-statistical type in the license, and determines whether the value of the remaining available resources in the license resources of the second non-statistical type in the license is greater than or equal to the new value of the license resources of the second non-statistical type that the first apparatus applies for, that is, determines whether the remaining available resources in the license resources of the second non-statistical type in the license are sufficient for allocation to the first apparatus. If yes, the license server allocates the license resources of the second non-statistical type to the first apparatus according to the new value of the license resources of the second non-statistical type that the first apparatus applies for. If not, the license server determines that allocation of the license resources of the second non-statistical type to the first apparatus fails.

Figure 15:
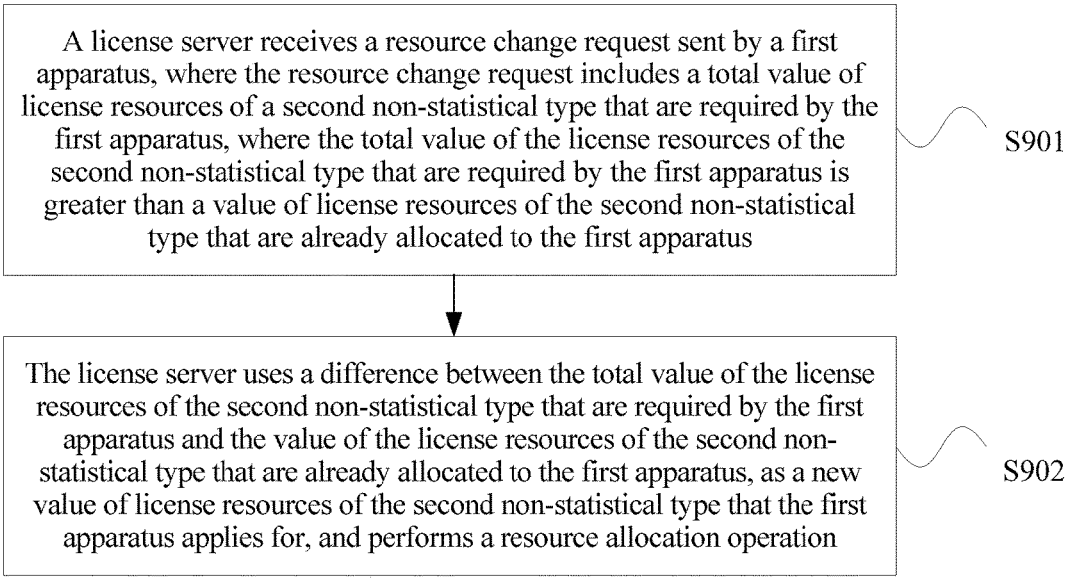
FIG. 15 is a schematic flowchart of a seventh embodiment of a license sharing method according to an embodiment of the present disclosure.

FIG. 15 is a schematic flowchart of a seventh embodiment of a license sharing method according to an embodiment of the present disclosure. The embodiment of the present disclosure relates to another specific process in which the license server processes a resource change request sent by the first apparatus. Optionally, the method shown in FIG. 15 may be performed after the license server allocates the license resources of the second non-statistical type (step S702) to the first apparatus.

The method shown in FIG. 15 includes the following steps.

S901. The license server receives a resource change request sent by the first apparatus, where the resource change request includes a total value of license resources of the second non-statistical type that are required by the first apparatus, where the total value of the license resources of the second non-statistical type that are required by the first apparatus is greater than a value of the license resources of the second non-statistical type that are already allocated to the first apparatus.

If the license resources of the second non-statistical type that are allocated by the license server to the first apparatus do not match a resource value required by the first apparatus, the first apparatus needs to send the resource change request to the license server. Optionally, the first apparatus may directly send the resource change request to the license server, or may send the resource change request to the license server using the management apparatus.

It should be noted that, the total value, carried in the resource change request, of the license resources of the second non-statistical type that are required by the first apparatus includes the license resources of the second non-statistical type that originally exist on the first apparatus (the license server has allocated a part of the license resources of the second non-statistical type to the first apparatus, but the allocated resources are insufficient). The total value of the license resources of the second non-statistical type that are required by the first apparatus is greater than the value of the license resources of the second non-statistical type that are already allocated to the first apparatus.

S902. The license server uses a difference between the total value of the license resources of the second non-statistical type that are required by the first apparatus and the value of the license resources of the second non-statistical type that are already allocated to the first apparatus, as a new value of license resources of the second non-statistical type that the first apparatus applies for, and performs the resource allocation operation.

The license server uses the difference obtained by subtracting the value of the license resources of the second non-statistical type that are already allocated to the first apparatus from the total value of the license resources of the second non-statistical type that are required by the first apparatus, as the new value of the license resources of the second non-statistical type that the first apparatus applies for. Afterward, the license server re-collects a value of remaining available resources in the license resources of the second non-statistical type in the license, and determines whether the value of the remaining available resources in the license resources of the second non-statistical type is greater than or equal to the new value of the license resources of the second non-statistical type that the first apparatus applies for, that is, determines whether the remaining available resources in the license resources of the second non-statistical type in the license are sufficient for the first apparatus. If not, the license server determines that allocation of the license resources of the second non-statistical type to the first apparatus fails. If yes, the license server allocates the license resources of the second non-statistical type to the first apparatus according to the new value of the license resources of the second non-statistical type that the first apparatus applies for.

Figure 16:
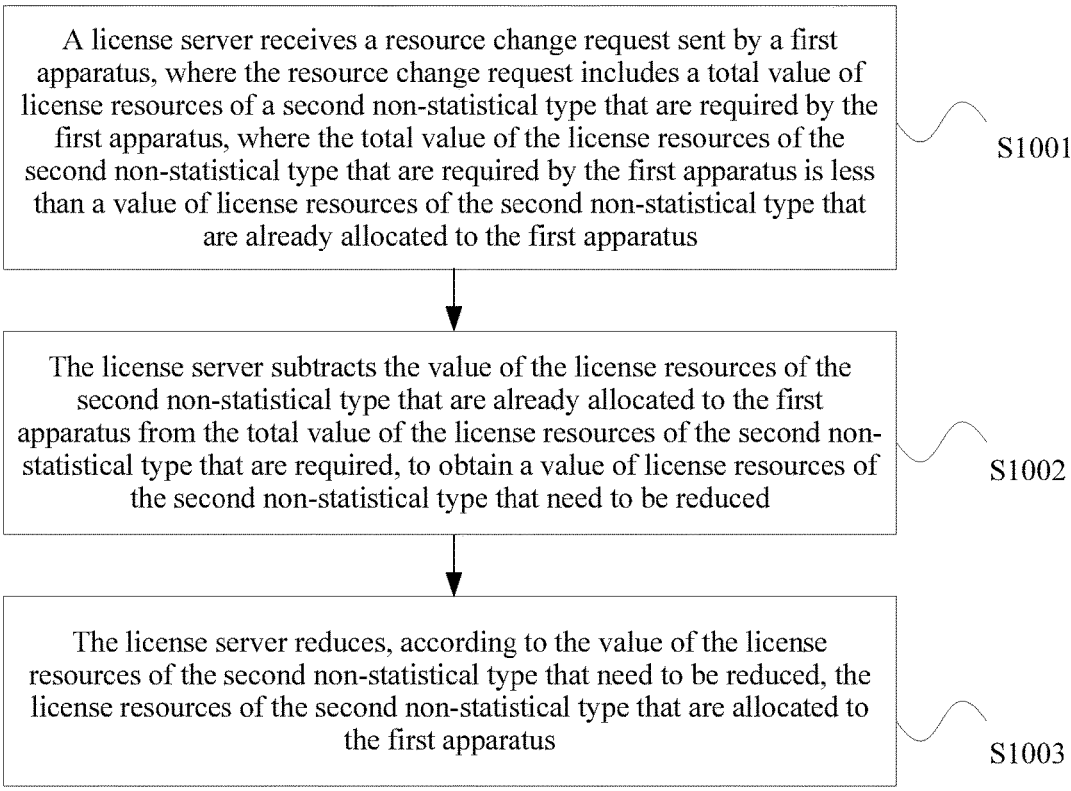
FIG. 16 is a schematic flowchart of an eighth embodiment of a license sharing method according to an embodiment of the present disclosure.

FIG. 16 is a schematic flowchart of an eighth embodiment of a license sharing method according to an embodiment of the present disclosure. The embodiment relates to another specific process in which the license server processes a resource change request sent by the first apparatus. Optionally, the method shown in FIG. 16 may be performed after the license server allocates the license resources of the second non-statistical type (step S702) to the first apparatus.

The method shown in FIG. 16 includes the following steps.

S1001. The license server receives a resource change request sent by the first apparatus, where the resource change request includes a total value of license resources of the second non-statistical type that are required by the first apparatus, where the total value of the license resources of the second non-statistical type that are required by the first apparatus is less than a value of the license resources of the second non-statistical type that are already allocated to the first apparatus.

If the license resources of the second non-statistical type that are allocated by the license server to the first apparatus do not match a resource value required by the first apparatus, the first apparatus needs to send the resource change request to the license server. Optionally, the first apparatus may directly send the resource change request to the license server, or may send the resource change request to the license server using the management apparatus.

It should be noted that, the total value, included in the resource change request, of the license resources of the second non-statistical type that are required by the first apparatus is less than the value of the license resources of the second non-statistical type that are already allocated to the first apparatus, that is, the license resources of the second non-statistical type that are previously allocated by the license server to the first apparatus are more than license resources of the second non-statistical type that are actually required by the first apparatus, and the first apparatus requires the license server to reallocate license resources of the second non-statistical type to the first apparatus.

S1002. The license server subtracts the value of the license resources of the second non-statistical type that are already allocated to the first apparatus from the total value of the license resources of the second non-statistical type that are required, to obtain a value of license resources of the second non-statistical type that need to be reduced.

It is assumed that there are 500 license resources of the second non-statistical type in total in the license, where the value of the license resources of the second non-statistical type that are already allocated by the license server to the first apparatus is 200, and a remaining available value, collected by the license server, of license resources of the second non-statistical type in the license is 300. However, the first apparatus actually requires only 50 license resources of the second non-statistical type, that is, the total value, carried in the resource change request, of the license resources of the second non-statistical type that are required by the first apparatus is 50. The license server subtracts the value of the license resources of the second non-statistical type that are already allocated to the first apparatus from the total value of the license resources of the second non-statistical type that are required, to obtain the value of the license resources of the second non-statistical type that need to be reduced, that is, the value, obtained by the license server, of the license resources of the second non-statistical type that need to be reduced is 50−200=−150.

S1003. The license server reduces, according to the value of the license resources of the second non-statistical type that need to be reduced, the license resources of the second non-statistical type that are allocated to the first apparatus.

According to the example in step S1002, the license server needs to reduce the original 200 to 150.

Figure 17:
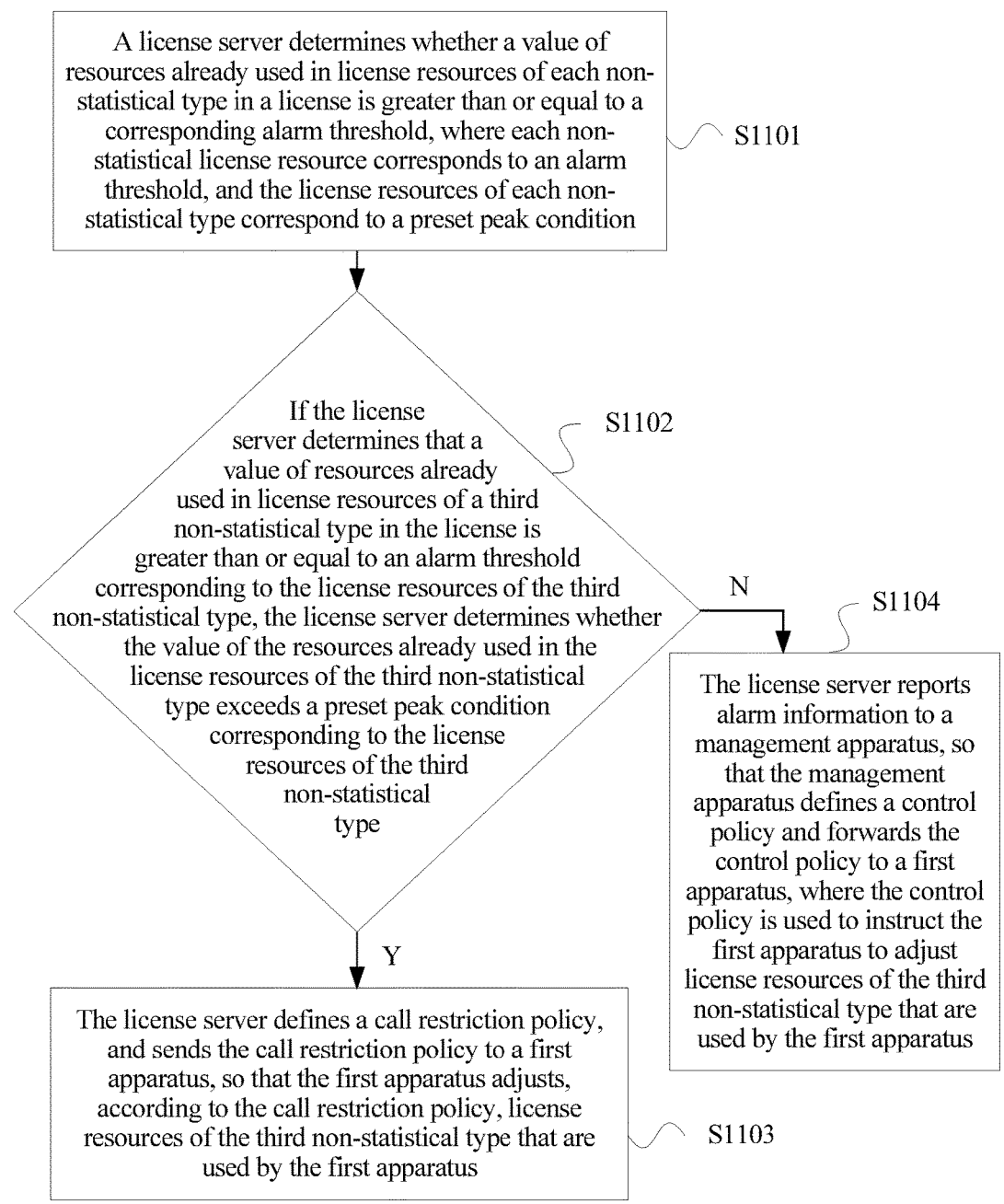
FIG. 17 is a schematic flowchart of a ninth embodiment of a license sharing method according to an embodiment of the present disclosure.

FIG. 17 is a schematic flowchart of a ninth embodiment of a license sharing method according to an embodiment of the present disclosure. The embodiment of the present disclosure relates to a specific process in which the license server determines whether resources already used in the license resources of each non-statistical type in the license exceed an alarm threshold or a preset peak condition. Optionally, the embodiment shown in FIG. 17 may be based on the embodiments shown in FIG. 10 and FIG. 11. Optionally, the method in the embodiment shown in FIG. 17 may be performed after step S403.

The method shown in FIG. 17 includes the following steps.

S1101. The license server determines whether a value of the resources already used in the license resources of each non-statistical type in the license is greater than or equal to a corresponding alarm threshold, where the license resources of each non-statistical type correspond to an alarm threshold, and the license resources of each non-statistical type correspond to a preset peak condition.

When the license server obtains, by collecting statistics, the value of the resources already used in the license resources of each non-statistical type in the license, the license server determines whether the value of the resources already used in the license resources of each non-statistical type exceeds the alarm threshold. It should be noted that, herein, the alarm threshold may be in a form of a percentage, or may be in a form of a specific limit of a numeric value of resource usage. When the alarm threshold is in the form of a percentage, using license resources of a third non-statistical type in the license as an example, the license server determines whether a ratio of a value of resources already used in the license resources of the third non-statistical type to a maximum value of the license resources of the third non-statistical type is greater than or equal to an alarm threshold corresponding to the license resources of the third non-statistical type. If the alarm threshold is in the form of a specific limit of a numeric value of resource usage, the license server determines whether the value of the resources already used in the license resources of the third non-statistical type is greater than or equal to the alarm threshold corresponding to the license resources of the third non-statistical type. The license resources of the third non-statistical type are license resources of any non-statistical type in the license.

S1102. If the license server determines that a value of resources already used in license resources of a third non-statistical type in the license is greater than or equal to an alarm threshold corresponding to the license resources of the third non-statistical type, the license server determines whether the value of the resources already used in the license resources of the third non-statistical type exceeds a preset peak condition corresponding to the license resources of the third non-statistical type. If yes, step S1103 is performed, or if not, step S1104 is performed.

S1103. The license server defines a call restriction policy, and sends the call restriction policy to the first apparatus, so that the first apparatus adjusts, according to the call restriction policy, license resources of the third non-statistical type that are used by the first apparatus.

If the license server determines that the value of the resources already used in the license resources of the third non-statistical type exceeds the maximum value of the license resources of the third non-statistical type, the license server provides a certain grace period or a quantity of grace times for the first apparatus for using the license resources of the third non-statistical type. That is, the license server prolongs a certain time or prolongs a certain quantity of times, so that the first apparatus can continue to use the license resources of the third non-statistical type.

If the value of the resources already used in the license resources of the third non-statistical type exceeds the maximum value of the license resources of the third non-statistical type in a long period of time or continuously, that is, after the grace period or the quantity of grace times is exceeded, the value of the resources already used in the license resources of the third non-statistical type still exceeds the maximum value of the license resources of the third non-statistical type, the license server defines a call restriction policy. The call restriction policy is used to limit or reduce the license resources of the third non-statistical type that are used by the first apparatus. The license server sends the call restriction policy to the first apparatus, so that the first apparatus adjusts, according to the call restriction policy, the license resources of the third non-statistical type that are used by the first apparatus. For example, license resources of the third non-statistical type that are used by a certain first apparatus are limited, or license resources of the third non-statistical type that are used by a certain first apparatus are reduced.

S1104. The license server reports alarm information to the management apparatus, so that the management apparatus defines a control policy and forwards the control policy to the first apparatus, where the control policy is used to instruct the first apparatus to adjust license resources of the third non-statistical type that are used by the first apparatus.

Optionally, the control policy may be reducing, according to a ratio, the license resources of the third non-statistical type that are used by the first apparatus, or reducing license resources of the third non-statistical type on a first apparatus that occupies the most license resources of the third non-statistical type, or canceling the license resources of the third non-statistical type that are used by the first apparatus, or the like. Preferably, license resources of the third non-statistical type that are used on a last VNF instance may be canceled. After receiving the control policy, the first apparatus may adjust, according to a manner indicated by the control policy, the license resources of the third non-statistical type that are used by the first apparatus.

Figure 18B:
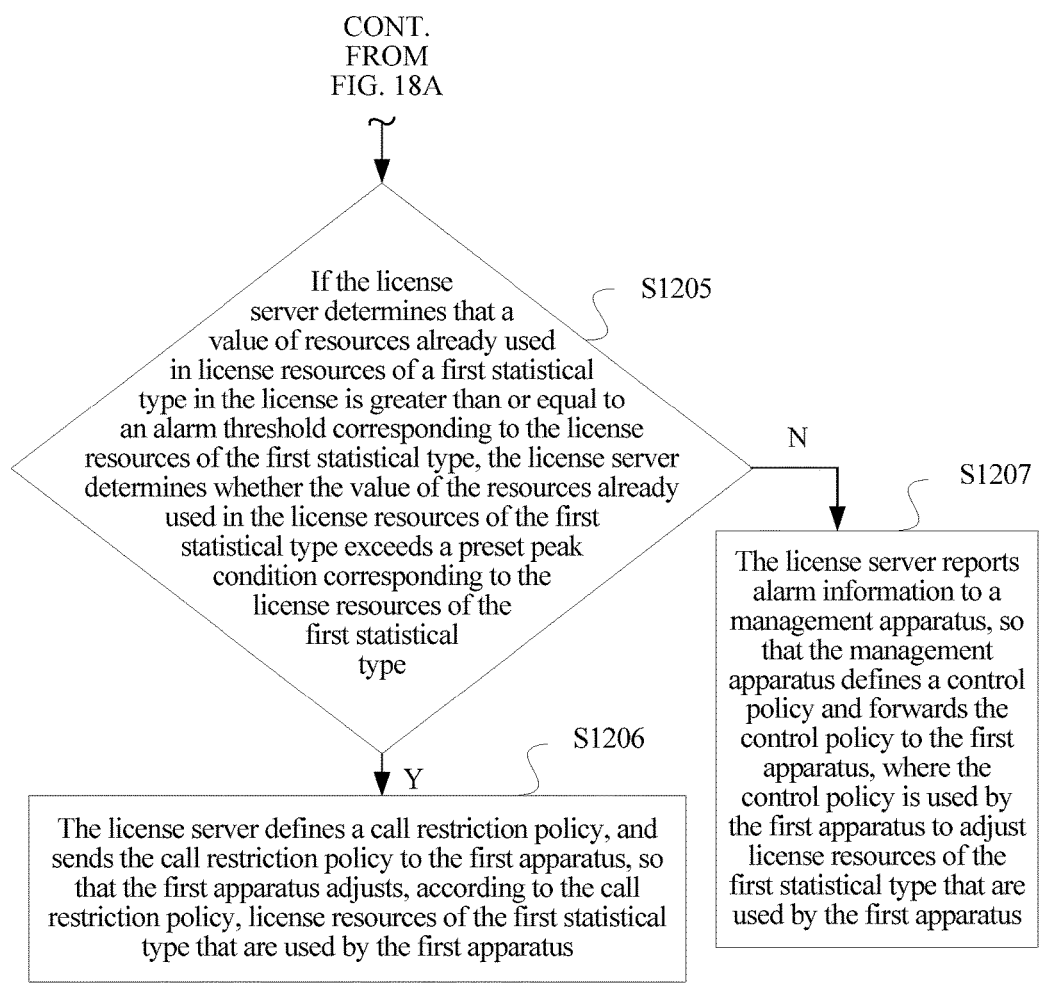

FIG. 18A and FIG. 18B are a schematic flowchart of a tenth embodiment of a license sharing method according to an embodiment of the present disclosure. The method related to the embodiment is a specific process in which the license server determines whether a value of resources already used in license resources of each statistical type in the license exceeds an alarm threshold or a preset peak condition. The license includes license resources of at least one statistical type. Optionally, the method in the embodiment shown in FIG. 18A and FIG. 18B may be performed after step S104.

The method shown in FIG. 18A and FIG. 18B includes the following steps.

S1201. The license server periodically sends a third request message to the first apparatus and the second apparatus separately, where the third request message sent to the first apparatus is used to obtain license resources of each statistical type that are actually used by the first apparatus, and the third request message sent to the second apparatus is used to obtain license resources of each statistical type that are actually used by the second apparatus.

The license server periodically sends the third request message to the first apparatus and the second apparatus separately, to obtain the license resources of each statistical type that are actually used by the first apparatus and the license resources of each statistical type that are actually used by the second apparatus. Optionally, the license server may directly send the third request message to the first apparatus and the second apparatus separately, or may send the third request message to the first apparatus and the second apparatus separately using the management apparatus.

S1202. The license server receives the license resources of each statistical type that are actually used by the first apparatus and sent by the first apparatus; the license server receives the license resources of each statistical type that are actually used by the second apparatus and sent by the second apparatus.

After receiving the third request message, the first apparatus and the second apparatus separately collect statistics on the license resources of each statistical type that are actually used by the first apparatus and the license resources of each statistical type that are actually used by the second apparatus, and separately report the license resources of each statistical type that are actually used by the first apparatus and the license resources of each statistical type that are actually used by the second apparatus to the license server. Reference may be made to specific content of step S402 in the embodiment shown in FIG. 12. This technical solution is basically similar to that of the embodiment shown in FIG. 12, and is not further described herein.

S1203. The license server summates the license resources of each statistical type that are actually used by the first apparatus and the license resources of each statistical type that are actually used by the second apparatus, to obtain resources already used in the license resources of each statistical type in the license.

For a process in which the license server obtains the resources already used in the license resources of each statistical type in the license, reference may be made to specific content of step S403 in the embodiment shown in FIG. 12. This technical solution is basically similar to that of the embodiment shown in FIG. 12, and only the license resources of the non-statistical type need to be changed to the license resources of the statistical type. Details are not further described herein.

S1204. The license server determines whether a value of the resources already used in the license resources of each statistical type in the license is greater than or equal to a corresponding alarm threshold, where the license resources of each statistical type correspond to an alarm threshold, and the license resources of each statistical type correspond to a preset peak condition.

It should be noted that, herein, the alarm threshold may be in a form of a percentage, or may be in a form of a specific limit of a numeric value of resource usage. When the alarm threshold is in the form of a percentage, using license resources of a first statistical type in the license as an example, the license server determines whether a ratio of a value of resources already used in the license resources of the first statistical type to a maximum value of the license resources of the first statistical type is greater than or equal to an alarm threshold corresponding to the license resources of the first statistical type. If the alarm threshold is in the form of a specific limit of a numeric value of resource usage, the license server determines whether the value of the resources already used in the license resources of the first statistical type is greater than or equal to the alarm threshold corresponding to the license resources of the first statistical type. The license resources of the first statistical type are license resources of any statistical type in the license.

S1205. If the license server determines that a value of resources already used in license resources of a first statistical type in the license is greater than or equal to an alarm threshold corresponding to the license resources of the first statistical type, the license server determines whether the value of the resources already used in the license resources of the first statistical type exceeds a preset peak condition corresponding to the license resources of the first statistical type. If yes, step S1206 is performed, or if not, step S1207 is performed.

S1206. The license server defines a call restriction policy, and sends the call restriction policy to the first apparatus, so that the first apparatus adjusts, according to the call restriction policy, license resources of the first statistical type that are used by the first apparatus.

If the license server first determines whether the value of the resources already used in the license resources of the first statistical type exceeds the maximum value of the license resources of the first statistical type, the license server provides a certain grace period or a quantity of grace times for the license resources of the first statistical type, that is, the license server prolongs a certain time or prolongs a certain quantity of times, so that the first apparatus can continue to use the license resources of the first statistical type.

If the value of the resources already used in the license resources of the first statistical type exceeds the maximum value of the license resources of the first statistical type in a long period of time or continuously, that is, after the grace period or the quantity of grace times is exceeded, the value of the resources already used in the license resources of the first statistical type still exceeds the maximum value of the license resources of the first statistical type, the license server defines a call restriction policy. The call restriction policy is used to limit or reduce the license resources of the first statistical type that are used by the first apparatus. The license server sends the call restriction policy to the first apparatus, so that the first apparatus adjusts, according to the call restriction policy, the license resources of the first statistical type that are used by the first apparatus. For example, license resources of the first statistical type that are used by a certain first apparatus are limited, or license resources of the first statistical type that are used by a certain first apparatus are reduced.

S1207. The license server reports alarm information to the management apparatus, so that the management apparatus defines a control policy and forwards the control policy to the first apparatus, where the control policy is used to instruct the first apparatus to adjust license resources of the first statistical type that are used by the first apparatus.

Optionally, the control policy may be reducing, according to a ratio, the license resources of the first statistical type that are used by the first apparatus, or reducing license resources of the first statistical type on a first apparatus that occupies the most license resources of the first statistical type, or canceling the license resources of the first statistical type that are used by the first apparatus, or the like. Preferably, license resources of the first statistical type that are used on a last VNF instance may be canceled. After receiving the control policy, the first apparatus may adjust, according to a manner indicated by the control policy, the license resources of the first statistical type that are used by the first apparatus.

Figure 19:
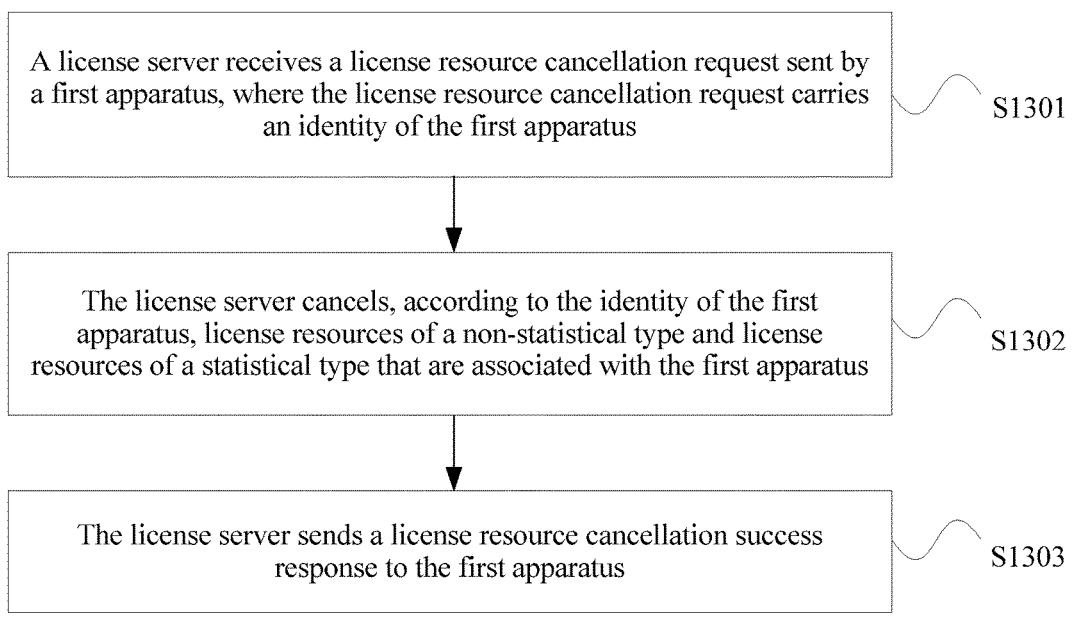
FIG. 19 is a schematic flowchart of an eleventh embodiment of a license sharing method according to an embodiment of the present disclosure.

FIG. 19 is a schematic flowchart of an eleventh embodiment of a license sharing method according to an embodiment of the present disclosure. The embodiment relates to a process of releasing license resources. Optionally, the embodiment shown in FIG. 19 may be based on any embodiment in the embodiments shown in FIG. 1 to FIG. 18A and FIG. 18B.

The method shown in FIG. 19 includes the following steps.

S1301. The license server receives a license resource cancellation request sent by the first apparatus, where the license resource cancellation request carries the identity of the first apparatus.

Optionally, the first apparatus may directly send the license resource cancellation request to the license server, or may send the license resource cancellation request to the license server using the management apparatus. It should be noted that, when the first apparatus directly sends the license resource cancellation request to the license server, the first apparatus has not started a termination processing procedure. The first apparatus starts the termination processing procedure only after the first apparatus sends the license resource cancellation request to the license server. It should be noted that, herein, the termination processing procedure may be that a VNF instance stops running on a virtual machine, that is, termination of the VNF instance is implemented; or may be that a physical server is shut down, so that the physical server releases license resources.

S1302. The license server cancels, according to the identity of the first apparatus, license resources of a non-statistical type and license resources of a statistical type that are associated with the first apparatus.

In step S1302, the license resources of the non-statistical type and the license resources of the statistical type that are occupied by the first apparatus can be canceled according to the license resource cancellation request.

S1303. The license server sends a license resource cancellation success response to the first apparatus.

Optionally, after the license server cancels an association relationship between the first apparatus and license resources, the license server may send a license resource cancellation success response to the first apparatus, or may not send a license resource cancellation success response (because the first apparatus actually cannot receive any response after the first apparatus is terminated), or may send a license resource cancellation success response to the management apparatus.

The first apparatus involved in all the foregoing embodiments may be a physical network element, or may be a virtual network element (for example, a VNF instance). To better describe the technical solutions of the embodiments of the present disclosure, processes of information interaction between the first apparatus and the license server are described herein one by one.

When the first apparatus and the second apparatus are physical network elements, the management apparatus corresponding to the first apparatus and the second apparatus is an EMS. The physical network element may directly interact with the license server, or may interact with the license server using the EMS. For a network architecture between the license server, the EMS, and the physical network element, reference may be made to FIG. 2 and FIG. 3. It should be noted that, regardless of whether information is directly exchanged between the physical network element and the license server or is exchanged using the EMS, the EMS is deployed in a network architecture in which the physical network element and the license server are located.

When both the first apparatus and the second apparatus are VNF instances (the first apparatus is a first VNF instance, and the second apparatus is a second VNF instance), the management apparatus corresponding to the first apparatus and the second apparatus may be a VNFM and an orchestrator, or may be a VNFM and an orchestrator and an EMS. For a network architecture between the license server, the orchestrator, the VNFM, the EMS, and the physical network element, reference may be made to FIG. 4 to FIG. 8. In the following technical solution, only a signaling flowchart of interaction between the first VNF instance and the license server using the orchestrator and the VNFM or using the orchestrator and the VNFM and the EMS is shown, but a signaling flowchart of direct information interaction between the first VNF instance and the license server is not further shown.

Figure 20A:
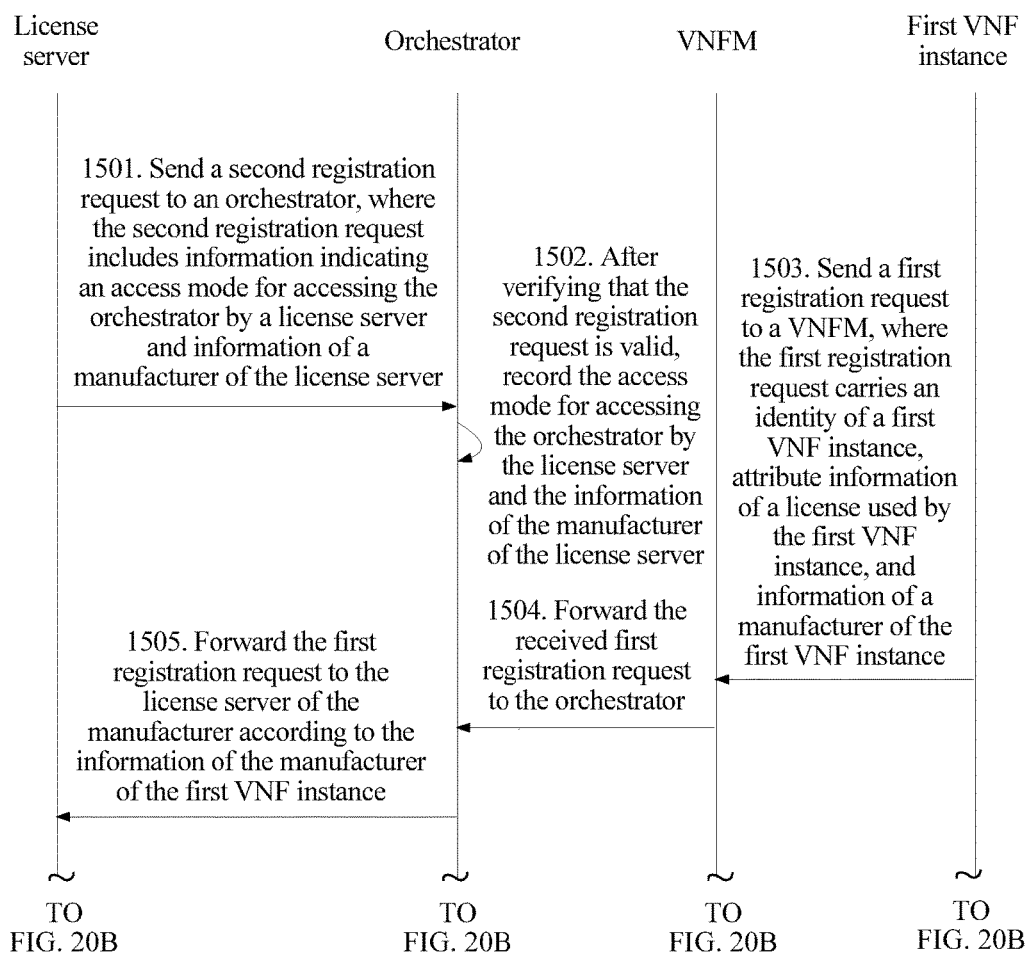
FIG. 20A and FIG. 20B are a signaling flowchart of a twelfth embodiment of a license sharing method according to an embodiment of the present disclosure.
Figure 20B:
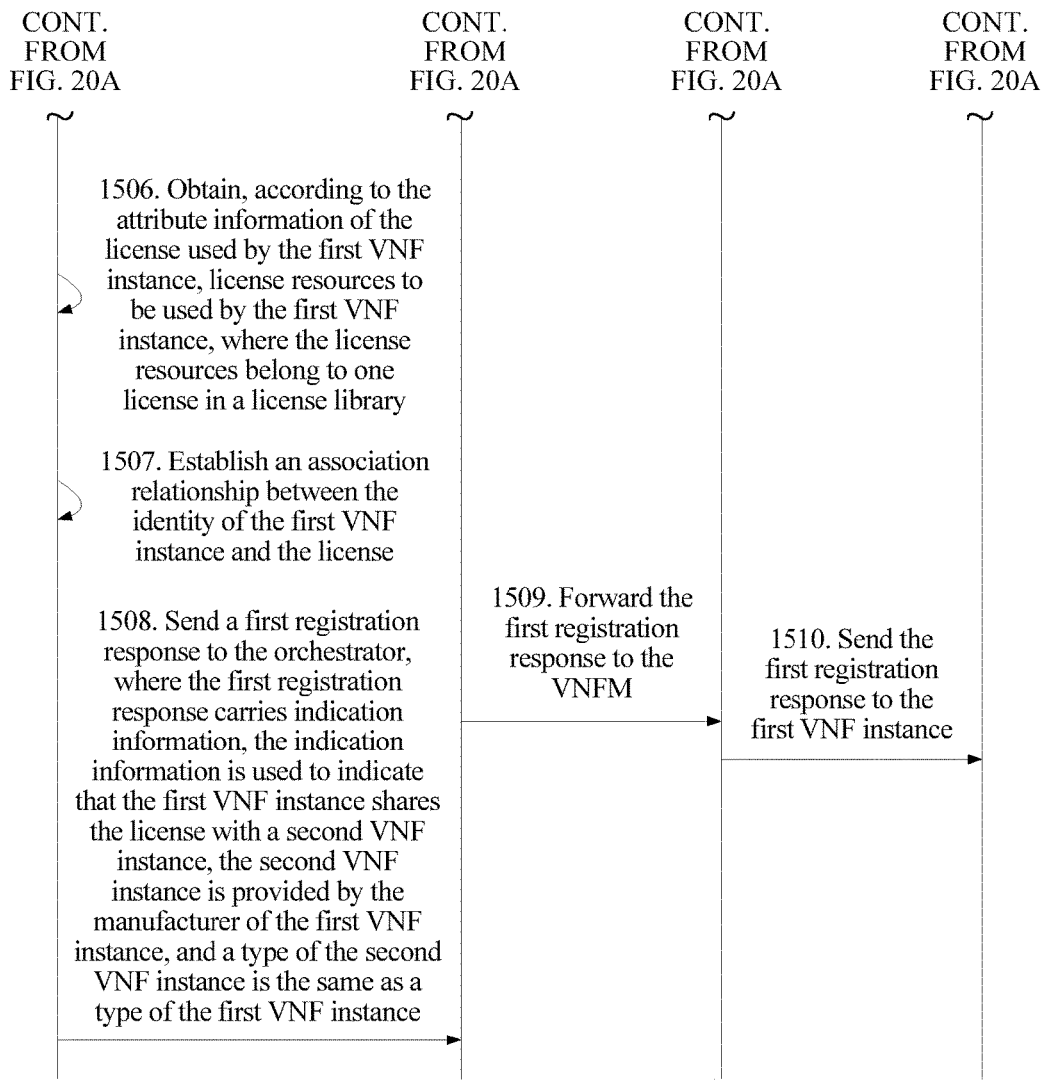

FIG. 20A and FIG. 20B are a signaling flowchart of a twelfth embodiment of a license sharing method according to an embodiment of the present disclosure. The embodiment is applicable to the network architecture shown in FIG. 4, and the method related to the embodiment is a specific process in which a VNF instance sends a first registration request to a license server using a VNFM and an orchestrator, so that the license server establishes an association relationship between an identity of a first VNF instance and a license and the first VNF instance may share one license with a second VNF instance. As shown in FIG. 20A and FIG. 20B, the method includes the following steps.

S1501. The license server sends a second registration request to the orchestrator, where the second registration request includes information indicating an access mode for accessing the orchestrator by the license server and information of a manufacturer of the license server.

It should be noted that, the orchestrator may manage multiple license servers.

Figure 5:
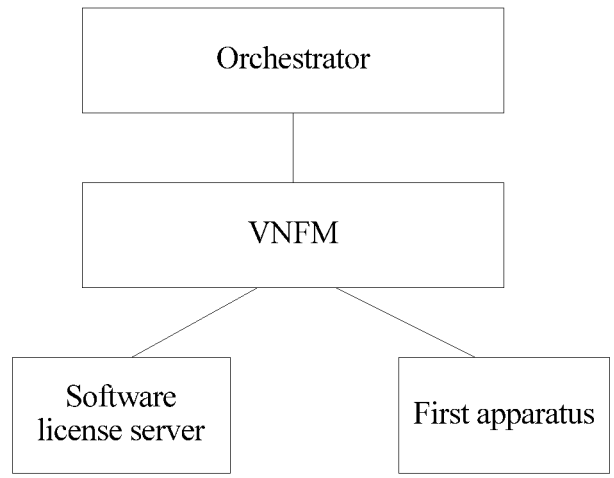
FIG. 5 is a fourth schematic diagram of a network topology of a license server and a first apparatus according to an embodiment of the present disclosure.
Figure 6:
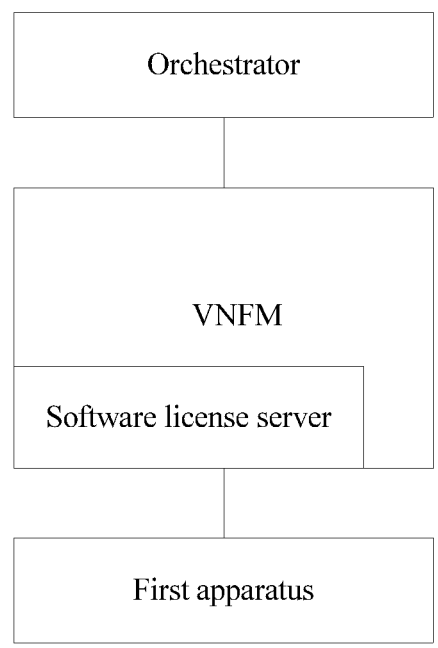
FIG. 6 is a fifth schematic diagram of a network topology of a license server and a first apparatus according to an embodiment of the present disclosure.

In the network architectures shown in FIG. 5 and FIG. 6, the license server first sends the second registration request to the VNFM, and the VNFM forwards the second registration request to the orchestrator. In the network architectures shown in FIG. 7 and FIG. 8, the license server first sends the second registration request to the EMS, the EMS forwards the second registration request to the VNFM, and finally, the VNFM forwards the second registration request to the orchestrator.

S1502. After verifying that the second registration request is valid, the orchestrator records the access mode for accessing the orchestrator by the license server and the information of the manufacturer of the license server.

S1503. The first VNF instance sends a first registration request to the VNFM, where the first registration request carries an identity of the first VNF instance, attribute information of a license used by the first VNF instance, and information of a manufacturer of the first VNF instance.

S1504. The VNFM forwards the received first registration request to the orchestrator.

S1505. The orchestrator forwards the first registration request to the license server of the manufacturer according to the information of the manufacturer of the first VNF instance.

Because information of a manufacturer of each license server exists on the orchestrator, the orchestrator can accurately send the first registration request to the license server manufactured by the manufacturer of the first VNF instance.

It should be noted that, in the network architectures shown in FIG. 5 and FIG. 6, the first VNF instance sends the first registration request to the VNFM, and the VNFM directly forwards the first registration request to the license server without using the orchestrator. In the network architectures shown in FIG. 7 and FIG. 8, the first VNF instance sends the first registration request to the VNFM, the VNFM directly forwards the first registration request to the EMS, and the EMS directly forwards the first registration request to the license server, without using the orchestrator.

S1506. The license server obtains, according to the attribute information of the license used by the first VNF instance, license resources to be used by the first VNF instance, where the license resources belong to one license in a license library.

S1507. The license server establishes an association relationship between the identity of the first VNF instance and the license.

S1508. The license server sends a first registration response to the orchestrator, where the first registration response carries indication information, the indication information is used to indicate that the first VNF instance shares the license with a second VNF instance, the second VNF instance is provided by the manufacturer of the first VNF instance, and a type of the second VNF instance is the same as a type of the first VNF instance.

S1509. The orchestrator forwards the first registration response to the VNFM.

S1510. The VNFM sends the first registration response to the first VNF instance.

It should be noted that, in the network architectures shown in FIG. 5 and FIG. 6, the license server directly sends the first registration response to the VNFM, and the VNFM directly sends the first registration response to the first VNF instance without using the orchestrator. In the network architectures shown in FIG. 7 and FIG. 8, the license server directly sends the first registration response to the EMS, the EMS forwards the first registration response to the VNFM, and then the VNFM directly sends the first registration response to the first VNF instance, without using the orchestrator.

Figure 21A:
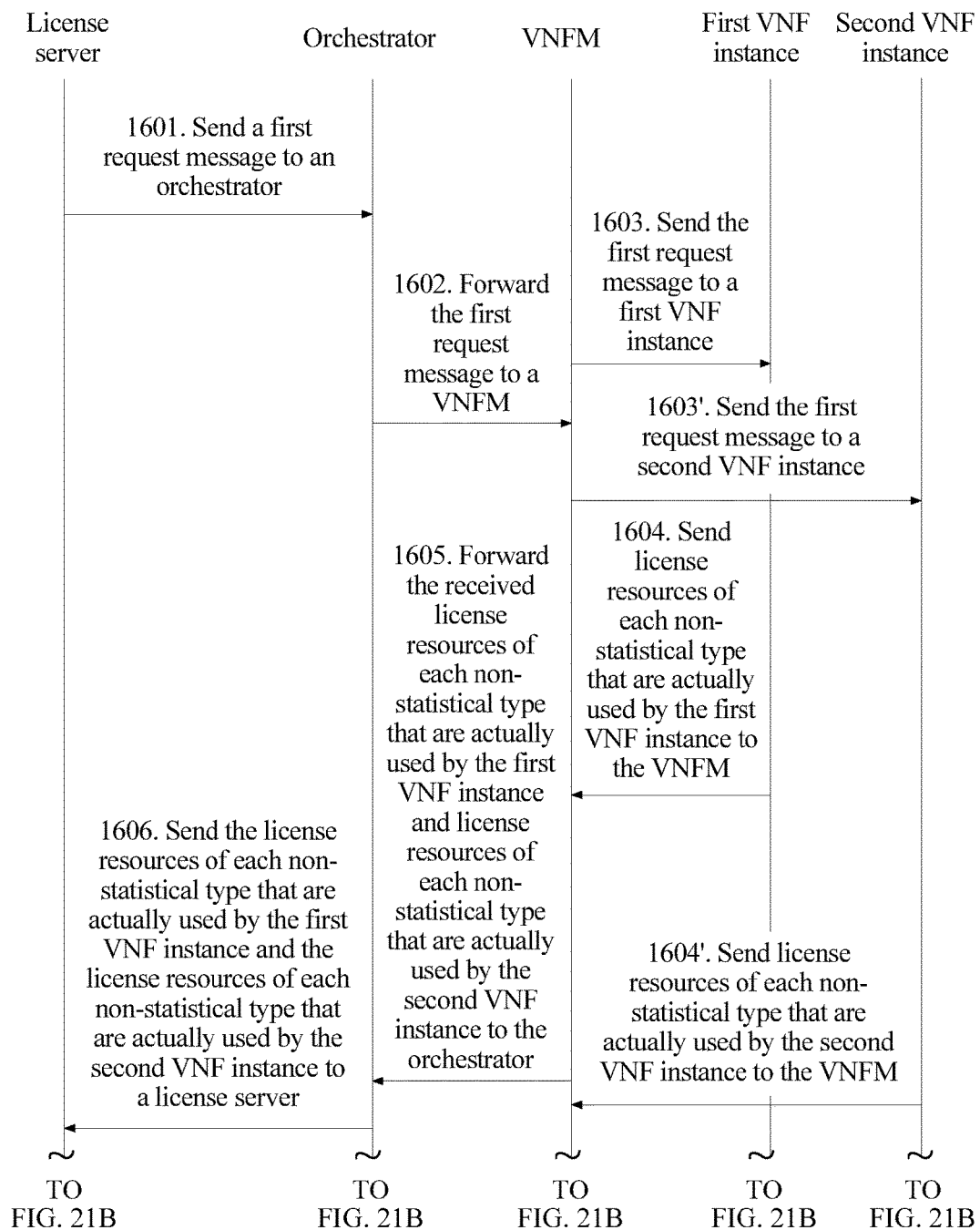
FIG. 21A and FIG. 21B are a signaling flowchart of a thirteenth embodiment of a license sharing method according to an embodiment of the present disclosure.
Figure 21B:
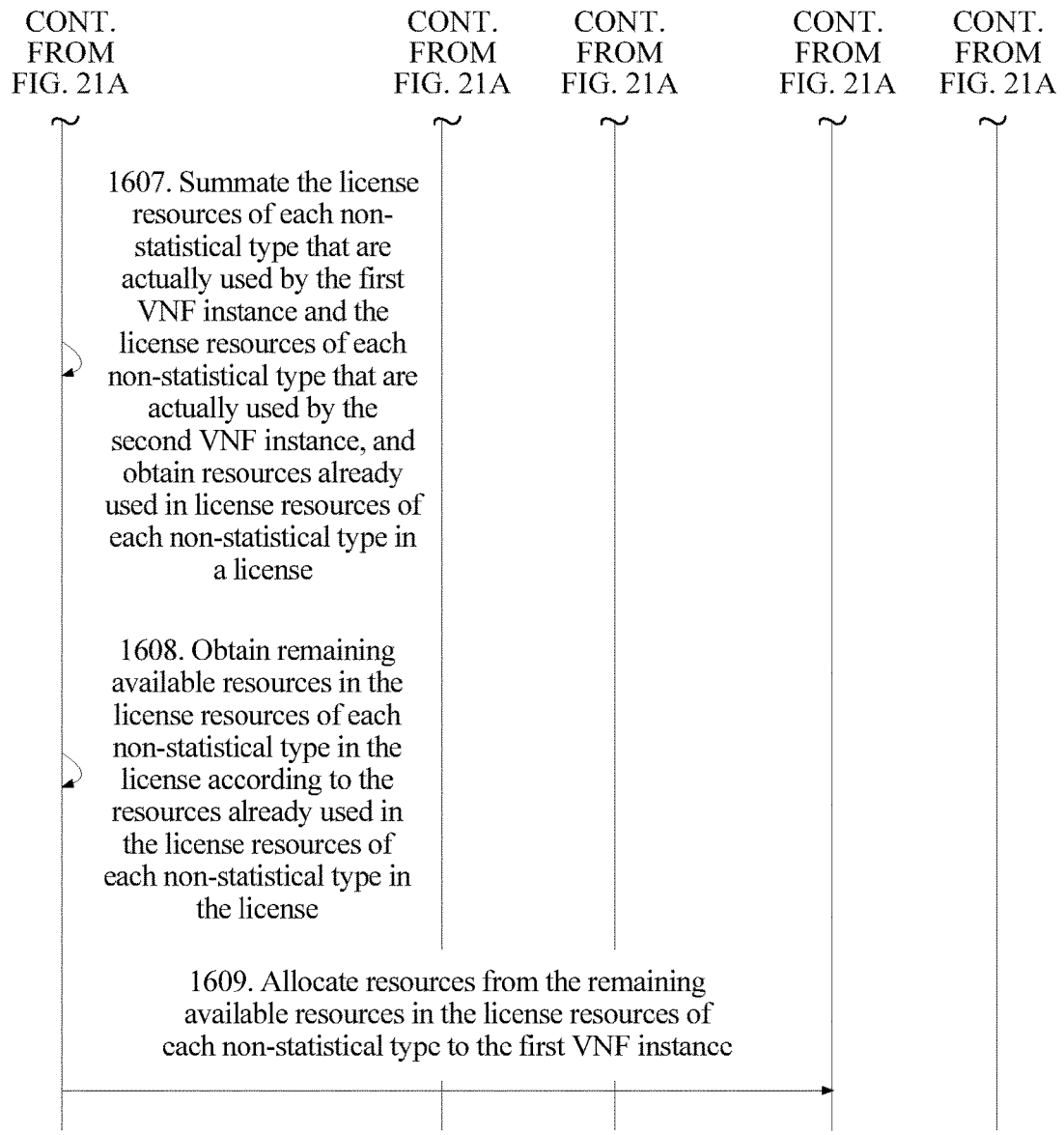

When the license server actively allocates license resources of a non-statistical type to the first VNF instance, for specific information interaction, reference may be made to a thirteenth embodiment shown in FIG. 21A and FIG. 21B. Optionally, the method shown in FIG. 21A and FIG. 21B may be performed after step S1510.

The method shown in FIG. 21A and FIG. 21B includes the following steps.

S1601. The license server sends a first request message to the orchestrator.

S1602. The orchestrator forwards the first request message to the VNFM.

S1603. The VNFM sends the first request message to the first VNF instance.

S1603'. The VNFM sends the first request message to the second VNF instance.

The first request message sent to the first VNF instance is used to obtain license resources of each non-statistical type that are actually used by the first VNF instance, and the first request message sent to the second VNF instance is used to obtain license resources of each non-statistical type that are actually used by the second VNF instance.

It should be noted that, in the network architectures shown in FIG. 5 and FIG. 6, the license server sends the first request message to the VNFM, and the VNFM sends the first request message to the first VNF instance and the second VNF instance separately without using the orchestrator. In the network architectures shown in FIG. 7 and FIG. 8, the license server sends the first request message to the EMS, the EMS forwards the first request message to the VNFM, and then the VNFM sends the first request message to the first VNF instance and the second VNF instance separately, without using the orchestrator.

S1604. The first VNF instance sends the license resources of each non-statistical type that are actually used by the first VNF instance to the VNFM.

S1604'. The second VNF instance sends the license resources of each non-statistical type that are actually used by the second VNF instance to the VNFM.

S1605. The VNFM forwards the received license resources of each non-statistical type that are actually used by the first VNF instance and license resources of each non-statistical type that are actually used by the second VNF instance to the orchestrator.

S1606. The orchestrator sends the license resources of each non-statistical type that are actually used by the first VNF instance and the license resources of each non-statistical type that are actually used by the second VNF instance to the license server.

It should be noted that, in the network architectures shown in FIG. 5 and FIG. 6, the first VNF instance and the second VNF instance respectively send the license resources of each non-statistical type that are actually used by the first VNF instance and the license resources of each non-statistical type that are actually used by the second VNF instance to the VNFM, and the VNFM directly forwards the license resources to the license server without using the orchestrator. In the network architectures shown in FIG. 7 and FIG. 8, the first VNF instance and the second VNF instance respectively send the license resources of each non-statistical type that are actually used by the first VNF instance and the license resources of each non-statistical type that are actually used by the second VNF instance to the VNFM, the VNFM forwards the license resources to the EMS, and then the EMS forwards the license resources to the license server, without using the orchestrator.

S1607. The license server summates the license resources of each non-statistical type that are actually used by the first VNF instance and the license resources of each non-statistical type that are actually used by the second VNF instance, to obtain resources already used in license resources of each non-statistical type in the license.

S1608. The license server obtains remaining available resources in the license resources of each non-statistical type in the license according to the resources already used in the license resources of each non-statistical type in the license.

S1609. The license server allocates resources from the remaining available resources in the license resources of each non-statistical type to the first VNF instance.

Figure 22A:
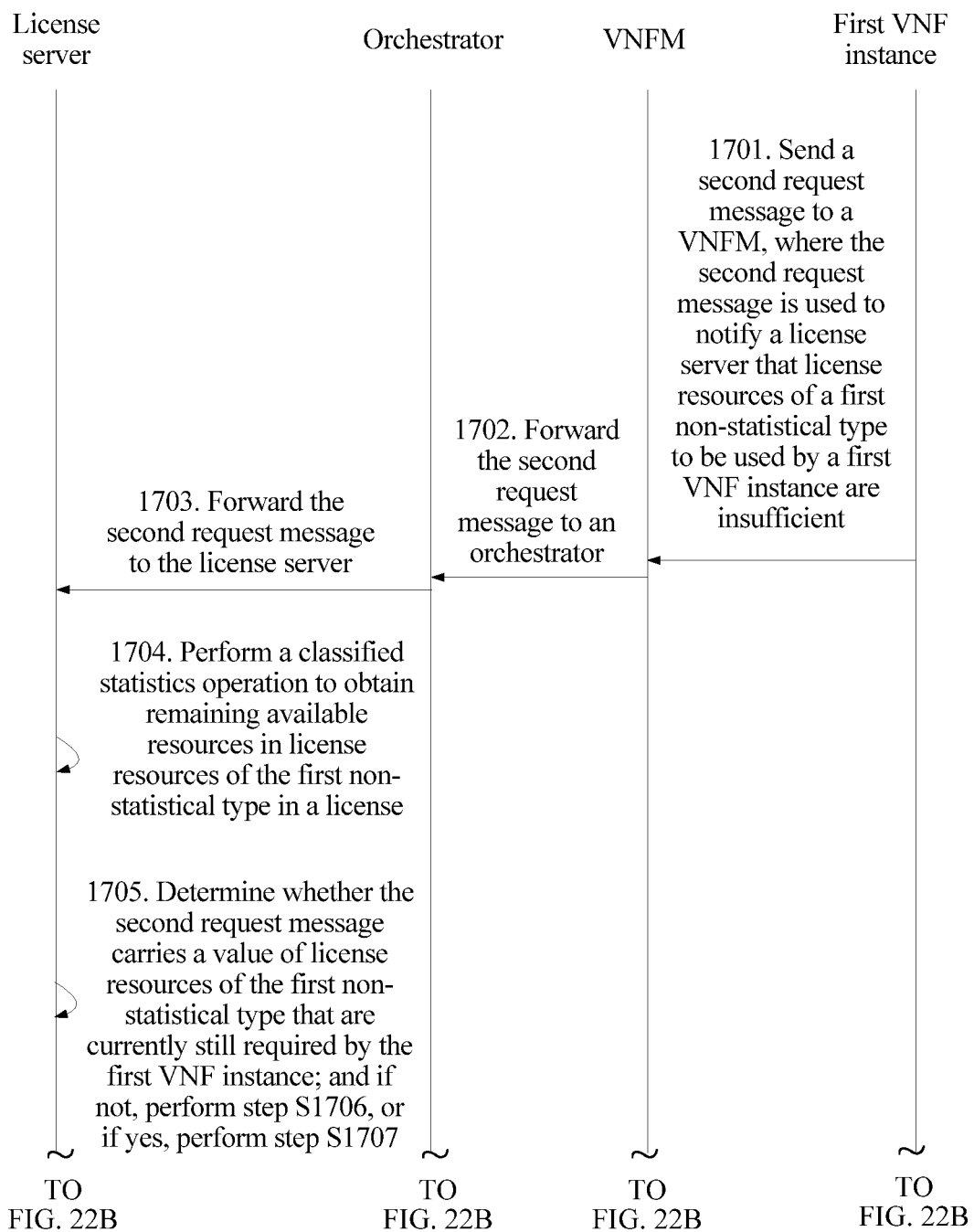
FIG. 22A and FIG. 22B are a signaling flowchart of a fourteenth embodiment of a license sharing method according to an embodiment of the present disclosure.
Figure 22B:
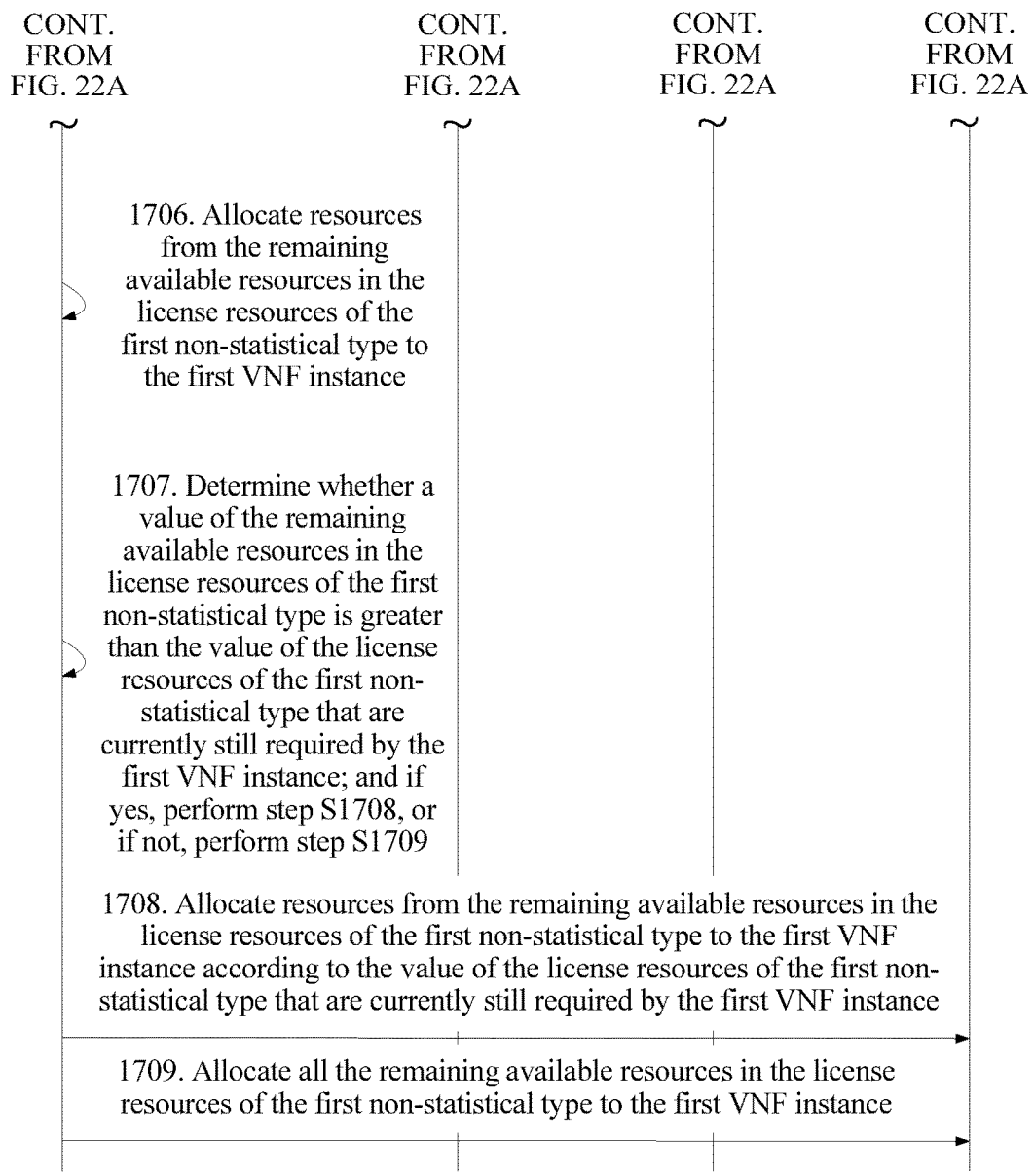

When license resources of a first non-statistical type to be used by the first VNF instance are insufficient, for information interaction between the license server and the first VNF instance, reference may be made to a fourteenth embodiment shown in FIG. 22A and FIG. 22B, as follows.

S1701. The first VNF instance sends a second request message to the VNFM, where the second request message is used to notify the license server that the license resources of the first non-statistical type to be used by the first VNF instance are insufficient.

S1702. The VNFM forwards the second request message to the orchestrator.

S1703. The orchestrator forwards the second request message to the license server.

It should be noted that, in the network architectures shown in FIG. 5 and FIG. 6, the first VNF instance sends the second request message to the VNFM, and the VNFM directly forwards the second request message to the license server without using the orchestrator. In the network architectures shown in FIG. 7 and FIG. 8, the first VNF instance sends the second request message to the VNFM, the VNFM directly forwards the second request message to the EMS, and the EMS directly forwards the second request message to the license server, without using the orchestrator.

S1704. The license server performs the foregoing classified statistics operation to obtain remaining available resources in license resources of the first non-statistical type in the license.

S1705. The license server determines whether the second request message carries a value of license resources of the first non-statistical type that are currently still required by the first VNF instance. If not, step S1706 is performed, or if yes, step S1707 is performed.

S1706. The license server allocates resources from the remaining available resources in the license resources of the first non-statistical type to the first VNF instance.

S1707. The license server determines whether a value of the remaining available resources in the license resources of the first non-statistical type is greater than the value of the license resources of the first non-statistical type that are currently still required by the first VNF instance. If yes, step S1708 is performed, or if not, step S1709 is performed.

S1708. The license server allocates resources from the remaining available resources in the license resources of the first non-statistical type to the first VNF instance according to the value of the license resources of the first non-statistical type that are currently still required by the first VNF instance.

S1709. The license server allocates all the remaining available resources in the license resources of the first non-statistical type to the first VNF instance.

It should be noted that, the embodiments shown in FIG. 21A and FIG. 21B, FIG. 22A and FIG. 22B, and FIG. 23 mainly show how information interaction is performed between the VNF instance and the license server using the orchestrator and the VNFM. For specific technical solutions of the embodiments, reference may be made to descriptions of the embodiments in FIG. 1 to FIG. 12. Details are not further described herein.

Figure 23:
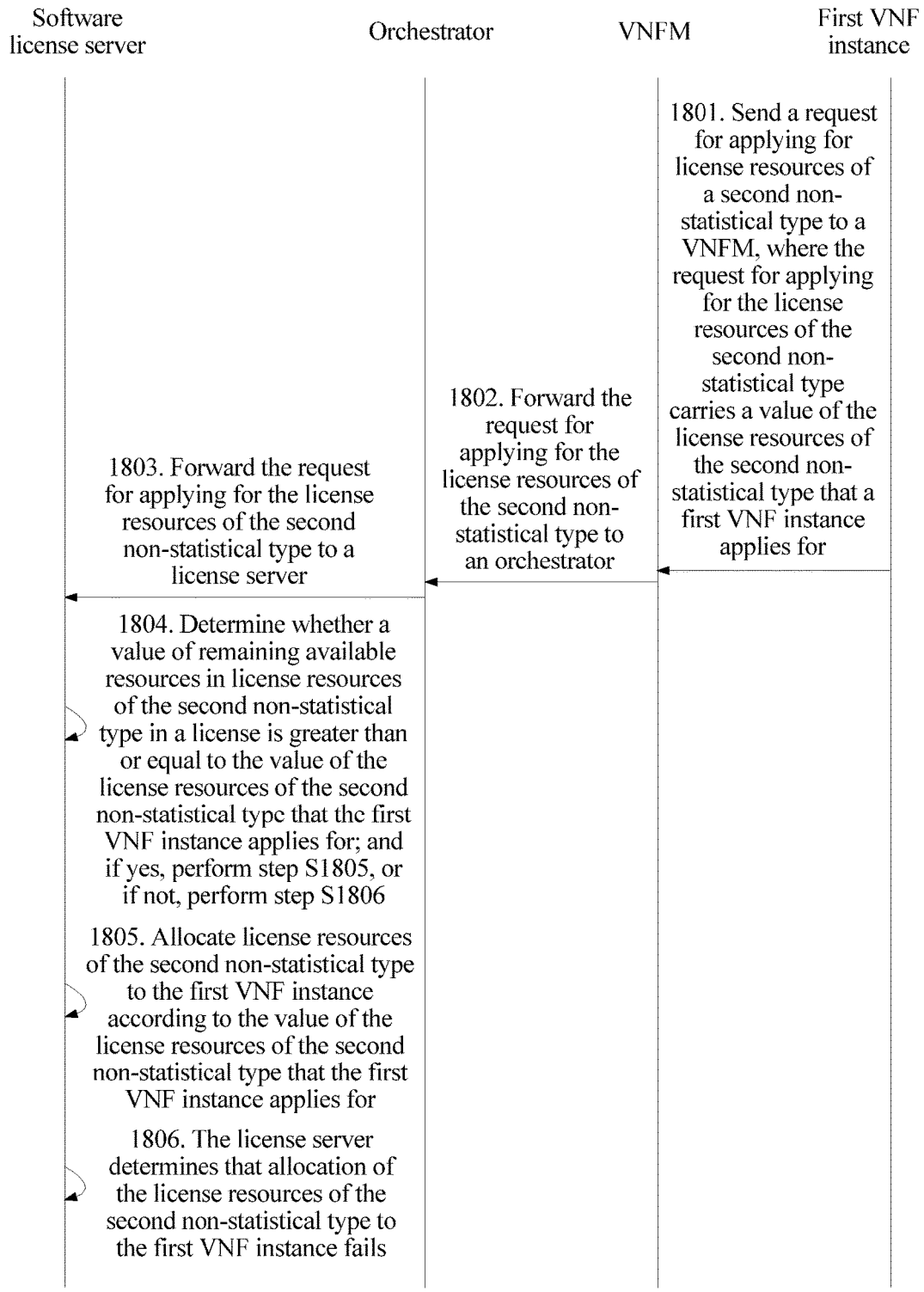
FIG. 23 is a signaling flowchart of a fifteenth embodiment of a license sharing method according to an embodiment of the present disclosure.

FIG. 23 is a signaling flowchart of a fifteenth embodiment of a license sharing method according to an embodiment of the present disclosure. The method related to the embodiment is a specific process in which the first VNF instance actively applies for license resources in the license from the license server according to a requirement after the first VNF instance receives the first registration response sent by the license server. Optionally, the method shown in FIG. 23 may be performed after step S1510.

The method shown in FIG. 23 includes the following steps.

S1801. The first VNF instance sends a request for applying for license resources of a second non-statistical type to the VNFM, where the request for applying for the license resources of the second non-statistical type carries a value of the license resources of the second non-statistical type that the first VNF instance applies for.

S1802. The VNFM forwards the request for applying for the license resources of the second non-statistical type to the orchestrator.

S1803. The orchestrator forwards the request for applying for the license resources of the second non-statistical type to the license server.

It should be noted that, in the network architectures shown in FIG. 5 and FIG. 6, the first VNF instance sends the request for applying for the license resources of the second non-statistical type to the VNFM, and the VNFM directly forwards the request to the license server without using the orchestrator. In the network architectures shown in FIG. 7 and FIG. 8, the first VNF instance sends the request for applying for the license resources of the second non-statistical type to the VNFM, the VNFM directly forwards the request to the EMS, and the EMS directly forwards the request to the license server, without using the orchestrator.

S1804. The license server determines whether a value of remaining available resources in license resources of the second non-statistical type in the license is greater than or equal to the value of the license resources of the second non-statistical type that the first VNF instance applies for. If yes, step S1805 is performed, or if not, step S1806 is performed.

S1805. The license server allocates license resources of the second non-statistical type to the first VNF instance according to the value of the license resources of the second non-statistical type that the first VNF instance applies for.

S1806. The license server determines that allocation of the license resources of the second non-statistical type to the first VNF instance fails.

Figure 24:
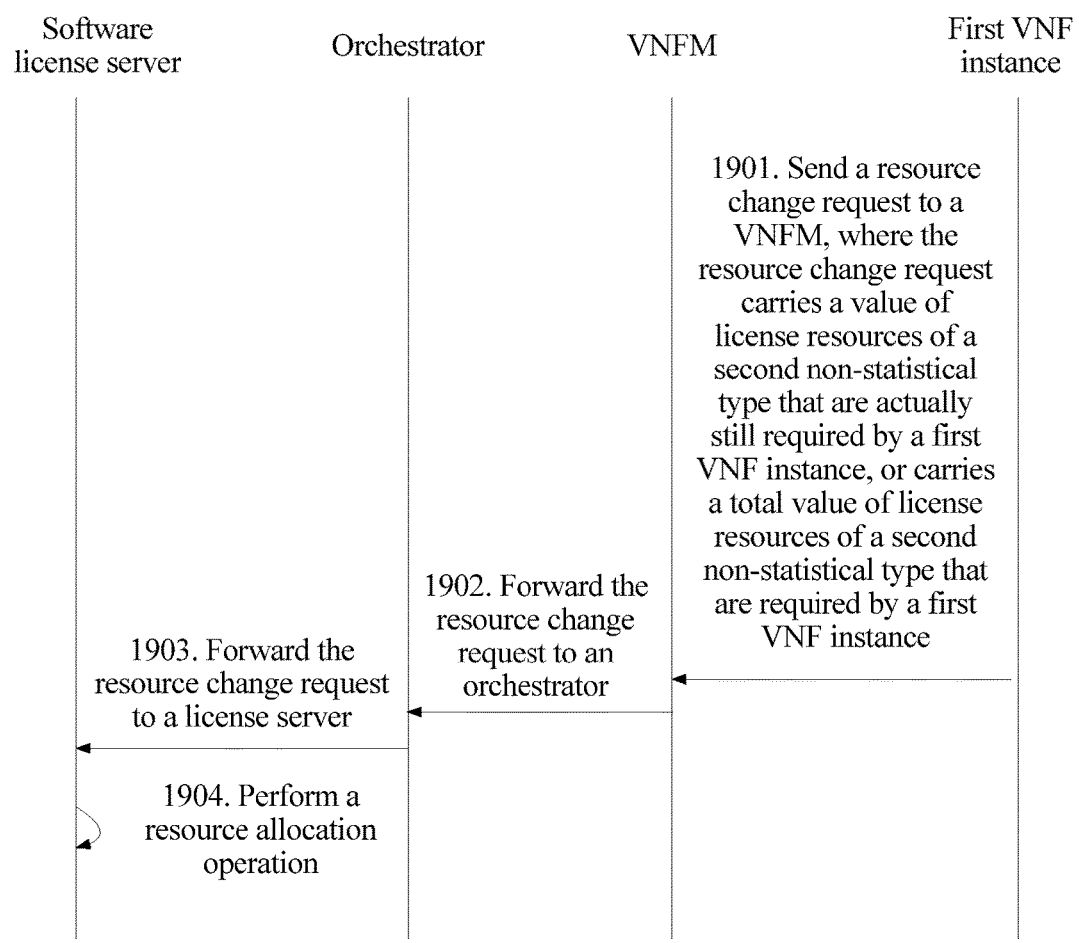
FIG. 24 is a signaling flowchart of a sixteenth embodiment of a license sharing method according to an embodiment of the present disclosure.

When the license resources of the second non-statistical type that are allocated by the license server to the first VNF instance do not match a resource value actually required by the first VNF instance, the first VNF instance needs to send a resource change request to the license server. For details, reference may be made to a sixteenth embodiment shown in FIG. 24, as follows.

S1901. The first VNF instance sends a resource change request to the VNFM, where the resource change request carries a value of license resources of the second non-statistical type that are actually still required by the first VNF instance, or carries a total value of license resources of the second non-statistical type that are required by the first VNF instance.

S1902. The VNFM forwards the resource change request to the orchestrator.

S1903. The orchestrator forwards the resource change request to the license server.

It should be noted that, in the network architectures shown in FIG. 5 and FIG. 6, the first VNF instance sends the resource change request to the VNFM, and the VNFM directly forwards the resource change request to the license server without using the orchestrator. In the network architectures shown in FIG. 7 and FIG. 8, the first VNF instance sends the resource change request to the VNFM, the VNFM directly forwards the resource change request to the EMS, and the EMS directly forwards the resource change request to the license server, without using the orchestrator.

S1904. The license server performs the foregoing resource allocation operation.

It should be noted that, the embodiment mainly shows how information interaction is performed between the VNF instance and the license server using the orchestrator and the VNFM. For a specific technical solution of the embodiment, reference may be made to descriptions of the embodiments shown in FIG. 13 to FIG. 15. Details are not further described herein.

Figure 25:
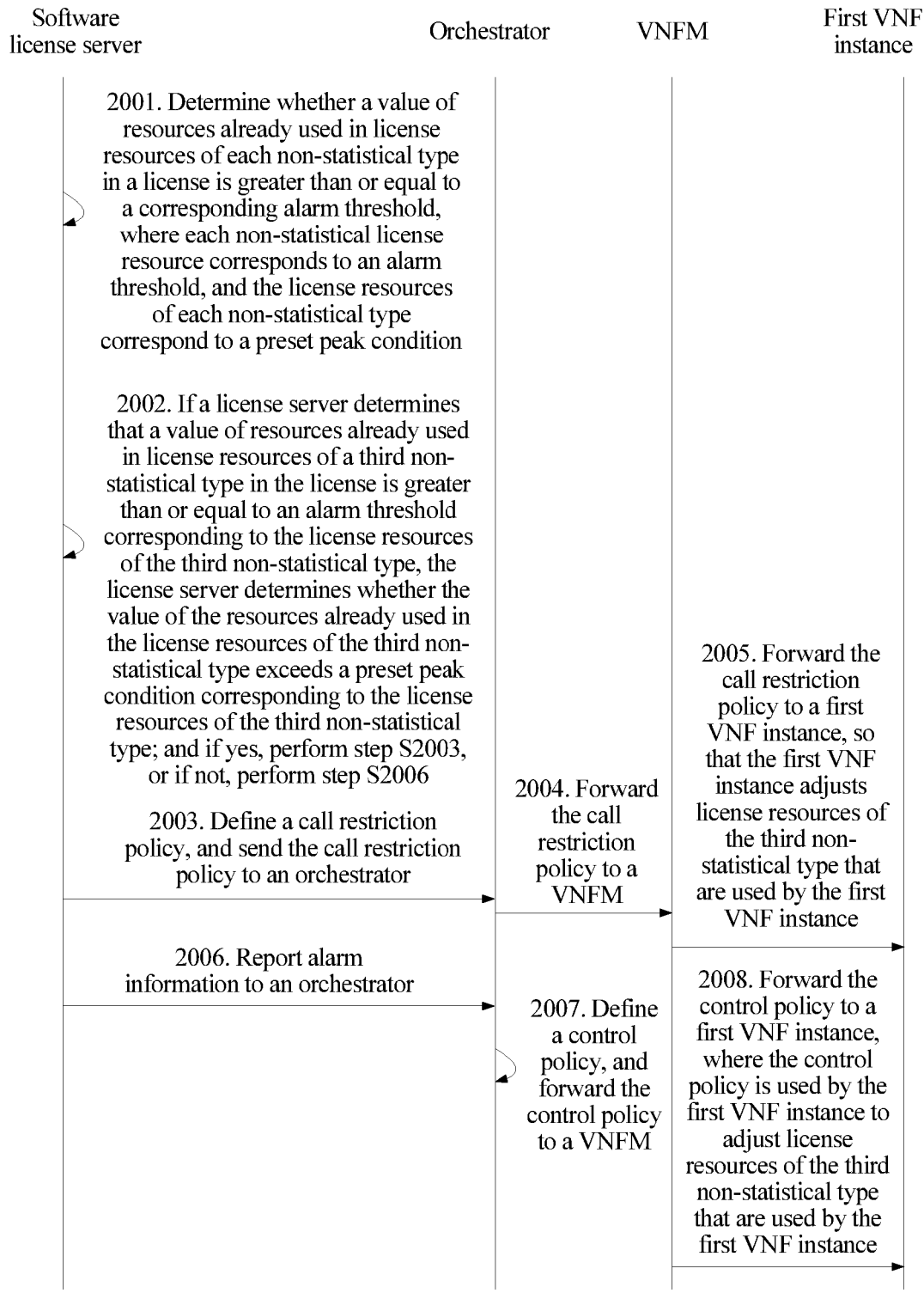
FIG. 25 is a signaling flowchart of a seventeenth embodiment of a license sharing method according to an embodiment of the present disclosure.

FIG. 25 is a signaling flowchart of a seventeenth embodiment of a license sharing method according to an embodiment of the present disclosure. The method related to the embodiment is a specific process in which the license server determines, in real time or periodically, whether a value of resources already used in the license resources of each non-statistical type in the license exceeds an alarm threshold or a preset peak condition. Optionally, the method shown in FIG. 25 may be performed after step S1605.

The method shown in FIG. 25 includes the following steps.

S2001. The license server determines whether a value of the resources already used in the license resources of each non-statistical type in the license is greater than or equal to a corresponding alarm threshold, where the license resources of each non-statistical type correspond to an alarm threshold, and the license resources of each non-statistical type correspond to a preset peak condition.

S2002. If the license server determines that a value of resources already used in license resources of a third non-statistical type in the license is greater than or equal to an alarm threshold corresponding to the license resources of the third non-statistical type, the license server determines whether the value of the resources already used in the license resources of the third non-statistical type exceeds a preset peak condition corresponding to the license resources of the third non-statistical type. If yes, step S2003 is performed, or if not, step S2006 is performed.

S2003. The license server defines a call restriction policy, and sends the call restriction policy to the orchestrator.

S2004. The orchestrator forwards the call restriction policy to the VNFM.

S2005. The VNFM forwards the call restriction policy to the first VNF instance, so that the first VNF instance adjusts, according to the call restriction policy, license resources of the third non-statistical type that are used by the first VNF instance.

It should be noted that, in the network architectures shown in FIG. 5 and FIG. 6, the license server directly sends the call restriction policy to the VNFM, and the VNFM sends the call restriction policy to the first VNF instance without using the orchestrator. In the network architectures shown in FIG. 7 and FIG. 8, the license server sends the call restriction policy to the EMS, the EMS forwards the call restriction policy to the VNFM, and then the VNFM directly sends the call restriction policy to the first VNF instance, without using the orchestrator.

S2006. The license server reports alarm information to the orchestrator.

S2007. The orchestrator defines a control policy, and forwards the control policy to the VNFM.

S2008. The VNFM forwards the control policy to the first VNF instance, where the control policy is used to instruct the first VNF instance to adjust license resources of the third non-statistical type that are used by the first VNF instance.

Figure 4:
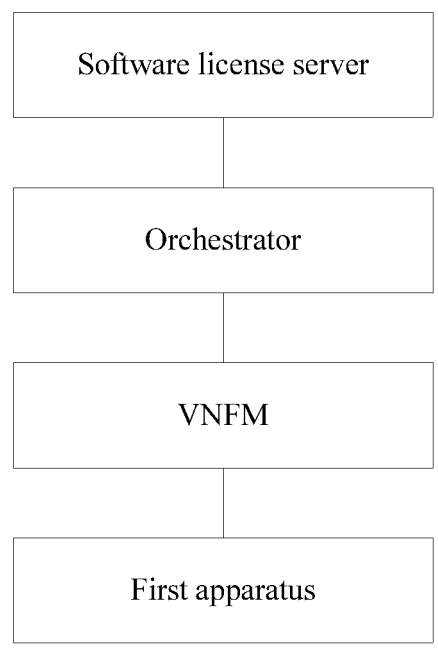
FIG. 4 is a third schematic diagram of a network topology of a license server and a first apparatus according to an embodiment of the present disclosure.

It should be noted that, regardless of the network architecture shown in FIG. 4 or the network architectures shown in FIG. 5 to FIG. 8, the control policy is defined by the orchestrator, and therefore, the orchestrator must be used.

It should be noted that, the embodiment mainly shows how information interaction is performed between the VNF instance and the license server using the orchestrator and the VNFM. For a specific technical solution of the embodiment, reference may be made to descriptions of the embodiment shown in FIG. 17. Details are not further described herein.

Figure 26A:
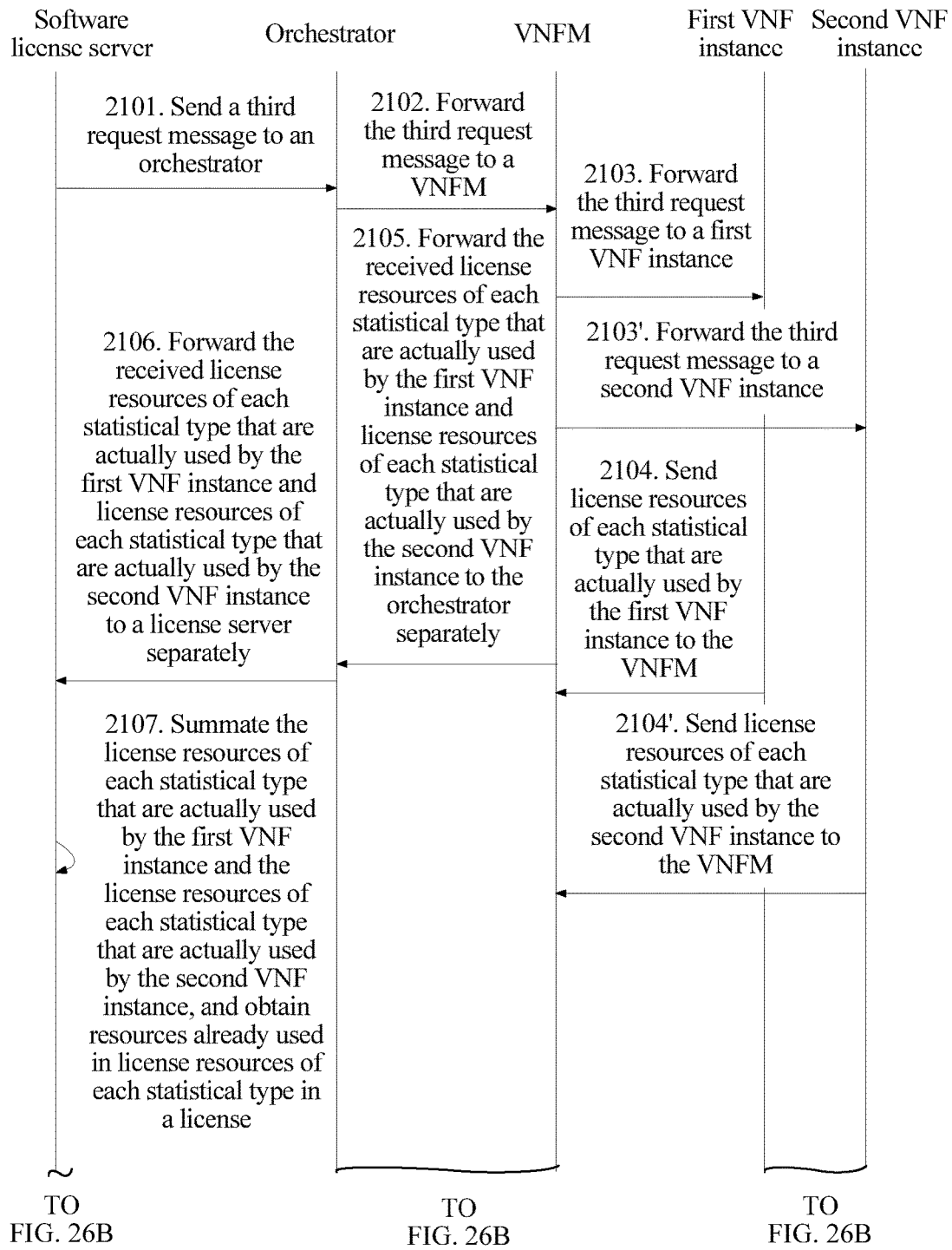
Figure 26C:
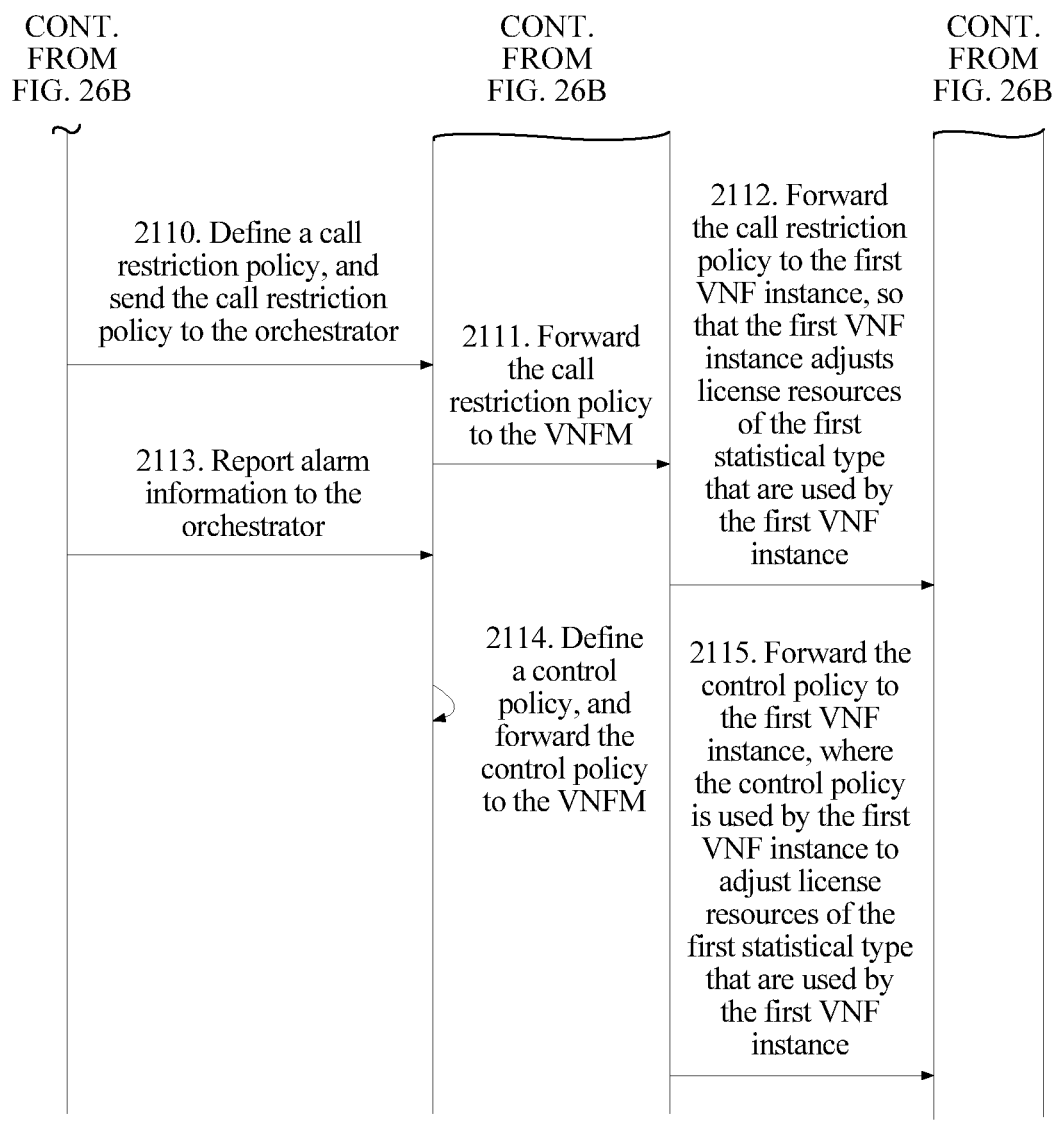

FIG. 26A, FIG. 26B, and FIG. 26C are a signaling flowchart of an eighteenth embodiment of a license sharing method according to an embodiment of the present disclosure. The method related to the embodiment is a specific process in which the license server determines, in real time or periodically, whether a value of resources already used in license resources of each statistical type in the license exceeds an alarm threshold or a preset peak condition. Optionally, the method shown in FIG. 26A, FIG. 26B, and FIG. 26C may be performed after step S1510.

The method shown in FIG. 26A, FIG. 26B, and FIG. 26C includes the following steps.

S2101. The license server sends a third request message to the orchestrator.

S2102. The orchestrator forwards the third request message to the VNFM.

S2103. The VNFM forwards the third request message to the first VNF instance.

S2103'. The VNFM forwards the third request message to the second VNF instance.

The third request message sent to the first VNF instance is used to obtain license resources of each statistical type that are actually used by the first VNF instance, and the third request message sent to the second VNF instance is used to obtain license resources of each statistical type that are actually used by the second VNF instance.

It should be noted that, in the network architectures shown in FIG. 5 and FIG. 6, the license server sends the third request message to the VNFM, and the VNFM sends the third request message to the first VNF instance and the second VNF instance separately without using the orchestrator. In the network architectures shown in FIG. 7 and FIG. 8, the license server sends the third request message to the EMS, the EMS forwards the third request message to the VNFM, and then the VNFM sends the third request message to the first VNF instance and the second VNF instance separately, without using the orchestrator.

S2104. The first VNF instance sends the license resources of each statistical type that are actually used by the first VNF instance to the VNFM.

S2104'. The second VNF instance sends the license resources of each statistical type that are actually used by the second VNF instance to the VNFM.

S2105. The VNFM forwards the received license resources of each statistical type that are actually used by the first VNF instance and license resources of each statistical type that are actually used by the second VNF instance to the orchestrator separately.

S2106. The orchestrator forwards the received license resources of each statistical type that are actually used by the first VNF instance and license resources of each statistical type that are actually used by the second VNF instance to the license server separately.

It should be noted that, in the network architectures shown in FIG. 5 and FIG. 6, the first VNF instance and the second VNF instance respectively send the license resources of each statistical type that are actually used by the first VNF instance and the license resources of each statistical type that are actually used by the second VNF instance to the VNFM, and the VNFM forwards the license resources to the license server without using the orchestrator. In the network architectures shown in FIG. 7 and FIG. 8, the first VNF instance and the second VNF instance respectively send the license resources of each statistical type that are actually used by the first VNF instance and the license resources of each statistical type that are actually used by the second VNF instance to the VNFM, the VNFM forwards the license resources to the EMS, and then the EMS forwards the license resources to the license server, without using the orchestrator.

S2107. The license server summates the license resources of each statistical type that are actually used by the first VNF instance and the license resources of each statistical type that are actually used by the second VNF instance, to obtain resources already used in the license resources of each statistical type in the license.

S2108. The license server determines whether a value of the resources already used in the license resources of each statistical type in the license is greater than or equal to a corresponding alarm threshold, where the license resources of each statistical type correspond to an alarm threshold, and the license resources of each statistical type correspond to a preset peak condition.

S2109. If the license server determines that a value of resources already used in license resources of a first statistical type in the license is greater than or equal to an alarm threshold corresponding to the license resources of the first statistical type, the license server determines whether the value of the resources already used in the license resources of the first statistical type exceeds a preset peak condition corresponding to the license resources of the first statistical type. If yes, step S2110 is performed, or if not, step 2113 is performed.

S2110. The license server defines a call restriction policy, and sends the call restriction policy to the orchestrator.

S2111. The orchestrator forwards the call restriction policy to the VNFM.

S2112. The VNFM forwards the call restriction policy to the first VNF instance, so that the first VNF instance adjusts, according to the call restriction policy, license resources of the first statistical type that are used by the first VNF instance.

It should be noted that, in the network architectures shown in FIG. 5 and FIG. 6, the license server sends the call restriction policy to the VNFM, and the VNFM sends the call restriction policy to the first VNF instance without using the orchestrator. In the network architectures shown in FIG. 7 and FIG. 8, the license server sends the call restriction policy to the EMS, the EMS forwards the call restriction policy to the VNFM, and then the VNFM sends the call restriction policy to the first VNF instance, without using the orchestrator.

S2113. The license server reports alarm information to the orchestrator.

S2114. The orchestrator defines a control policy, and forwards the control policy to the VNFM.

S2115. The VNFM forwards the control policy to the first VNF instance, where the control policy is used to instruct the first VNF instance to adjust license resources of the first statistical type that are used by the first VNF instance.

It should be noted that, regardless of the network architecture shown in FIG. 4 or the network architectures shown in FIG. 5 to FIG. 8, the control policy is defined by the orchestrator, and therefore, the orchestrator must be used.

It should be noted that, the embodiment mainly shows how information interaction is performed between the VNF instance and the license server using the orchestrator and the VNFM. For a specific technical solution of the embodiment, reference may be made to descriptions of the embodiment shown in FIG. 18A and FIG. 18B. Details are not further described herein.

Figure 27:
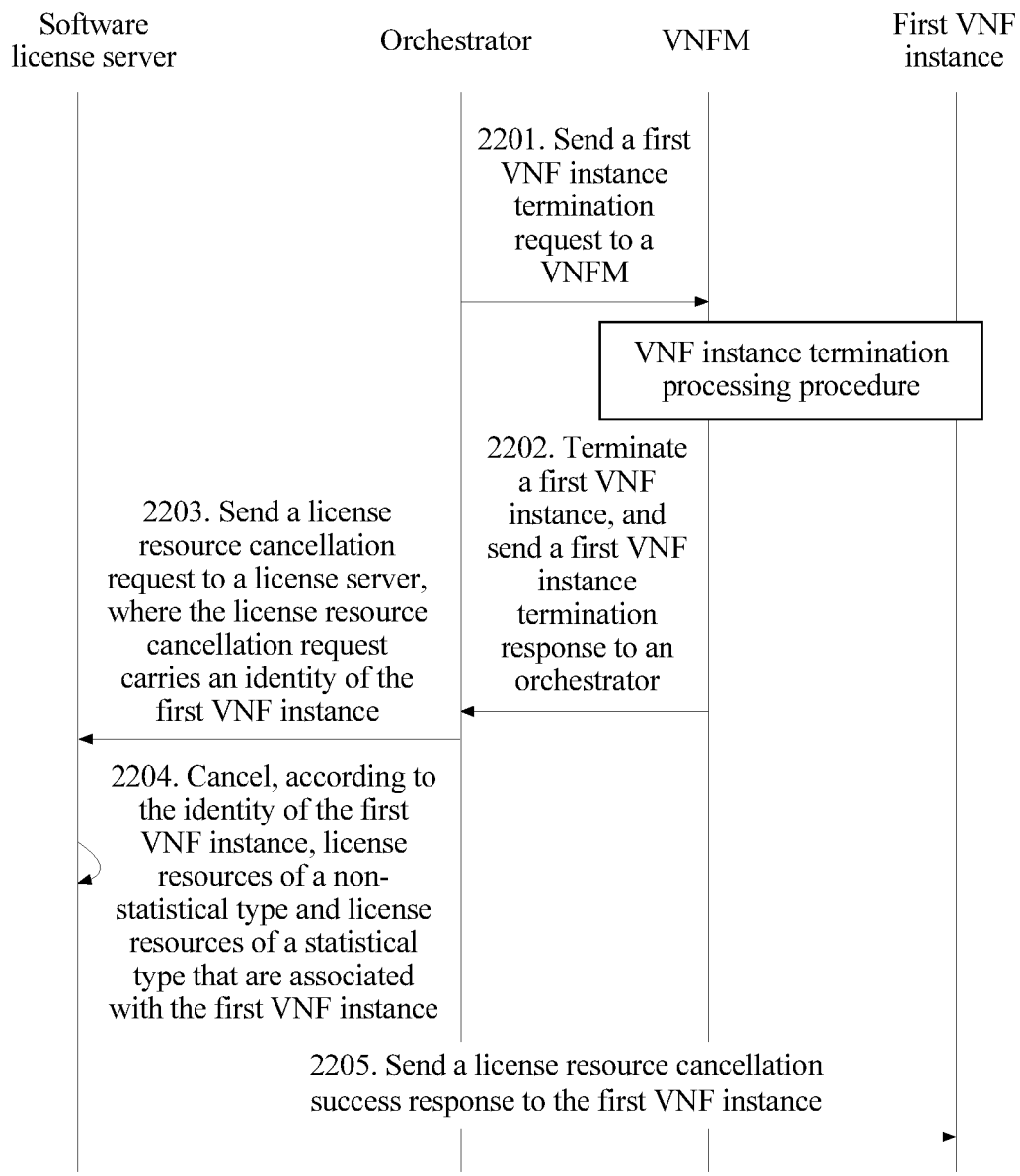
FIG. 27 is a signaling flowchart of a nineteenth embodiment of a license sharing method according to an embodiment of the present disclosure.

FIG. 27 is a signaling flowchart of a nineteenth embodiment of a license sharing method according to an embodiment of the present disclosure. The method related to the embodiment is a specific process in which the license server cancels the association relationship between the license and the first VNF instance according to a license resource cancellation request sent by the first VNF instance, so as to release license resources in the license. The embodiment is applicable to the network architecture shown in FIG. 4. As shown in FIG. 27, the method includes the following steps.

S2201. The orchestrator sends a first VNF instance termination request to the VNFM.

S2202. The VNFM terminates the first VNF instance, and sends a first VNF instance termination response to the orchestrator.

S2203. The orchestrator sends a license resource cancellation request to the license server, where the license resource cancellation request carries the identity of the first VNF instance.

It should be noted that, in the network architectures shown in FIG. 5 and FIG. 6, the license resource cancellation request is sent by the VNFM to the license server, and because the license server is embedded in the VNFM in FIG. 6, the license resource cancellation request may be considered as an internal message. In the network architectures shown in FIG. 7 and FIG. 8, the license resource cancellation request is sent by the VNFM to the EMS, and is forwarded to the license server by the EMS.

S2204. The license server cancels, according to the identity of the first VNF instance, license resources of a non-statistical type and license resources of a statistical type that are associated with the first VNF instance.

S2205. The license server sends a license resource cancellation success response to the first VNF instance.

It should be noted that, the embodiment mainly shows how information interaction is performed between the VNF instance and the license server using the orchestrator and the VNFM. For a specific technical solution of the embodiment, reference may be made to descriptions of the embodiment shown in FIG. 19. Details are not further described herein.

Figure 28:
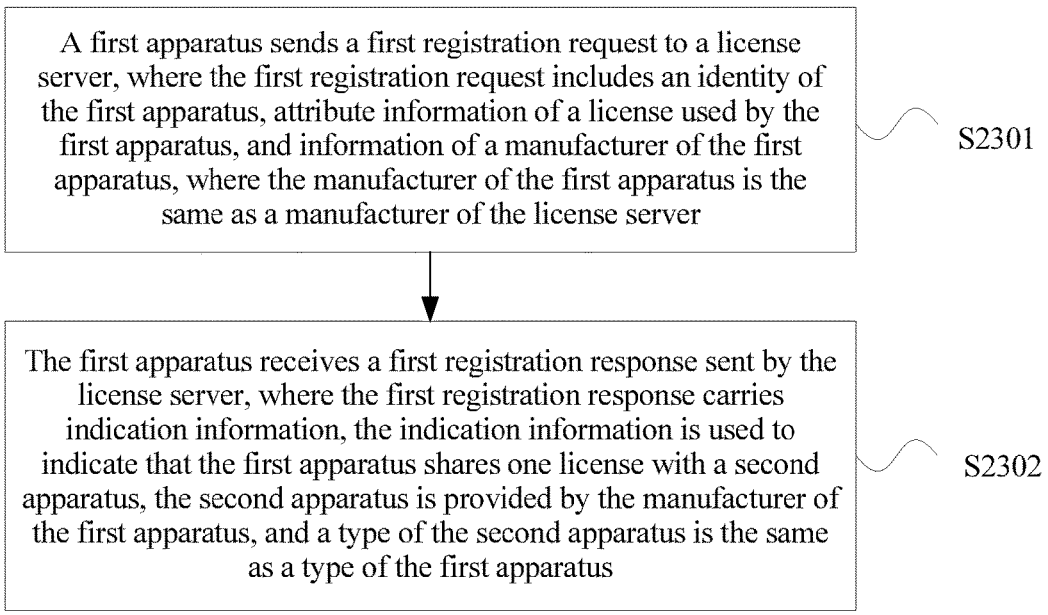
FIG. 28 is a schematic flowchart of a twentieth embodiment of a license sharing method according to an embodiment of the present disclosure.

FIG. 28 is a schematic flowchart of a twentieth embodiment of a license sharing method according to an embodiment of the present disclosure. The method is performed by a first apparatus, and the method is applicable to any network topology shown in FIG. 2 to FIG. 8. In addition, when the first apparatus is a physical network element or a virtual network element, for a management apparatus corresponding to the first apparatus, reference may also be made to specific content in the first embodiment shown in FIG. 1, and details are not further described herein.

As shown in FIG. 28, the method includes the following steps.

S2301. A first apparatus sends a first registration request to a license server, where the first registration request includes an identity of the first apparatus, attribute information of a license used by the first apparatus, and information of a manufacturer of the first apparatus, where the manufacturer of the first apparatus is the same as a manufacturer of the license server.

The first apparatus may directly send the first registration request to the license server, or may send the first registration request to the license server using the management apparatus. In addition, a quantity of first apparatuses is not limited in the embodiment and subsequent embodiments of the present disclosure. In the embodiment of the present disclosure, there may be only one first apparatus, or there may be multiple first apparatuses.

The attribute information of the license may be a name of the first apparatus using the license, or may be a version number of the license. The name of the first apparatus may be the identity of the first apparatus, and the identity of the first apparatus is used to identify the first apparatus. It should be noted that, the manufacturer of the first apparatus sending the first registration request to the license server is the same as the manufacturer of the license server. That is, the first apparatus needs to send the first registration request to the license server manufactured by the manufacturer of the first apparatus.

In the embodiment of the present disclosure, the information of the manufacturer may be a name of the manufacturer.

S2302. The first apparatus receives a first registration response sent by the license server, where the first registration response carries indication information, the indication information is used to indicate that the first apparatus shares one license with a second apparatus, the second apparatus is provided by the manufacturer of the first apparatus, and a type of the second apparatus is the same as a type of the first apparatus.

When the license server receives the first registration request, the license server searches a license library according to the attribute information of the license used by the first apparatus, to obtain license resources to be used by the first apparatus. The license resources belong to one license in the license library. For details, reference may be made to content shown in Table 1. Details are not further described herein.

Afterward, the license server establishes an association relationship between the identity of the first apparatus and the license, for indicating that a certain license resource in the license may be used by the first apparatus. It should be noted that, the license may include multiple license resources, and first apparatuses having different identities may use different license resources. However, because the license resources belong to the same license, this is equivalent to sharing the license by the first apparatuses having different identities. The association relationship may be shown in the foregoing Table 2, and is not further described herein.

After establishing the association relationship, the license server sends the first registration response carrying the indication information to the first apparatus. The indication information is used to indicate to the first apparatus that the first apparatus may share the license with the second apparatus. Herein, a manufacturer of the second apparatus is the same as the manufacturer of the first apparatus, and the type of the second apparatus is also the same as the type of the first apparatus. In addition, in the embodiment, the first apparatus may share one license with the second apparatus. Herein, a sharing time point is not limited, that is, the first apparatus and the second apparatus may share one license at a same time point, or may share one license at different time points.

In the license sharing method provided by the embodiment of the present disclosure, a first apparatus sends a first registration request to a license server, so that the license server may obtain, according to attribute information of a license in the first registration request, license resources to be used by the first apparatus, where the license resources belong to one license in a license library; in addition, after establishing an association relationship between an identity of the first apparatus and the license, the license server sends, to the first apparatus, a first registration response carrying indication information, to indicate to the first apparatus that the first apparatus may share the license with a second apparatus. In the method provided by the embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

On a basis of the embodiment shown in FIG. 28, in a first possible implementation manner of the embodiment of the present disclosure, the embodiment relates to a specific process of direct information interaction between the first apparatus and the license server. An address of the license server is preset on the first apparatus. The foregoing step S2301 includes the first apparatus sends the first registration request to the license server according to the address of the license server.

If the first apparatus needs to interact with the license server, the first apparatus needs to know the address of the license server. Therefore, the first apparatus may obtain the address of the license server from the management apparatus in advance, or the management apparatus or another network entity actively sends the address of the license server to the first apparatus.

After knowing the address of the license server, the first apparatus sends the first registration request to the license server. In addition to the identity of the first apparatus, the attribute information of the license used by the first apparatus, and the information of the manufacturer of the first apparatus, the first registration request further includes information of a customer using the first apparatus, so that the license server performs authentication on the first apparatus according to the information of the manufacturer of the first apparatus and the information of the customer using the first apparatus.

After the license server receives the first registration request sent by the first apparatus, the license server needs to perform authentication on the first apparatus according to the information of the manufacturer of the first apparatus and the information of the customer using the first apparatus. For a specific authentication process, reference may be made to the foregoing first possible implementation manner of the embodiment shown in FIG. 1. Details are not further described herein. After the license server determines that the first apparatus is authenticated successfully, the license server obtains, according to the attribute information of the license used by the first apparatus, the license resources to be used by the first apparatus, establishes the association relationship between the identity of the first apparatus and the license, and sends, to the first apparatus, the first registration response carrying the indication information, to indicate to the first apparatus that the first apparatus may share the license with the second apparatus.

Optionally, the information of the customer using the first apparatus may be a name of the customer using the first apparatus.

In the license sharing method provided by the embodiment of the present disclosure, a first apparatus sends a first registration request to a license server, so that the license server may obtain, according to attribute information of a license in the first registration request, license resources to be used by the first apparatus, where the license resources belong to one license in a license library; in addition, after establishing an association relationship between an identity of the first apparatus and the license, the license server sends, to the first apparatus, a first registration response carrying indication information, to indicate to the first apparatus that the first apparatus may share the license with a second apparatus. In the method provided by the embodiment of the present disclosure, a license to be used by network elements of a same type is registered on a license server; and the license server performs unified management, and establishes an association relationship between the network elements and the license to indicate that license resources in the same license may be shared by multiple network elements. In this way, maximum utilization of the resources is implemented.

Optionally, for a specific process in which the first apparatus sends the first registration request to the license server using the management apparatus, and the first apparatus receives the first registration response sent by the license server using the management apparatus, reference may be made to content in the foregoing second possible implementation manner of the first embodiment. Details are not further described herein.

Figure 29:
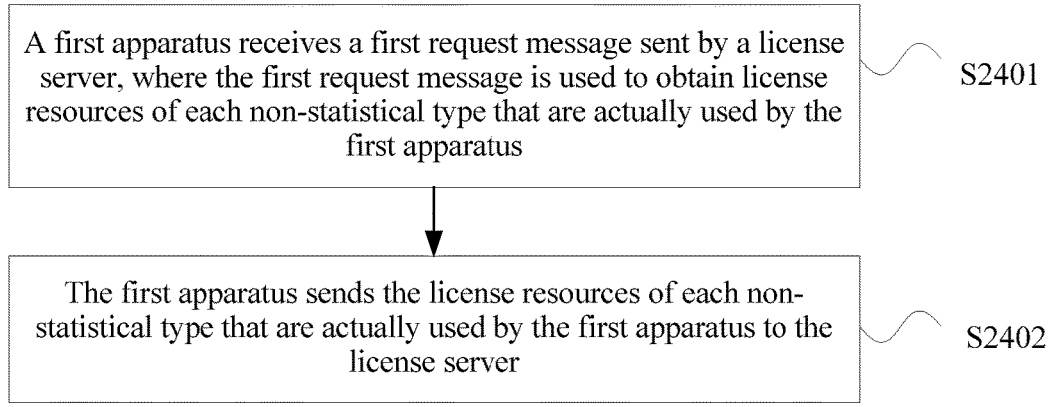
FIG. 29 is a schematic flowchart of a twenty-first embodiment of a license sharing method according to an embodiment of the present disclosure.

FIG. 29 is a schematic flowchart of a twenty-first embodiment of a license sharing method according to an embodiment of the present disclosure. The method related to the embodiment of the present disclosure is a specific process in which the license server actively allocates license resources in the license to the first apparatus. The license includes license resources of at least one non-statistical type. Optionally, the method shown in FIG. 29 may be performed after the foregoing step S2302. Before the method shown in FIG. 29 is performed, the method shown in FIG. 28 may be first performed.

The method shown in FIG. 29 includes the following steps.

S2401. The first apparatus receives a first request message sent by the license server, where the first request message is used to obtain license resources of each non-statistical type that are actually used by the first apparatus.

When the license server actively allocates license resources of a non-statistical type to the first apparatus, the license server sends the first request message to the first apparatus, so that the first apparatus sends, according to the first request message, the license resources of each non-statistical type that are actually used by the first apparatus to the license server. In addition, the license server also sends the first request message to the second apparatus, to obtain license resources of each non-statistical type that are actually used by the second apparatus. Optionally, the license server may directly send the first request message to the first apparatus and the second apparatus separately. Optionally, the license server may also send the first request message to the first apparatus and the second apparatus separately using the management apparatus.

S2402. The first apparatus sends the license resources of each non-statistical type that are actually used by the first apparatus to the license server.

Optionally, the first apparatus may directly report the license resources of each non-statistical type that are actually used by the first apparatus to the license server, or may report the license resources of each non-statistical type that are actually used by the first apparatus to the license server using the management apparatus. In addition, after receiving the first request message, the second apparatus performs an operation that is the same as an operation performed by the first apparatus.

The license server summates the license resources of each non-statistical type that are actually used by the first apparatus and the license resources of each non-statistical type that are actually used by the second apparatus, obtains resources already used in the license resources of each non-statistical type in the license, to obtain remaining available resources in the license resources of each non-statistical type in the license. For details, reference may be made to the example in the foregoing step S403. Details are not further described herein.

Further, after the license server determines the remaining available resources in the license resources of each non-statistical type in the license, the license server allocates resources from the remaining available resources in the license resources of each non-statistical type to the first apparatus according to a certain rule. For a specific allocation manner, reference may be made to the detailed description in the foregoing step S302. Details are not further described herein in the embodiment of the present disclosure.

On a basis of the foregoing embodiment, further, the method related to the embodiment of the present disclosure is a process in which the first apparatus interacts with the license server when license resources of a first non-statistical type to be used by the first apparatus are insufficient, so that the license server allocates license resources of the first non-statistical type to the first apparatus. Optionally, the embodiment of the present disclosure may be directly based on the embodiment shown in FIG. 28, or may be based on the embodiment shown in FIG. 29.

The method includes the first apparatus sends a second request message to the license server, where the second request message is used to notify the license server that the license resources of the first non-statistical type to be used by the first apparatus are insufficient, so that the license server allocates license resources of the first non-statistical type to the first apparatus according to the second request message.

If the first apparatus finds, after running for a period of time, that the license resources of the first non-statistical type to be used by the first apparatus are insufficient, the first apparatus sends the second request message to the license server to notify the license server that the license resources of the first non-statistical type to be used by the first apparatus are insufficient. It should be noted that, herein, the first apparatus may send the second request message to the license server directly, or may send the second request message to the license server using the management apparatus.

Afterward, the license server may obtain remaining available resources in license resources of the first non-statistical type with reference to the foregoing steps S403 and S404. Further, the license server determines whether the second request message carries a value of license resources of the first non-statistical type that are currently still required by the first apparatus. If the second request message does not carry the value of the license resources of the first non-statistical type that are currently still required by the first apparatus, the license server allocates resources from the remaining available resources in the license resources of the first non-statistical type to the first apparatus. If the second request message carries the value of the license resources of the first non-statistical type that are currently still required by the first apparatus, the license server determines whether a value of the remaining available resources in the license resources of the first non-statistical type is greater than or equal to the value of the license resources of the first non-statistical type that are currently still required by the first apparatus. If yes, the license server allocates resources from the remaining available resources in the license resources of the first non-statistical type to the first apparatus according to the value of the license resources of the first non-statistical type that are currently still required by the first apparatus. If not, the license server allocates all the remaining available resources in the license resources of the first non-statistical type to the first apparatus. For details, reference may be made to a specific process of step S603 to step S607 in the foregoing embodiment shown in FIG. 12. Details are not further described herein.

On a basis of the foregoing embodiment, further, the method related to the embodiment of the present disclosure is a specific process in which the first apparatus actively applies for license resources from the license server according to a requirement. The license includes license resources of at least one non-statistical type. Optionally, the method may be performed after the foregoing step S2302.

The method includes the first apparatus sends a request for applying for license resources of a second non-statistical type to the license server, where the request for applying for the license resources of the second non-statistical type carries a value of the license resources of the second non-statistical type that the first apparatus applies for, so that the license server allocates license resources of the second non-statistical type to the first apparatus according to the value of the license resources of the second non-statistical type that the first apparatus applies for.

The license resources of the second non-statistical type in the embodiment of the present disclosure are license resources of any non-statistical type in the license. The application request may be directly sent by the first apparatus to the license server, or may be sent by the first apparatus to the license server using the management apparatus. Certainly, to prevent the first apparatus from sending excessive messages to the license server, the first apparatus may also send the request for applying for the license resources of the second non-statistical type to the license server according to a certain rule. For example, every time the first apparatus needs to occupy 50 license resources of the second non-statistical type, the first apparatus sends a request for applying for license resources of the second non-statistical type to the license server, or may set a timer and periodically send a request for applying for license resources of the second non-statistical type.

After receiving the request for applying for the license resources of the second non-statistical type, the license server performs a resource allocation operation. That is, the license server determines whether a value of remaining available resources in license resources of the second non-statistical type in the license is greater than or equal to the value of the license resources of the second non-statistical type that the first apparatus applies for; and if yes, the license server allocates license resources of the second non-statistical type to the first apparatus according to the value of the license resources of the second non-statistical type that the first apparatus applies for.

It should be noted that, when the license server determines that the value of the remaining available resources in the license resources of the second non-statistical type in the license is less than the value of the license resources of the second non-statistical type that the first apparatus applies for, the license server determines that allocation of the license resources of the second non-statistical type to the first apparatus fails, and the license server notifies the first apparatus, in a response manner, that the license resources of the second non-statistical type are insufficient.

Optionally, the license server may further notify the first apparatus of a current available value of license resources of the second non-statistical type on the license server in a response manner, and the first apparatus may first apply for this part of license resources of the second non-statistical type.

On a basis of the foregoing embodiment, further, the embodiment of the present disclosure relates to a specific process of sending a resource change request to the license server when the license resources of the second non-statistical type that are allocated to the first apparatus are insufficient. Optionally, the method may be performed after the license server allocates the license resources of the second non-statistical type to the first apparatus.

The method includes the first apparatus sends a resource change request to the license server, where the resource change request includes a value of license resources of the second non-statistical type that are actually still required by the first apparatus.

When the license resources of the second non-statistical type that are allocated by the license server to the first apparatus do not match a resource value required by the first apparatus, the first apparatus needs to send the resource change request to the license server. Optionally, the first apparatus may directly send the resource change request to the license server, or may send the resource change request to the license server using the management apparatus.

After receiving the resource change request, the license server may perform the operation of the foregoing step S802. Details are not further described herein in the embodiment of the present disclosure.

On a basis of the foregoing embodiment, further, the embodiment of the present disclosure relates to another specific process of sending a resource change request to the license server when the license resources of the second non-statistical type that are allocated to the first apparatus are insufficient. Optionally, the method may be performed after the license server allocates the license resources of the second non-statistical type to the first apparatus.

The method includes the first apparatus sends a resource change request to the license server, where the resource change request includes a total value of license resources of the second non-statistical type that are required by the first apparatus.

If the license resources of the second non-statistical type that are allocated by the license server to the first apparatus do not match a resource value required by the first apparatus, the first apparatus needs to send the resource change request to the license server. Optionally, the first apparatus may directly send the resource change request to the license server, or may send the resource change request to the license server using the management apparatus.

It should be noted that, the total value, carried in the resource change request, of the license resources of the second non-statistical type that are required by the first apparatus includes the license resources of the second non-statistical type that originally exist on the first apparatus (the license server has allocated a part of the license resources of the second non-statistical type to the first apparatus, but the allocated resources are insufficient). The total value of the license resources of the second non-statistical type that are required by the first apparatus is greater than the value of the license resources of the second non-statistical type that are already allocated to the first apparatus.

After receiving the resource change request, the license server may perform the operation of the foregoing step S902. Details are not further described herein.

Figure 30:
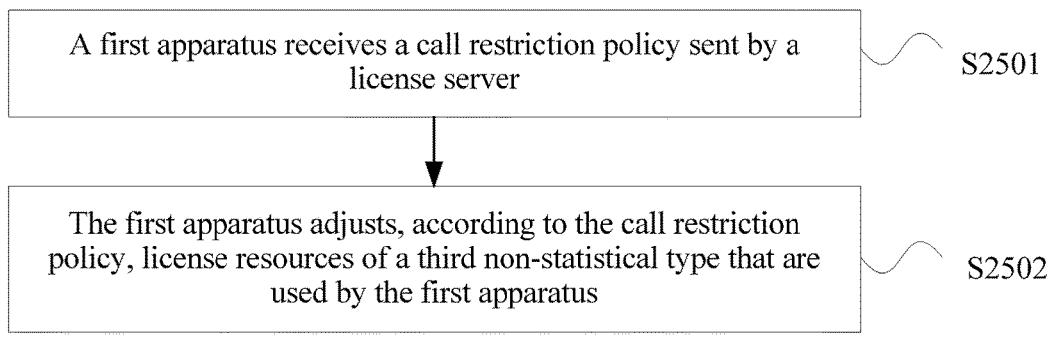
FIG. 30 is a schematic flowchart of a twenty-second embodiment of a license sharing method according to an embodiment of the present disclosure.

FIG. 30 is a schematic flowchart of a twenty-second embodiment of a license sharing method according to an embodiment of the present disclosure. The embodiment of the present disclosure relates to a specific operation process performed by the first apparatus when a value of resources already used in license resources of a third non-statistical type in the license is greater than or equal to an alarm threshold corresponding to the license resources of the third non-statistical type, and the value of the resources already used in the license resources of the third non-statistical type exceeds a preset peak condition corresponding to the license resources of the third non-statistical type. Optionally, the embodiment shown in FIG. 30 may be based on the embodiments shown in FIG. 28 and FIG. 29. Optionally, the method in the embodiment shown in FIG. 30 may be performed after step S2302.

The method shown in FIG. 30 includes the following steps.

S2501. The first apparatus receives a call restriction policy sent by the license server.

When the license server determines that the value of the resources already used in the license resources of the third non-statistical type in the license is greater than or equal to the alarm threshold corresponding to the license resources of the third non-statistical type, and the value of the resources already used in the license resources of the third non-statistical type exceeds the preset peak condition corresponding to the license resources of the third non-statistical type, the license server sends the call restriction policy to the first apparatus. It should be noted that, herein, the alarm threshold may be in a form of a percentage, or may be in a form of a specific limit of a numeric value of resource usage. When the alarm threshold is in the form of a percentage, using the license resources of the third non-statistical type in the license as an example, the license server determines whether a ratio of the value of the resources already used in the license resources of the third non-statistical type to a maximum value of the license resources of the third non-statistical type is greater than or equal to the alarm threshold corresponding to the license resources of the third non-statistical type. If the alarm threshold is in the form of a specific limit of a numeric value of resource usage, the license server determines whether the value of the resources already used in the license resources of the third non-statistical type is greater than or equal to the alarm threshold corresponding to the license resources of the third non-statistical type. The license resources of the third non-statistical type are license resources of any non-statistical type in the license.

S2502. The first apparatus adjusts, according to the call restriction policy, license resources of the third non-statistical type that are used by the first apparatus.

The call restriction policy is used to limit or reduce the license resources of the third non-statistical type that are used by the first apparatus. The license server sends the call restriction policy to the first apparatus, so that the first apparatus adjusts, according to the call restriction policy, the license resources of the third non-statistical type that are used by the first apparatus. For example, license resources of the third non-statistical type that are used by a certain first apparatus are limited, or license resources of the third non-statistical type that are used by a certain first apparatus are reduced.

Figure 31:
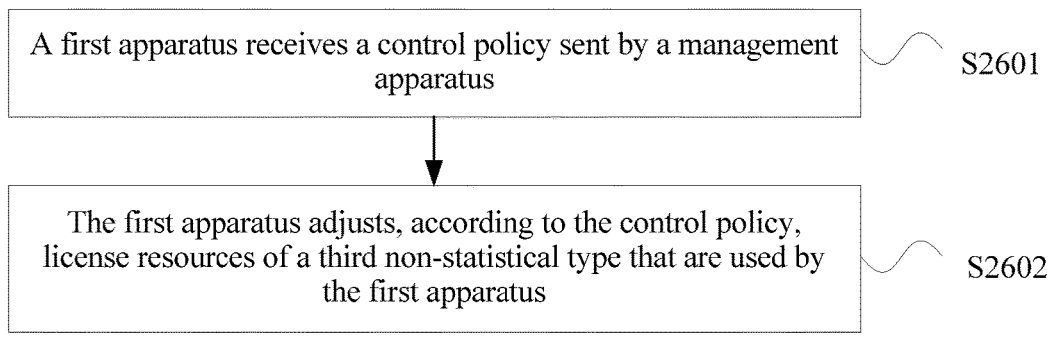
FIG. 31 is a schematic flowchart of a twenty-third embodiment of a license sharing method according to an embodiment of the present disclosure.

FIG. 31 is a schematic flowchart of a twenty-third embodiment of a license sharing method according to an embodiment of the present disclosure. The embodiment of the present disclosure relates to a specific operation process performed by the first apparatus when a value of resources already used in license resources of a third non-statistical type in the license is greater than or equal to an alarm threshold corresponding to the license resources of the third non-statistical type, and the value of the resources already used in the license resources of the third non-statistical type does not exceed a preset peak condition corresponding to the license resources of the third non-statistical type. Optionally, the embodiment shown in FIG. 31 may be based on the embodiments shown in FIG. 28 and FIG. 29. Optionally, the method in the embodiment shown in FIG. 30 may be performed after step S2302.

The method shown in FIG. 31 includes the following steps.

S2601. The first apparatus receives a control policy sent by the management apparatus.

When the license server determines that the value of the resources already used in the license resources of the third non-statistical type in the license is greater than or equal to the alarm threshold corresponding to the license resources of the third non-statistical type, and the value of the resources already used in the license resources of the third non-statistical type does not exceed the preset peak condition corresponding to the license resources of the third non-statistical type, the license server reports alarm information to the management apparatus, so that the management apparatus defines a control policy and forwards the control policy to the first apparatus. The control policy is used to instruct the first apparatus to adjust license resources of the third non-statistical type that are used by the first apparatus.

S2602. The first apparatus adjusts, according to the control policy, license resources of the third non-statistical type that are used by the first apparatus.

The control policy may be reducing, according to a ratio, the license resources of the third non-statistical type that are used by the first apparatus, or reducing license resources of the third non-statistical type on a first apparatus that occupies the most license resources of the third non-statistical type, or canceling the license resources of the third non-statistical type that are used by the first apparatus, or the like. Preferably, license resources of the third non-statistical type that are used on a last VNF instance may be canceled. After receiving the control policy, the first apparatus may adjust, according to a manner indicated by the control policy, the license resources of the third non-statistical type that are used by the first apparatus.

Figure 32:
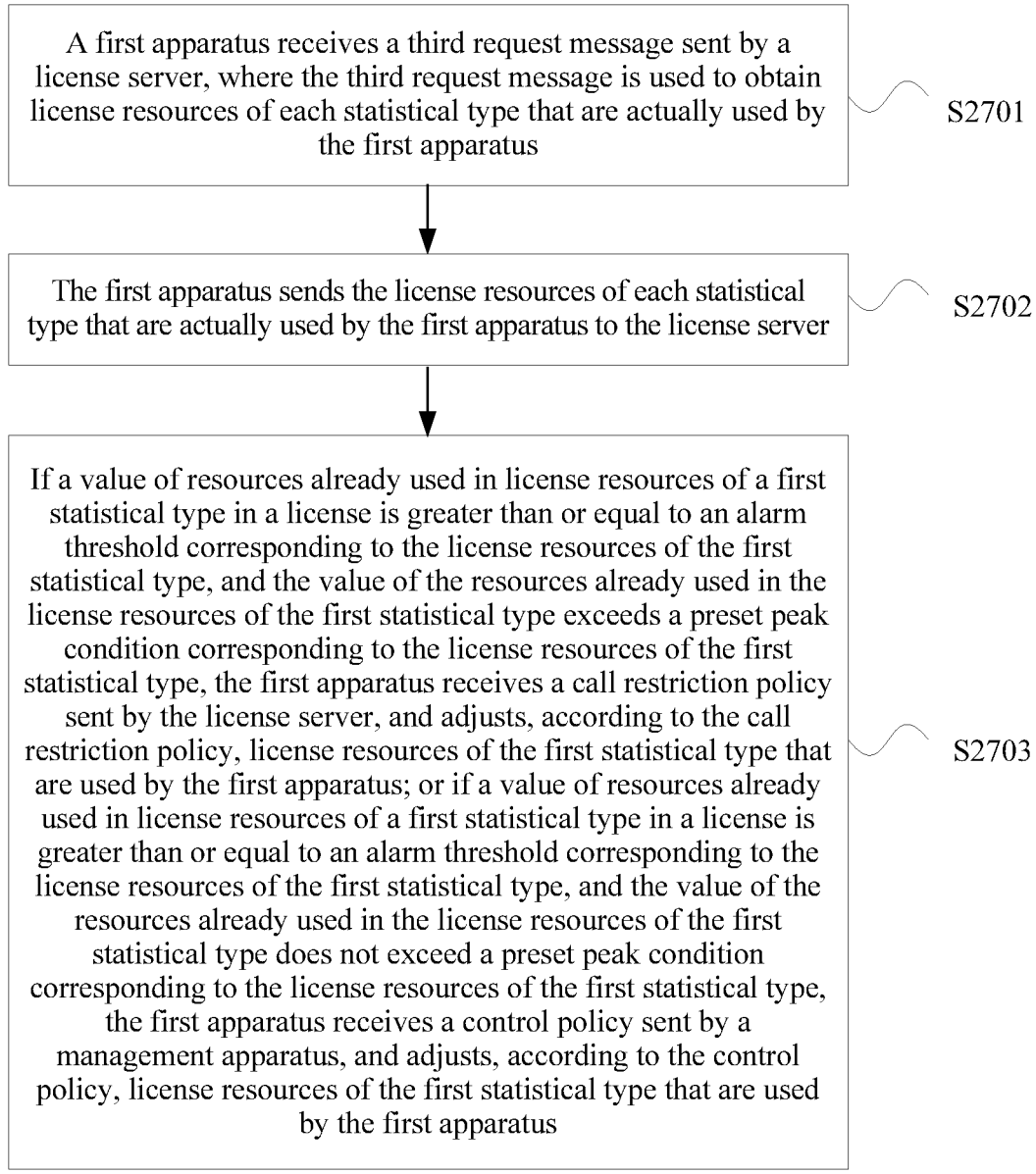
FIG. 32 is a schematic flowchart of a twenty-fourth embodiment of a license sharing method according to an embodiment of the present disclosure.

FIG. 32 is a schematic flowchart of a twenty-fourth embodiment of a license sharing method according to an embodiment of the present disclosure. The method related to the embodiment of the present disclosure is a specific process in which the license server determines whether a value of resources already used in license resources of each statistical type in the license exceeds an alarm threshold or a preset peak condition and interacts with the first apparatus. The license includes license resources of at least one statistical type. Optionally, the method in the embodiment shown in FIG. 32 may be performed after step S2302.

The method shown in FIG. 32 includes the following steps.

S2701. The first apparatus receives a third request message sent by the license server, where the third request message is used to obtain license resources of each statistical type that are actually used by the first apparatus.

When sending the third request message to the first apparatus, the license server also sends a third request message to the second apparatus. The third request message sent to the first apparatus is used to obtain the license resources of each statistical type that are actually used by the first apparatus. The third request message sent to the second apparatus is used to obtain license resources of each statistical type that are actually used by the second apparatus.

S2702. The first apparatus sends the license resources of each statistical type that are actually used by the first apparatus to the license server.

It should be noted that, the second apparatus also sends the license resources of each statistical type that are actually used by the second apparatus to the license server. The license server summates the license resources of each statistical type that are actually used by the first apparatus and the license resources of each statistical type that are actually used by the second apparatus, to obtain resources already used in the license resources of each statistical type in the license. For details, reference may be made to the specific process of the foregoing step 1203. Details are not further described herein.

S2703. If a value of resources already used in license resources of a first statistical type in the license is greater than or equal to an alarm threshold corresponding to the license resources of the first statistical type, and the value of the resources already used in the license resources of the first statistical type exceeds a preset peak condition corresponding to the license resources of the first statistical type, the first apparatus receives a call restriction policy sent by the license server, and adjusts, according to the call restriction policy, license resources of the first statistical type that are used by the first apparatus; or if a value of resources already used in license resources of a first statistical type in the license is greater than or equal to an alarm threshold corresponding to the license resources of the first statistical type, and the value of the resources already used in the license resources of the first statistical type does not exceed a preset peak condition corresponding to the license resources of the first statistical type, the first apparatus receives a control policy sent by the management apparatus, and adjusts, according to the control policy, license resources of the first statistical type that are used by the first apparatus.

The call restriction policy is used to limit or reduce the license resources of the first statistical type that are used by the first apparatus. The license server sends the call restriction policy to the first apparatus, so that the first apparatus adjusts, according to the call restriction policy, the license resources of the first statistical type that are used by the first apparatus. For example, license resources of the first statistical type that are used by a certain first apparatus are limited, or license resources of the first statistical type that are used by a certain first apparatus are reduced.

In addition, the control policy may be reducing, according to a ratio, the license resources of the first statistical type that are used by the first apparatus, or reducing license resources of the first statistical type on a first apparatus that occupies the most license resources of the first statistical type, or canceling the license resources of the first statistical type that are used by the first apparatus, or the like. Preferably, the license resources of the first statistical type that are used on a last VNF instance may be canceled. After receiving the control policy, the first apparatus may adjust, according to a manner indicated by the control policy, the license resources of the first statistical type that are used by the first apparatus.

Figure 33:
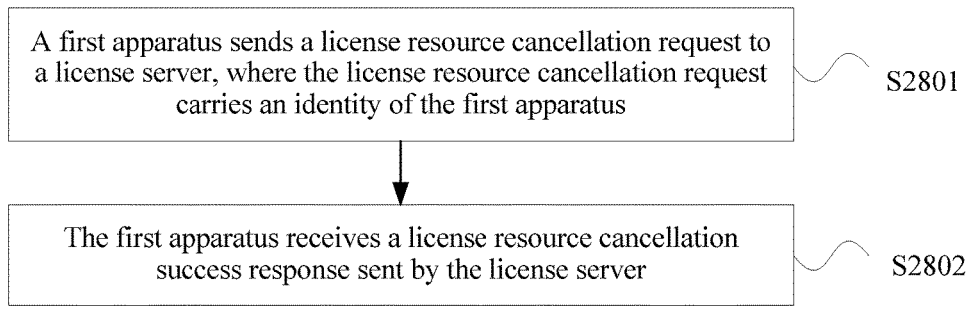
FIG. 33 is a schematic flowchart of a twenty-fifth embodiment of a license sharing method according to an embodi

FIG. 33 is a schematic flowchart of a twenty-fifth embodiment of a license sharing method according to an embodiment of the present disclosure. The method related to the embodiment of the present disclosure is a process of releasing license resources. Optionally, the embodiment of the present disclosure may be based on any embodiment in all the embodiments in FIG. 28 to FIG. 32.

The method shown in FIG. 33 includes the following steps.

S2801. The first apparatus sends a license resource cancellation request to the license server, where the license resource cancellation request carries the identity of the first apparatus.

Optionally, the first apparatus may directly send the license resource cancellation request to the license server, or may send the license resource cancellation request to the license server using the management apparatus. It should be noted that, when the first apparatus directly sends the license resource cancellation request to the license server, the first apparatus has not started a termination processing procedure. The first apparatus starts the termination processing procedure only after the first apparatus sends the license resource cancellation request to the license server. It should be noted that, herein, the termination processing procedure may be that a VNF instance stops running on a virtual machine, that is, termination of the VNF instance is implemented; or may be that a physical server is shut down, so that the physical server releases license resources.

S2802. The first apparatus receives a license resource cancellation success response sent by the license server.

When receiving the license resource cancellation request, the license server cancels, according to the identity of the first apparatus, license resources of a non-statistical type and license resources of a statistical type that are associated with the first apparatus, and sends the license resource cancellation success response to the first apparatus. Optionally, after the license server cancels an association relationship between the first apparatus and license resources, the license server may send a license resource cancellation success response to the first apparatus, or may not send a license resource cancellation success response (because the first apparatus actually cannot receive any response after the first apparatus is terminated), or may send a license resource cancellation success response to the management apparatus.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Figure 34:
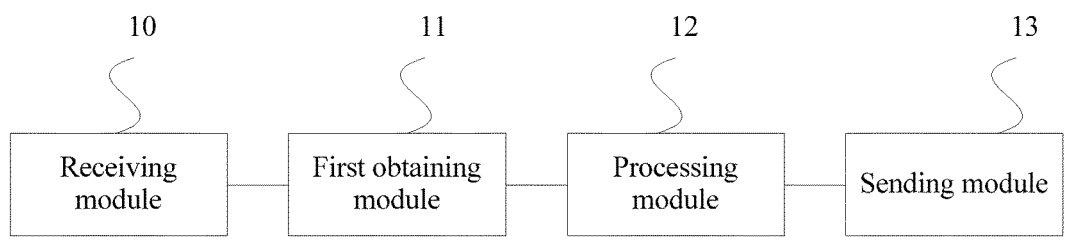
- FIG. 34 is a schematic structural diagram of a first embodiment of a license server according to an embodiment of the present disclosure.

FIG. 34 is a schematic structural diagram of a first embodiment of a license server according to an embodiment of the present disclosure. As shown in FIG. 34, the license server includes a receiving module 10, a first obtaining module 11, a processing module 12, and a sending module 13.

The receiving module 10 is configured to receive a first registration request sent by a first apparatus. The first registration request includes an identity of the first apparatus, attribute information of a license used by the first apparatus, and information of a manufacturer of the first apparatus. The manufacturer of the first apparatus is the same as a manufacturer of the license server. The first obtaining module 11 is configured to obtain, according to the attribute information of the license that is received by the receiving module 10, license resources to be used by the first apparatus. The license resources belong to one license in a license library. The processing module 12 is configured to establish an association relationship between the identity of the first apparatus and the license according to the license resources to be used by the first apparatus that are obtained by the first obtaining module 11 and the identity of the first apparatus received by the receiving module 10. The sending module 13 is configured to send a first registration response to the first apparatus. The first registration response carries indication information. The indication information is used to indicate that the first apparatus shares the license with a second apparatus. The second apparatus is provided by the manufacturer of the first apparatus, and a type of the second apparatus is the same as a type of the first apparatus.

The license server provided by the embodiment of the present disclosure may perform the foregoing method embodiment. An implementation principle and a technical effect thereof are similar to those of the method embodiment, and are not further described herein.

Further, an address of the license server is preset on the first apparatus, and the receiving module 10 is configured to receive the first registration request sent by the first apparatus according to the address of the license server.

Figure 35:
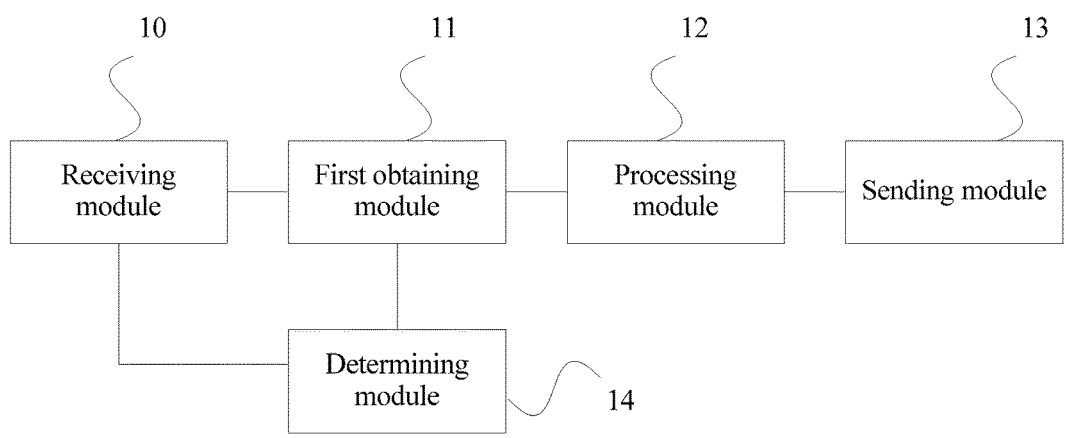
FIG. 35 is a schematic structural diagram of a second embodiment of a license server according to an embodiment of the present disclosure.

FIG. 35 is a schematic structural diagram of a second embodiment of a license server according to an embodiment of the present disclosure. On a basis of the embodiment shown in FIG. 34, as shown in FIG. 35, the license server may further include a determining module 14 configured to, before the first obtaining module 11 obtains the license resources to be used by the first apparatus, determine, according to the information of the manufacturer of the first apparatus and information of a customer using the first apparatus that are received by the receiving module 10, that the first apparatus is authenticated successfully.

The sending module 13 is further configured to send a second registration request to a management apparatus before the receiving module 10 receives the first registration request sent by the first apparatus. The second registration request includes information indicating an access mode for accessing the management apparatus by the license server and information of the manufacturer of the license server. The receiving module 10 is further configured to receive a second registration success response sent by the management apparatus. The second registration success response is sent after the management apparatus authenticates the access mode and the manufacturer of the license server successfully.

It should be noted that, when the first apparatus is a physical network element, the management apparatus is an element management system EMS; or when the first apparatus is a virtual network element, the management apparatus is an orchestrator and a virtualized network function manager VNFM, or an orchestrator and a VNFM and an EMS.

The license server provided by the embodiment of the present disclosure may perform the foregoing method embodiment. An implementation principle and a technical effect thereof are similar to those of the method embodiment, and are not further described herein.

Figure 36:
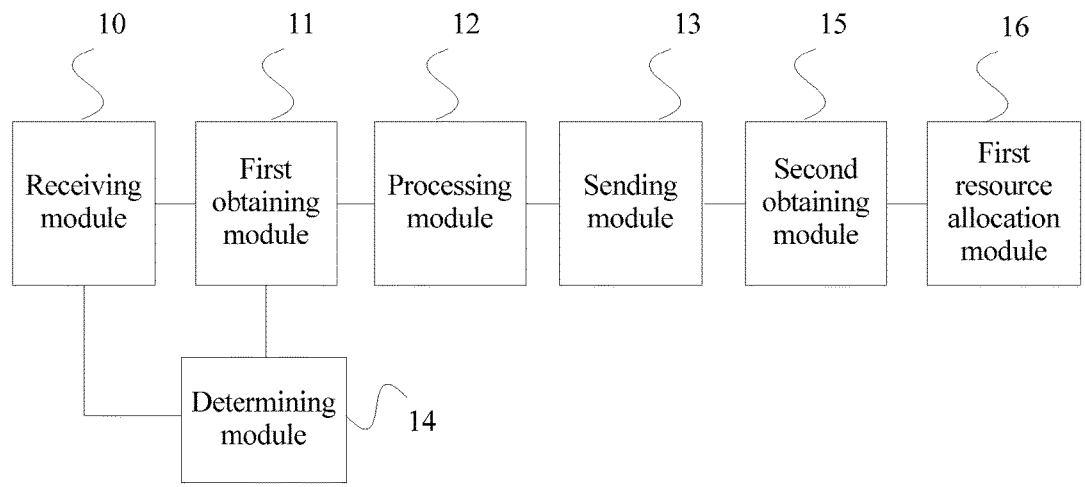
FIG. 36 is a schematic structural diagram of a third embodiment of a license server according to an embodiment of the present disclosure.

FIG. 36 is a schematic structural diagram of a third embodiment of a license server according to an embodiment of the present disclosure. The license includes license resources of at least one non-statistical type, and on a basis of the embodiment shown in FIG. 35, as shown in FIG. 36, the license server may further include a second obtaining module 15 configured to perform a classified statistics operation after the sending module 13 sends the first registration response to the first apparatus, to obtain remaining available resources in license resources of each non-statistical type in the license; and a first resource allocation module 16 configured to allocate resources from the remaining available resources in the license resources of each non-statistical type to the first apparatus.

The sending module 13 is further configured to send a first request message to the first apparatus and the second apparatus separately. The first request message sent to the first apparatus is used to obtain license resources of each non-statistical type that are actually used by the first apparatus. The first request message sent to the second apparatus is used to obtain license resources of each non-statistical type that are actually used by the second apparatus. The receiving module 10 is further configured to receive the license resources of each non-statistical type that are actually used by the first apparatus and sent by the first apparatus, and the license resources of each non-statistical type that are actually used by the second apparatus and sent by the second apparatus.

The second obtaining module 15 is configured to summate the license resources of each non-statistical type that are actually used by the first apparatus and the license resources of each non-statistical type that are actually used by the second apparatus, to obtain resources already used in the license resources of each non-statistical type in the license, and obtain the remaining available resources in the license resources of each non-statistical type in the license according to the resources already used in the license resources of each non-statistical type in the license.

Further, when license resources of a first non-statistical type to be used by the first apparatus are insufficient, the receiving module 10 is further configured to receive a second request message sent by the first apparatus. The second request message is used to notify the license server that the license resources of the first non-statistical type to be used by the first apparatus are insufficient. The second obtaining module 15 is further configured to obtain remaining available resources in license resources of the first non-statistical type in the license, and determine whether the second request message carries a value of license resources of the first non-statistical type that are currently still required by the first apparatus, and configured to determine whether a value of the remaining available resources in the license resources of the first non-statistical type is greater than or equal to the value of the license resources of the first non-statistical type that are currently still required by the first apparatus.

If the second obtaining module 15 determines that the second request message does not carry the value of the license resources of the first non-statistical type that are currently still required by the first apparatus, the first resource allocation module 16 is configured to allocate resources from the remaining available resources in the license resources of the first non-statistical type to the first apparatus. If the second obtaining module 15 determines that the second request message carries the value of the license resources of the first non-statistical type that are currently still required by the first apparatus, and that the value of the remaining available resources in the license resources of the first non-statistical type is greater than or equal to the value of the license resources of the first non-statistical type that are currently still required by the first apparatus, the first resource allocation module 16 is configured to allocate resources from the remaining available resources in the license resources of the first non-statistical type to the first apparatus according to the value of the license resources of the first non-statistical type that are currently still required by the first apparatus. If the second obtaining module 15 determines that the value of the remaining available resources in the license resources of the first non-statistical type is less than the value of the license resources of the first non-statistical type that are currently still required by the first apparatus, the first resource allocation module 16 is configured to allocate all the remaining available resources in the license resources of the first non-statistical type to the first apparatus.

The license server provided by the embodiment of the present disclosure may perform the foregoing method embodiment. An implementation principle and a technical effect thereof are similar to those of the method embodiment, and are not further described herein.

Figure 37:
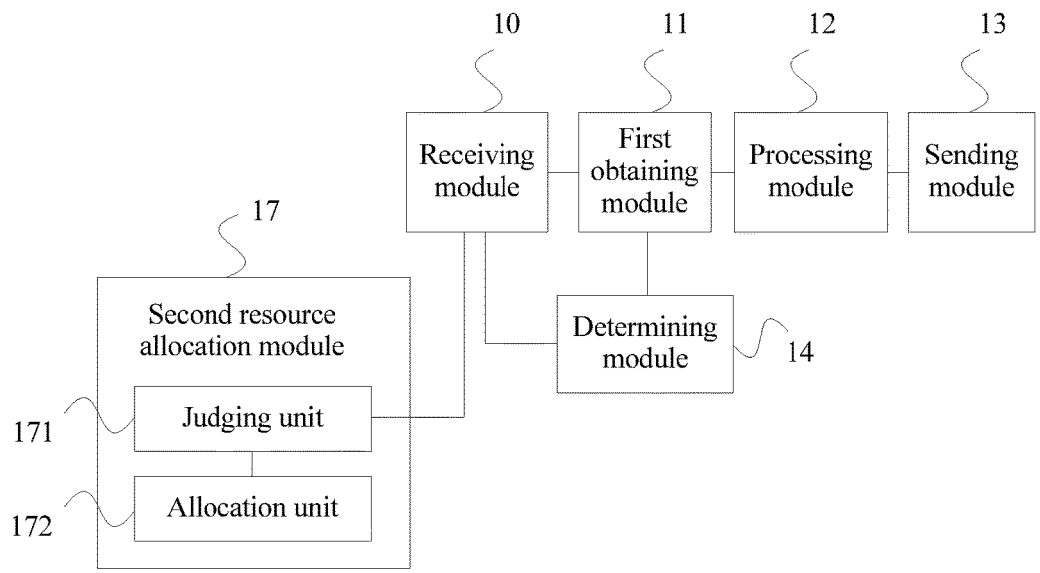
FIG. 37 is a schematic structural diagram of a fourth embodiment of a license server according to an embodiment of the present disclosure.

FIG. 37 is a schematic structural diagram of a fourth embodiment of a license server according to an embodiment of the present disclosure. The license includes license resources of at least one non-statistical type. On a basis of the embodiment shown in FIG. 35, as shown in FIG. 37, the license server may further include a second resource allocation module 17. The receiving module 10 is further configured to, after the sending module 13 sends the first registration response to the first apparatus, receive a request sent by the first apparatus and for applying for license resources of a second non-statistical type. The request for applying for the license resources of the second non-statistical type carries a value of the license resources of the second non-statistical type that the first apparatus applies for.

The second resource allocation module 17 includes a judging unit 171 and an allocation unit 172. The judging unit 171 is configured to determine whether a value of remaining available resources in license resources of the second non-statistical type in the license is greater than or equal to the value, received by the receiving module 10, of the license resources of the second non-statistical type that the first apparatus applies for. The allocation unit 172 is configured to allocate, according to the value of the license resources of the second non-statistical type that the first apparatus applies for, license resources of the second non-statistical type to the first apparatus when the judging unit 171 determines that the value of the remaining available resources in the license resources of the second non-statistical type is greater than or equal to the value of the license resources of the second non-statistical type that the first apparatus applies for.

Optionally, the receiving module 10 is further configured to, after the allocation unit 172 allocates the license resources of the second non-statistical type to the first apparatus, receive a resource change request sent by the first apparatus. The resource change request includes a value of license resources of the second non-statistical type that are actually still required by the first apparatus. The second resource allocation module 17 is configured to use the value, carried in the resource change request, of the license resources of the second non-statistical type that are actually still required by the first apparatus as a new value of license resources of the second non-statistical type that the first apparatus applies for, and perform the resource allocation operation.

Optionally, the receiving module 10 is further configured to, after the allocation unit 172 allocates the license resources of the second non-statistical type to the first apparatus, receive a resource change request sent by the first apparatus. The resource change request includes a total value of license resources of the second non-statistical type that are required by the first apparatus. The total value of the license resources of the second non-statistical type that are required by the first apparatus is greater than a value of the license resources of the second non-statistical type that are already allocated to the first apparatus. The second resource allocation module 17 is configured to use a difference between the total value of the license resources of the second non-statistical type that are required by the first apparatus and the value of the license resources of the second non-statistical type that are already allocated to the first apparatus, as a new value of license resources of the second non-statistical type that the first apparatus applies for, and perform the resource allocation operation.

Optionally, the receiving module 10 is further configured to, after the allocation unit 172 allocates the license resources of the second non-statistical type to the first apparatus, receive a resource change request sent by the first apparatus. The resource change request includes a total value of license resources of the second non-statistical type that are required by the first apparatus. The total value of the license resources of the second non-statistical type that are required by the first apparatus is less than a value of the license resources of the second non-statistical type that are already allocated to the first apparatus. The second resource allocation module 17 is configured to subtract the value of the license resources of the second non-statistical type that are already allocated to the first apparatus from the total value of the license resources of the second non-statistical type that are required, to obtain a value of license resources of the second non-statistical type that need to be reduced, and reduce, according to the value of the license resources of the second non-statistical type that need to be reduced, the license resources of the second non-statistical type that are allocated to the first apparatus.

The license server provided by the embodiment of the present disclosure may perform the foregoing method embodiment. An implementation principle and a technical effect thereof are similar to those of the method embodiment, and are not further described herein.

Figure 38:
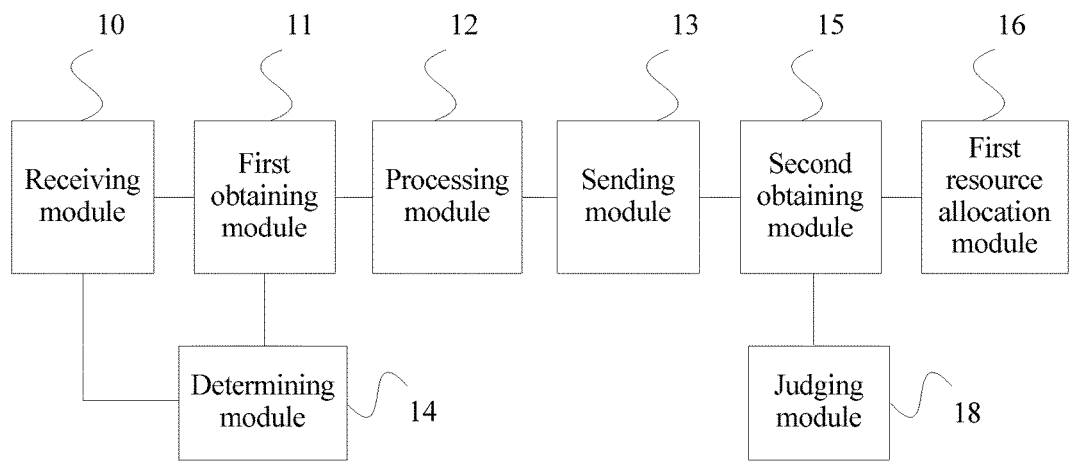
FIG. 38 is a schematic structural diagram of a fifth embodiment of a license server according to an embodiment of the present disclosure.

FIG. 38 is a schematic structural diagram of a fifth embodiment of a license server according to an embodiment of the present disclosure. On a basis of the embodiment shown in FIG. 36, the license server may further include a judging module 18 configured to, after the second obtaining module 15 obtains the resources already used in the license resources of each non-statistical type in the license, determine whether a value of the resources already used in the license resources of each non-statistical type in the license is greater than or equal to a corresponding alarm threshold. Each non-statistical license resource corresponds to an alarm threshold, and the license resources of each non-statistical type correspond to a preset peak condition. When determining that a value of resources already used in license resources of a third non-statistical type in the license is greater than or equal to an alarm threshold corresponding to the license resources of the third non-statistical type, further configured to determine whether the value of the resources already used in the license resources of the third non-statistical type exceeds a preset peak condition corresponding to the license resources of the third non-statistical type. The license resources of the third non-statistical type are license resources of any non-statistical type in the license.

If the value of the resources already used in the license resources of the third non-statistical type exceeds the preset peak condition corresponding to the license resources of the third non-statistical type, the processing module 12 is further configured to define a call restriction policy, and send the call restriction policy to the first apparatus using the sending module 13, so that the first apparatus adjusts, according to the call restriction policy, license resources of the third non-statistical type that are used by the first apparatus. If the value of the resources already used in the license resources of the third non-statistical type does not exceed the preset peak condition corresponding to the license resources of the third non-statistical type, the sending module 13 is further configured to report alarm information to the management apparatus, so that the management apparatus defines a control policy and forwards the control policy to the first apparatus. The control policy is used to instruct the first apparatus to adjust license resources of the third non-statistical type that are used by the first apparatus.

The license server provided by the embodiment of the present disclosure may perform the foregoing method embodiment. An implementation principle and a technical effect thereof are similar to those of the method embodiment, and are not further described herein.

Figure 39:
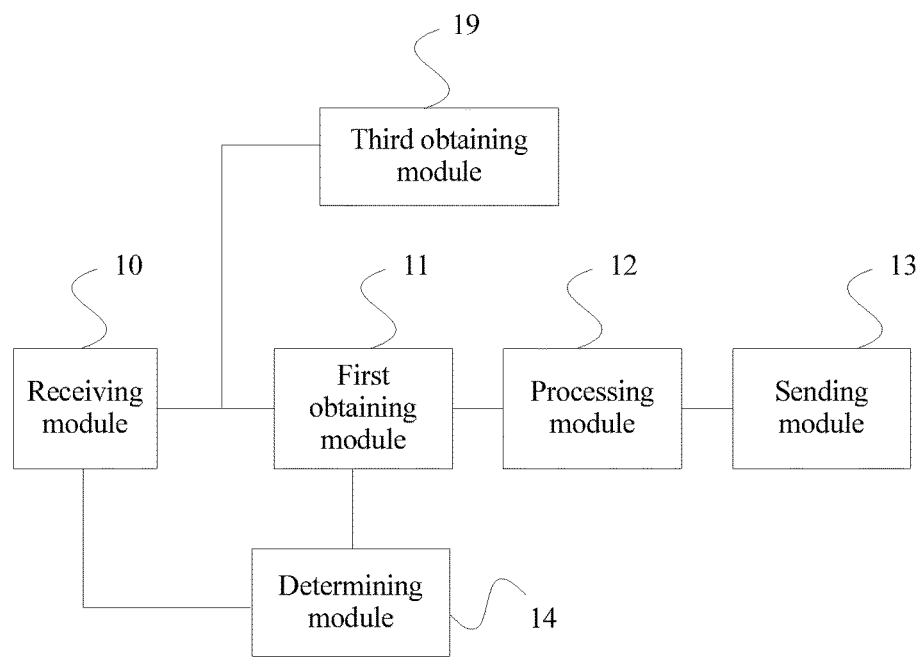
FIG. 39 is a schematic structural diagram of a sixth embodiment of a license server according to an embodiment of the present disclosure.

FIG. 39 is a schematic structural diagram of a sixth embodiment of a license server according to an embodiment of the present disclosure. On a basis of the embodiment shown in FIG. 35, the license server may further include a third obtaining module 19.

The sending module 13 is further configured to send a third request message to the first apparatus and the second apparatus after sending the first registration response to the first apparatus. The third request message sent to the first apparatus is used to obtain license resources of each statistical type that are actually used by the first apparatus. The third request message sent to the second apparatus is used to obtain license resources of each statistical type that are actually used by the second apparatus.

The receiving module 10 is further configured to receive the license resources of each statistical type that are actually used by the first apparatus and sent by the first apparatus, and the license resources of each statistical type that are actually used by the second apparatus and sent by the second apparatus.

The third obtaining module 19 is configured to summate the license resources of each statistical type that are actually used by the first apparatus and the license resources of each statistical type that are actually used by the second apparatus, to obtain resources already used in the license resources of each statistical type in the license; and configured to determine whether a value of the resources already used in the license resources of each statistical type in the license is greater than or equal to a corresponding alarm threshold. The license resources of each statistical type correspond to an alarm threshold, and the license resources of each statistical type correspond to a preset peak condition. When determining that a value of resources already used in license resources of a first statistical type in the license is greater than or equal to an alarm threshold corresponding to the license resources of the first statistical type, further configured to determine whether the value of the resources already used in the license resources of the first statistical type exceeds a preset peak condition corresponding to the license resources of the first statistical type. The license resources of the first statistical type are license resources of any statistical type in the license.

If the third obtaining module 19 determines that the value of the resources already used in the license resources of the first statistical type exceeds the preset peak condition corresponding to the license resources of the first statistical type, the processing module 12 is further configured to define a call restriction policy, and send the call restriction policy to the first apparatus using the sending module 13, so that the first apparatus adjusts, according to the call restriction policy, license resources of the first statistical type that are used by the first apparatus.

If the third obtaining module 19 determines that the value of the resources already used in the license resources of the first statistical type does not exceed the preset peak condition corresponding to the license resources of the first statistical type, the sending module 13 is further configured to report alarm information to the management apparatus, so that the management apparatus defines a control policy and forwards the control policy to the first apparatus. The control policy is used to instruct the first apparatus to adjust license resources of the first statistical type that are used by the first apparatus.

The license server provided by the embodiment of the present disclosure may perform the foregoing method embodiment. An implementation principle and a technical effect thereof are similar to those of the method embodiment, and are not further described herein.

On a basis of any embodiment shown in FIG. 34 to FIG. 39, further, the receiving module 10 is further configured to receive a license resource cancellation request sent by the first apparatus. The license resource cancellation request carries the identity of the first apparatus. The processing module 12 is further configured to cancel, according to the identity of the first apparatus, license resources of a non-statistical type and license resources of a statistical type that are associated with the first apparatus. The sending module 13 is further configured to send a license resource cancellation success response to the first apparatus.

The license server provided by the embodiment of the present disclosure may perform the foregoing method embodiment. An implementation principle and a technical effect thereof are similar to those of the method embodiment, and are not further described herein.

Figure 40:
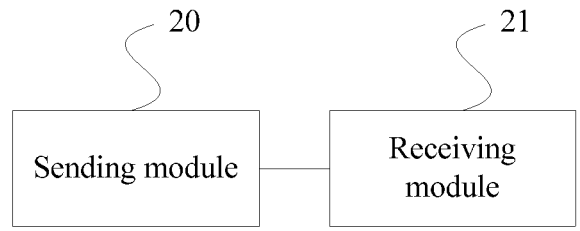
FIG. 40 is a schematic structural diagram of a first embodiment of a first apparatus according to an embodiment of the present disclosure.

FIG. 40 is a schematic structural diagram of a first embodiment of a first apparatus according to an embodiment of the present disclosure. The first apparatus may be a physical network element or may be a virtual network element. As shown in FIG. 40, the first apparatus includes a sending module 20 and a receiving module 21. The sending module 20 is configured to send a first registration request to a license server. The first registration request includes an identity of the first apparatus, attribute information of a license used by the first apparatus, and information of a manufacturer of the first apparatus. The manufacturer of the first apparatus is the same as a manufacturer of the license server. The receiving module 21 is configured to receive a first registration response sent by the license server. The first registration response carries indication information. The indication information is used to indicate that the first apparatus shares one license with a second apparatus. The second apparatus is provided by the manufacturer of the first apparatus, and a type of the second apparatus is the same as a type of the first apparatus.

The first apparatus provided by the embodiment of the present disclosure may perform the foregoing method embodiment. An implementation principle and a technical effect thereof are similar to those of the method embodiment, and are not further described herein.

Further, an address of the license server is preset on the first apparatus, and the sending module 20 is configured to send the first registration request to the license server according to the address of the license server.

The first registration request further carries information of a customer using the first apparatus, so that the license server performs authentication on the first apparatus according to the information of the manufacturer of the first apparatus and the information of the customer using the first apparatus.

Optionally, when the license includes license resources of at least one non-statistical type, the receiving module 21 may be further configured to, after receiving the first registration response sent by the license server, receive a first request message sent by the license server. The first request message is used to obtain license resources of each non-statistical type that are actually used by the first apparatus. The sending module 20 may be further configured to send the license resources of each non-statistical type that are actually used by the first apparatus to the license server.

Optionally, when license resources of a first non-statistical type to be used by the first apparatus are insufficient, the sending module 20 may be further configured to send a second request message to the license server. The second request message is used to notify the license server that the license resources of the first non-statistical type to be used by the first apparatus are insufficient, so that the license server allocates license resources of the first non-statistical type to the first apparatus according to the second request message.

The first apparatus provided by the embodiment of the present disclosure may perform the foregoing method embodiment. An implementation principle and a technical effect thereof are similar to those of the method embodiment, and are not further described herein.

Optionally, when the license includes license resources of at least one non-statistical type, the sending module 20 may be further configured to, after the receiving module 21 receives the first registration response sent by the license server, send a request for applying for license resources of a second non-statistical type to the license server, where the request for applying for the license resources of the second non-statistical type carries a value of the license resources of the second non-statistical type that the first apparatus applies for, so that the license server allocates license resources of the second non-statistical type to the first apparatus according to the value of the license resources of the second non-statistical type that the first apparatus applies for.

Optionally, when the license resources of the second non-statistical type that are allocated by the license server to the first apparatus are insufficient, the sending module 20 may be further configured to send a resource change request to the license server. The resource change request includes a value of license resources of the second non-statistical type that are actually still required by the first apparatus.

Optionally, when the license resources of the second non-statistical type that are allocated by the license server to the first apparatus are insufficient, the sending module 20 may be further configured to send a resource change request to the license server. The resource change request includes a total value of license resources of the second non-statistical type that are required by the first apparatus.

The first apparatus provided by the embodiment of the present disclosure may perform the foregoing method embodiment. An implementation principle and a technical effect thereof are similar to those of the method embodiment, and are not further described herein.

Figure 41:
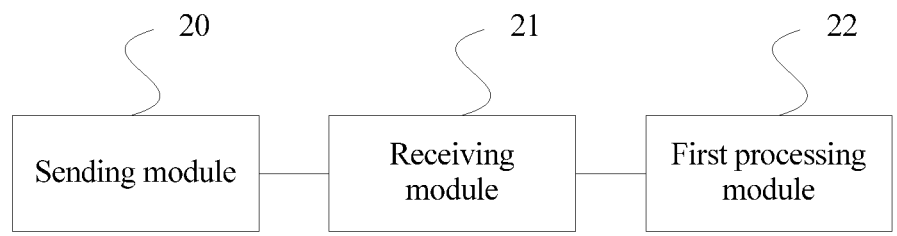
FIG. 41 is a schematic structural diagram of a second embodiment of a first apparatus according to an embodiment of the present disclosure.

FIG. 41 is a schematic structural diagram of a second embodiment of a first apparatus according to an embodiment of the present disclosure. If a value of resources already used in license resources of a third non-statistical type in the license is greater than or equal to an alarm threshold corresponding to the license resources of the third non-statistical type, and the value of the resources already used in the license resources of the third non-statistical type exceeds a preset peak condition corresponding to the license resources of the third non-statistical type, on a basis of the embodiment shown in FIG. 40, further, as shown in FIG. 41, the first apparatus may further include a first processing module 22. The receiving module 21 may be further configured to receive a call restriction policy sent by the license server. The first processing module 22 is configured to adjust, according to the call restriction policy received by the receiving module 21, license resources of the third non-statistical type that are used by the first apparatus.

Figure 42:
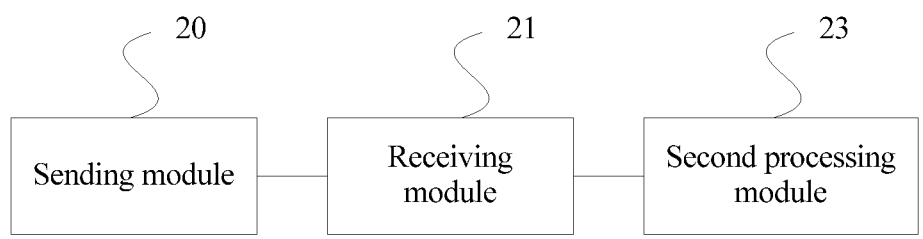
FIG. 42 is a schematic structural diagram of a third embodiment of a first apparatus according to an embodiment of the present disclosure.

FIG. 42 is a schematic structural diagram of a third embodiment of a first apparatus according to an embodiment of the present disclosure. If a value of resources already used in license resources of a third non-statistical type in the license is greater than or equal to an alarm threshold corresponding to the license resources of the third non-statistical type, and the value of the resources already used in the license resources of the third non-statistical type does not exceed a preset peak condition corresponding to the license resources of the third non-statistical type, on a basis of the embodiment shown in FIG. 40, further, as shown in FIG. 42, the first apparatus may further include a second processing module 23. The receiving module 21 may be further configured to receive a control policy sent by a management apparatus. The second processing module 23 is configured to adjust, according to the control policy received by the receiving module 21, license resources of the third non-statistical type that are used by the first apparatus.

It should be noted that, the first processing module 22 in FIG. 41 and the second processing module 23 in FIG. 42 may be different modules or may be a same module.

The first apparatus provided by the embodiment of the present disclosure may perform the foregoing method embodiment. An implementation principle and a technical effect thereof are similar to those of the method embodiment, and are not further described herein.

Figure 43:
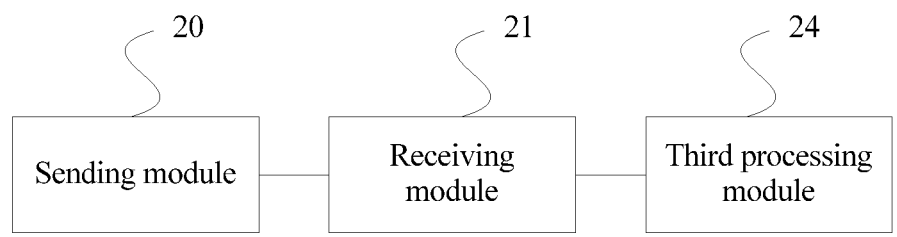
FIG. 43 is a schematic structural diagram of a fourth embodiment of a first apparatus according to an embodiment of the present disclosure.

FIG. 43 is a schematic structural diagram of a fourth embodiment of a first apparatus according to an embodiment of the present disclosure. The license includes license resources of at least one statistical type. On a basis of the embodiment shown in FIG. 40, further, as shown in FIG. 43, the first apparatus may further include a third processing module 24. The receiving module 21 may be further configured to, after receiving the first registration response sent by the license server, receive a third request message sent by the license server. The third request message is used to obtain license resources of each statistical type that are actually used by the first apparatus. The sending module 20 may be further configured to send the license resources of each statistical type that are actually used by the first apparatus to the license server.

If a value of resources already used in license resources of a first statistical type in the license is greater than or equal to an alarm threshold corresponding to the license resources of the first statistical type, and the value of the resources already used in the license resources of the first statistical type exceeds a preset peak condition corresponding to the license resources of the first statistical type, the receiving module 21 is further configured to receive a call restriction policy sent by the license server, and the third processing module 24 is configured to adjust, according to the call restriction policy, license resources of the first statistical type that are used by the first apparatus. If a value of resources already used in license resources of a first statistical type in the license is greater than or equal to an alarm threshold corresponding to the license resources of the first statistical type, and the value of the resources already used in the license resources of the first statistical type does not exceed a preset peak condition corresponding to the license resources of the first statistical type, the receiving module 21 is further configured to receive a control policy sent by a management apparatus, and the third processing module 24 is further configured to adjust, according to the control policy, license resources of the first statistical type that are used by the first apparatus.

On a basis of either embodiment shown in FIG. 42 or FIG. 43, further, the sending module 20 is further configured to send a license resource cancellation request to the license server. The license resource cancellation request carries the identity of the first apparatus. The receiving module 21 may be further configured to receive a license resource cancellation success response sent by the license server.

The first apparatus provided by the embodiment of the present disclosure may perform the foregoing method embodiment. An implementation principle and a technical effect thereof are similar to those of the method embodiment, and are not further described herein.

Figure 44:
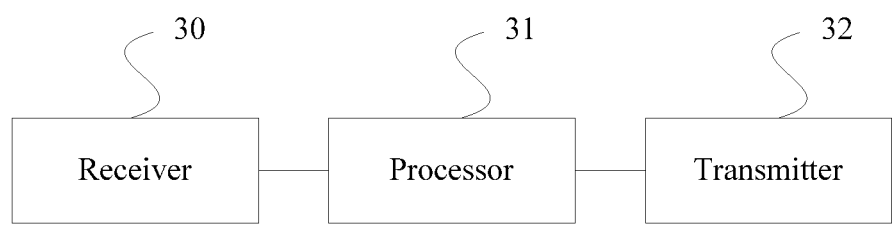
FIG. 44 is a schematic structural diagram of a seventh embodiment of a license server according to an embodiment of the present disclosure.

FIG. 44 is a schematic structural diagram of a seventh embodiment of a license server according to an embodiment of the present disclosure. As shown in FIG. 44, the license server includes a receiver 30, a processor 31, and a transmitter 32.

The receiver 30 is configured to receive a first registration request sent by a first apparatus. The first registration request includes an identity of the first apparatus, attribute information of a license used by the first apparatus, and information of a manufacturer of the first apparatus. The manufacturer of the first apparatus is the same as a manufacturer of the license server. The processor 31 is configured to obtain, according to the attribute information of the license, license resources to be used by the first apparatus. The license resources belong to one license in a license library, and establish an association relationship between the identity of the first apparatus and the license. The transmitter 32 is configured to send a first registration response to the first apparatus. The first registration response carries indication information. The indication information is used to indicate that the first apparatus shares the license with a second apparatus. The second apparatus is provided by the manufacturer of the first apparatus, and a type of the second apparatus is the same as a type of the first apparatus.

The license server provided by the embodiment of the present disclosure may perform the foregoing method embodiment. An implementation principle and a technical effect thereof are similar to those of the method embodiment, and are not further described herein.

Further, an address of the license server is preset on the first apparatus, and the receiver 30 is configured to receive the first registration request sent by the first apparatus according to the address of the license server.

The first registration request further carries information of a customer using the first apparatus, and the processor is further configured to, before the license resources to be used by the first apparatus are obtained, determine, according to the information of the manufacturer of the first apparatus and the information of the customer using the first apparatus, that the first apparatus is authenticated successfully.

The transmitter 32 is further configured to send a second registration request to a management apparatus before the receiver 30 receives the first registration request sent by the first apparatus. The second registration request includes information indicating an access mode for accessing the management apparatus by the license server and information of the manufacturer of the license server. The receiver 30 is further configured to receive a second registration success response sent by the management apparatus. The second registration success response is sent after the management apparatus authenticates the access mode and the manufacturer of the license server successfully.

It should be noted that, when the first apparatus is a physical network element, the management apparatus is an element management system EMS; or when the first apparatus is a virtual network element, the management apparatus is an orchestrator and a virtualized network function manager VNFM, or an orchestrator and a VNFM and an EMS.

The license server provided by the embodiment of the present disclosure may perform the foregoing method embodiment. An implementation principle and a technical effect thereof are similar to those of the method embodiment, and are not further described herein.

Optionally, the license includes license resources of at least one non-statistical type, and the processor 31 may be further configured to perform a classified statistics operation to obtain remaining available resources in license resources of each non-statistical type in the license, and allocate resources from the remaining available resources in the license resources of each non-statistical type to the first apparatus.

The transmitter 32 may be further configured to send a first request message to the first apparatus and the second apparatus separately. The first request message sent to the first apparatus is used to obtain license resources of each non-statistical type that are actually used by the first apparatus. The first request message sent to the second apparatus is used to obtain license resources of each non-statistical type that are actually used by the second apparatus. The receiver 30 may be further configured to receive the license resources of each non-statistical type that are actually used by the first apparatus and sent by the first apparatus, and the license resources of each non-statistical type that are actually used by the second apparatus and sent by the second apparatus. The processor is configured to summate the license resources of each non-statistical type that are actually used by the first apparatus and the license resources of each non-statistical type that are actually used by the second apparatus, to obtain resources already used in the license resources of each non-statistical type in the license, and obtain the remaining available resources in the license resources of each non-statistical type in the license according to the resources already used in the license resources of each non-statistical type in the license.

Optionally, when license resources of a first non-statistical type to be used by the first apparatus are insufficient, the receiver 30 may be further configured to receive a second request message sent by the first apparatus. The second request message is used to notify the license server that the license resources of the first non-statistical type to be used by the first apparatus are insufficient.

The processor 31 may be further configured to obtain remaining available resources in license resources of the first non-statistical type in the license, and determine whether the second request message carries a value of license resources of the first non-statistical type that are currently still required by the first apparatus. If the second request message does not carry the value of the license resources of the first non-statistical type that are currently still required by the first apparatus, the processor 31 allocates resources from the remaining available resources in the license resources of the first non-statistical type to the first apparatus. If the second request message carries the value of the license resources of the first non-statistical type that are currently still required by the first apparatus, the processor 31 determines whether a value of the remaining available resources in the license resources of the first non-statistical type is greater than or equal to the value of the license resources of the first non-statistical type that are currently still required by the first apparatus. If the value of the remaining available resources in the license resources of the first non-statistical type is greater than or equal to the value of the license resources of the first non-statistical type that are currently still required by the first apparatus, the processor 31 allocates resources from the remaining available resources in the license resources of the first non-statistical type to the first apparatus according to the value of the license resources of the first non-statistical type that are currently still required by the first apparatus. If the value of the remaining available resources in the license resources of the first non-statistical type is less than the value of the license resources of the first non-statistical type that are currently still required by the first apparatus, the processor 31 allocates all the remaining available resources in the license resources of the first non-statistical type to the first apparatus.

The license server provided by the embodiment of the present disclosure may perform the foregoing method embodiment. An implementation principle and a technical effect thereof are similar to those of the method embodiment, and are not further described herein.

Optionally, when the license includes license resources of at least one non-statistical type, the receiver 30 may be further configured to receive a request sent by the first apparatus and for applying for license resources of a second non-statistical type. The request for applying for the license resources of the second non-statistical type carries a value of the license resources of the second non-statistical type that the first apparatus applies for. The processor 31 may be further configured to determine whether a value of remaining available resources in license resources of the second non-statistical type in the license is greater than or equal to the value of the license resources of the second non-statistical type that the first apparatus applies for, and allocate license resources of the second non-statistical type to the first apparatus according to the value of the license resources of the second non-statistical type that the first apparatus applies for.

Further, after the processor 31 allocates the license resources of the second non-statistical type to the first apparatus, the receiver 30 may be further configured to receive a resource change request sent by the first apparatus. The resource change request includes a value of license resources of the second non-statistical type that are actually still required by the first apparatus. The processor 31 may be further configured to use the value, carried in the resource change request, of the license resources of the second non-statistical type that are actually still required by the first apparatus as a new value of license resources of the second non-statistical type that the first apparatus applies for, and perform the resource allocation operation.

Optionally, after the processor 31 allocates the license resources of the second non-statistical type to the first apparatus, the receiver 30 may be further configured to receive a resource change request sent by the first apparatus. The resource change request includes a total value of license resources of the second non-statistical type that are required by the first apparatus. The total value of the license resources of the second non-statistical type that are required by the first apparatus is greater than a value of the license resources of the second non-statistical type that are already allocated to the first apparatus. The processor 31 may be further configured to use a difference between the total value of the license resources of the second non-statistical type that are required by the first apparatus and the value of the license resources of the second non-statistical type that are already allocated to the first apparatus, as a new value of license resources of the second non-statistical type that the first apparatus applies for, and perform the resource allocation operation.

Optionally, after the processor 31 allocates the license resources of the second non-statistical type to the first apparatus, the receiver 30 may be further configured to receive a resource change request sent by the first apparatus. The resource change request includes a total value of license resources of the second non-statistical type that are required by the first apparatus. The total value of the license resources of the second non-statistical type that are required by the first apparatus is less than a value of the license resources of the second non-statistical type that are already allocated to the first apparatus. The processor 31 may be further configured to subtract the value of the license resources of the second non-statistical type that are already allocated to the first apparatus from the total value of the license resources of the second non-statistical type that are required, to obtain a value of license resources of the second non-statistical type that need to be reduced, and reduce, according to the value of the license resources of the second non-statistical type that need to be reduced, the license resources of the second non-statistical type that are allocated to the first apparatus.

The license server provided by the embodiment of the present disclosure may perform the foregoing method embodiment. An implementation principle and a technical effect thereof are similar to those of the method embodiment, and are not further described herein.

The processor 31 may be further configured to determine whether a value of the resources already used in the license resources of each non-statistical type in the license is greater than or equal to a corresponding alarm threshold. Each non-statistical license resource corresponds to an alarm threshold, and the license resources of each non-statistical type correspond to a preset peak condition. If the processor 31 determines that a value of resources already used in license resources of a third non-statistical type in the license is greater than or equal to an alarm threshold corresponding to the license resources of the third non-statistical type, the processor 31 determines whether the value of the resources already used in the license resources of the third non-statistical type exceeds a preset peak condition corresponding to the license resources of the third non-statistical type, where the license resources of the third non-statistical type are license resources of any non-statistical type in the license. If yes, the processor 31 defines a call restriction policy, and sends the call restriction policy to the first apparatus using the transmitter 32, so that the first apparatus adjusts, according to the call restriction policy, license resources of the third non-statistical type that are used by the first apparatus. If not, the processor 31 reports alarm information to the management apparatus, so that the management apparatus defines a control policy and forwards the control policy to the first apparatus. The control policy is used to instruct the first apparatus to adjust license resources of the third non-statistical type that are used by the first apparatus.

The license server provided by the embodiment of the present disclosure may perform the foregoing method embodiment. An implementation principle and a technical effect thereof are similar to those of the method embodiment, and are not further described herein.

When the license includes license resources of at least one statistical type, the transmitter 32 may be further configured to send a third request message to the first apparatus and the second apparatus separately. The third request message sent to the first apparatus is used to obtain license resources of each statistical type that are actually used by the first apparatus. Third request message sent to the second apparatus is used to obtain license resources of each statistical type that are actually used by the second apparatus. The receiver 30 may be further configured to receive the license resources of each statistical type that are actually used by the first apparatus and sent by the first apparatus, and the license resources of each statistical type that are actually used by the second apparatus and sent by the second apparatus.

The processor 31 may be further configured to summate the license resources of each statistical type that are actually used by the first apparatus and the license resources of each statistical type that are actually used by the second apparatus, to obtain resources already used in the license resources of each statistical type in the license, and determine whether a value of the resources already used in the license resources of each statistical type in the license is greater than or equal to a corresponding alarm threshold. The license resources of each statistical type correspond to an alarm threshold, and the license resources of each statistical type correspond to a preset peak condition. If the processor 31 determines that a value of resources already used in license resources of a first statistical type in the license is greater than or equal to an alarm threshold corresponding to the license resources of the first statistical type, the processor 31 determines whether the value of the resources already used in the license resources of the first statistical type exceeds a preset peak condition corresponding to the license resources of the first statistical type, where the license resources of the first statistical type are license resources of any statistical type in the license. If yes, the processor 31 defines a call restriction policy, and sends the call restriction policy to the first apparatus using the transmitter 32, so that the first apparatus adjusts, according to the call restriction policy, license resources of the first statistical type that are used by the first apparatus. If not, the processor 31 reports alarm information to the management apparatus, so that the management apparatus defines a control policy and forwards the control policy to the first apparatus. The control policy is used to instruct the first apparatus to adjust license resources of the first statistical type that are used by the first apparatus.

The receiver 30 may be further configured to receive a license resource cancellation request sent by the first apparatus. The license resource cancellation request carries the identity of the first apparatus. The processor 31 may be further configured to cancel, according to the identity of the first apparatus, license resources of a non-statistical type and license resources of a statistical type that are associated with the first apparatus. The transmitter may be further configured to send a license resource cancellation success response to the first apparatus.

The license server provided by the embodiment of the present disclosure may perform the foregoing method embodiment. An implementation principle and a technical effect thereof are similar to those of the method embodiment, and are not further described herein.

Figure 45:
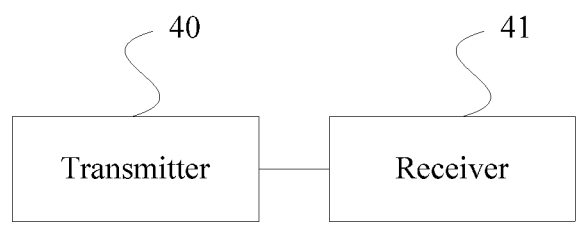
FIG. 45 is a schematic structural diagram of a fifth embodiment of a first apparatus according to an embodiment of the present disclosure.

FIG. 45 is a schematic structural diagram of a fifth embodiment of a first apparatus according to an embodiment of the present disclosure. As shown in FIG. 45, the first apparatus includes a transmitter 40 and a receiver 41. The transmitter 40 is configured to send a first registration request to a license server. The first registration request includes an identity of the first apparatus, attribute information of a license used by the first apparatus, and information of a manufacturer of the first apparatus. The manufacturer of the first apparatus is the same as a manufacturer of the license server. The receiver 41 is configured to receive a first registration response sent by the license server. The first registration response carries indication information. The indication information is used to indicate that the first apparatus shares one license with a second apparatus. The second apparatus is provided by the manufacturer of the first apparatus, and a type of the second apparatus is the same as a type of the first apparatus.

The first apparatus provided by the embodiment of the present disclosure may perform the foregoing method embodiment. An implementation principle and a technical effect thereof are similar to those of the method embodiment, and are not further described herein.

Further, an address of the license server is preset on the first apparatus, and the transmitter 40 is configured to send the first registration request to the license server according to the address of the license server.

The first registration request further carries information of a customer using the first apparatus, so that the license server performs authentication on the first apparatus according to the information of the manufacturer of the first apparatus and the information of the customer using the first apparatus.

When the license includes license resources of at least one non-statistical type, the receiver 41 may be further configured to, after receiving the first registration response sent by the license server, receive a first request message sent by the license server. The first request message is used to obtain license resources of each non-statistical type that are actually used by the first apparatus. The transmitter 40 may be further configured to send the license resources of each non-statistical type that are actually used by the first apparatus to the license server.

Optionally, when license resources of a first non-statistical type to be used by the first apparatus are insufficient, the transmitter 40 may be further configured to send a second request message to the license server, where the second request message is used to notify the license server that the license resources of the first non-statistical type to be used by the first apparatus are insufficient, so that the license server allocates license resources of the first non-statistical type to the first apparatus according to the second request message.

The first apparatus provided by the embodiment of the present disclosure may perform the foregoing method embodiment. An implementation principle and a technical effect thereof are similar to those of the method embodiment, and are not further described herein.

When the license includes license resources of at least one non-statistical type, the transmitter 40 may be further configured to, after the receiver 41 receives the first registration response sent by the license server, send a request for applying for license resources of a second non-statistical type to the license server, where the request for applying for the license resources of the second non-statistical type carries a value of the license resources of the second non-statistical type that the first apparatus applies for, so that the license server allocates license resources of the second non-statistical type to the first apparatus according to the value of the license resources of the second non-statistical type that the first apparatus applies for.

Optionally, when the license resources of the second non-statistical type that are allocated by the license server to the first apparatus are insufficient, the transmitter 40 may be further configured to send a resource change request to the license server. The resource change request includes a value of license resources of the second non-statistical type that are actually still required by the first apparatus.

Optionally, when the license resources of the second non-statistical type that are allocated by the license server to the first apparatus are insufficient, the transmitter 40 may be further configured to send a resource change request to the license server. The resource change request includes a total value of license resources of the second non-statistical type that are required by the first apparatus.

The first apparatus provided by the embodiment of the present disclosure may perform the foregoing method embodiment. An implementation principle and a technical effect thereof are similar to those of the method embodiment, and are not further described herein.

Figure 46:
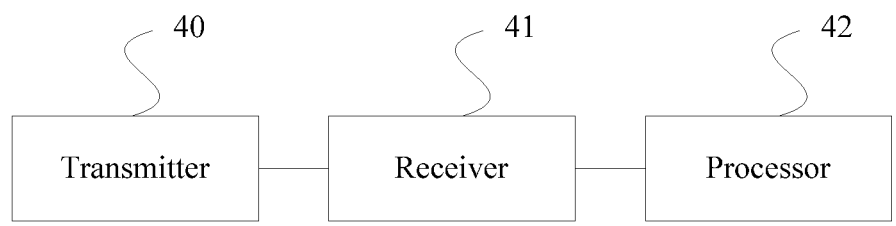
FIG. 46 is a schematic structural diagram of a sixth embodiment of a first apparatus according to an embodiment of the present disclosure.

Optionally, if a value of resources already used in license resources of a third non-statistical type in the license is greater than or equal to an alarm threshold corresponding to the license resources of the third non-statistical type, and the value of the resources already used in the license resources of the third non-statistical type exceeds a preset peak condition corresponding to the license resources of the third non-statistical type, the first apparatus may further include a processor 42. Reference may be made to a schematic structural diagram of a sixth embodiment of a first apparatus shown in FIG. 46.

The receiver 41 may be further configured to receive a call restriction policy sent by the license server. The processor 42 is configured to adjust, according to the call restriction policy, license resources of the third non-statistical type that are used by the first apparatus.

Optionally, if a value of resources already used in license resources of a third non-statistical type in the license is greater than or equal to an alarm threshold corresponding to the license resources of the third non-statistical type, and the value of the resources already used in the license resources of the third non-statistical type does not exceed a preset peak condition corresponding to the license resources of the third non-statistical type, the receiver 41 may be further configured to receive a control policy sent by a management apparatus. The processor 42 may be further configured to adjust, according to the control policy, license resources of the third non-statistical type that are used by the first apparatus.

The first apparatus provided by the embodiment of the present disclosure may perform the foregoing method embodiment. An implementation principle and a technical effect thereof are similar to those of the method embodiment, and are not further described herein.

Optionally, when the license includes license resources of at least one statistical type, the receiver 41 may be further configured to, after receiving the first registration response sent by the license server, receive a third request message sent by the license server. The third request message is used to obtain license resources of each statistical type that are actually used by the first apparatus. The transmitter 40 may be further configured to send the license resources of each statistical type that are actually used by the first apparatus to the license server. If a value of resources already used in license resources of a first statistical type in the license is greater than or equal to an alarm threshold corresponding to the license resources of the first statistical type, and the value of the resources already used in the license resources of the first statistical type exceeds a preset peak condition corresponding to the license resources of the first statistical type, the receiver 41 receives a call restriction policy sent by the license server, and the processor 42 adjusts, according to the call restriction policy, license resources of the first statistical type that are used by the first apparatus. If a value of resources already used in license resources of a first statistical type in the license is greater than or equal to an alarm threshold corresponding to the license resources of the first statistical type, and the value of the resources already used in the license resources of the first statistical type does not exceed a preset peak condition corresponding to the license resources of the first statistical type, the receiver 41 receives a control policy sent by a management apparatus, and the processor 42 adjusts, according to the control policy, license resources of the first statistical type that are used by the first apparatus.

The transmitter 40 may be further configured to send a license resource cancellation request to the license server. The license resource cancellation request carries the identity of the first apparatus. The receiver 41 may be further configured to receive a license resource cancellation success response sent by the license server.

The first apparatus provided by the embodiment of the present disclosure may perform the foregoing method embodiment. An implementation principle and a technical effect thereof are similar to those of the method embodiment, and are not further described herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

With descriptions of the foregoing embodiments, persons skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a RAM, a ROM, an electrically erasable programmable read-only memory (EEPROM), a compact disc read-only memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

It should be noted that the embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for execution processes of specific functions of each unit, reference may be made to partial descriptions in the method embodiment. The described apparatus embodiment is merely exemplary. The units described as separate parts may or may not be physically separated, and parts shown as units may or may not be physical units, may be located in one position, or may be distributed on a plurality of network units. Some or all of the modules may be selected according to actual needs to achieve the objectives of the solutions of the embodiments. Persons of ordinary skill in the art may understand and implement the embodiments of the present disclosure without creative efforts.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A license sharing method, comprising:
receiving, by a license server, a first registration request from a first apparatus, wherein the first registration request comprises an identity of the first apparatus, attribute information of a license used by the first apparatus, and information of a manufacturer of the first apparatus, wherein the manufacturer of the first apparatus is the same as a manufacturer of the license server;
obtaining, by the license server according to the attribute information of the license, license resources to be used by the first apparatus, wherein the license resources belong to one license in a license library;
establishing, by the license server, an association relationship between the identity of the first apparatus and the license, wherein the license comprises license resources including at least one non-statistical type of license resources the at least one non-statistical type of license resources including a quantity of relay stations;
sending, by the license server, a first registration response to the first apparatus, wherein the first registration response carries indication information, wherein the indication information is used to indicate that the first apparatus shares the license with a second apparatus, wherein the second apparatus is provided by the manufacturer of the first apparatus, and wherein a type of the second apparatus is the same as a type of the first apparatus;
performing, by the license server, a classified statistics operation to obtain remaining available resources in license resources of each non-statistical type in the license, wherein performing the classified statistics operation comprises:
sending, by the license server, a first request message to the first apparatus and the second apparatus separately, wherein the first request message sent to the first apparatus is used to obtain license resources of each non-statistical type that are actually used by the first apparatus, and wherein the first request message sent to the second apparatus is used to obtain license resources of each non-statistical type that are actually used by the second apparatus;
receiving, by the license server from the first apparatus, first license resources of each non-statistical type that are actually used by the first apparatus, wherein the received first license resources include a first quantity of relay stations used by the first apparatus;

receiving, by the license server from the second apparatus, second license resources of each non-statistical type that are actually used by the second apparatus, wherein the received second license resources include a second quantity of relay stations used by the second apparatus;

summing, by the license server, the license resources of each non-statistical type that are actually used by the first apparatus and the license resources of each non-statistical type that are actually used by the second apparatus in order to obtain resources already used in the license resources of each non-statistical type in the license, wherein summing the license resources includes summing the first quantity of relay stations and the second quantity of relay stations; and obtaining, by the license server, the remaining available resources in the license resources of each non-statistical type in the license according to the resources already used in the license resources of each non-statistical type in the license; and allocating, by the license server, resources from the remaining available resources in the license resources of each non-statistical type to the first apparatus.

2. The method of claim 1, wherein an address of the license server is preset on the first apparatus, and wherein receiving, by the license server, the first registration request from the first apparatus comprises receiving, by the license server, the first registration request from the first apparatus according to the address of the license server.

3. The method of claim 1, wherein the first registration request further carries information of a customer using the first apparatus, and wherein before obtaining license resources to be used by the first apparatus, the method further comprises determining, by the license server according to the information of the manufacturer of the first apparatus and the information of the customer using the first apparatus that the first apparatus is authenticated successfully.

4. The method of claim 1, wherein before receiving the first registration request sent by the first apparatus, the method further comprises:

sending, by the license server, a second registration request to a management apparatus, wherein the second registration request comprises information indicating an access mode for accessing the management apparatus by the license server and information of the manufacturer of the license server; and receiving, by the license server, a second registration success response from the management apparatus, wherein the second registration success response is received after the management apparatus successfully authenticates the access mode and the manufacturer of the license server.

5. The method of claim 4, wherein the management apparatus is an element management system (EMS) when the first apparatus is a physical network element, or wherein, when the first apparatus is a virtual network element, the management apparatus is an orchestrator and a virtualized network function manager (VNFM), or an orchestrator and a VNFM and an EMS.

6. The method of claim 1, wherein when license resources of a first non-statistical type to be used by the first apparatus are insufficient, the method further comprises:

receiving, by the license server, a second request message from the first apparatus, wherein the second request message is used to notify the license server that the license resources of the first non-statistical type to be used by the first apparatus are insufficient;

obtaining, by the license server, remaining available resources in license resources of the first non-statistical type in the license;

determining, by the license server, whether the second request message carries a value of license resources of the first non-statistical type that are currently still required by the first apparatus;

allocating, by the license server, resources from the remaining available resources in the license resources of the first non-statistical type to the first apparatus when the second request message does not carry the value of the license resources of the first non-statistical type that are currently still required by the first apparatus; or determining, by the license server, whether a value of the remaining available resources in the license resources of the first non-statistical type is greater than or equal to the value of the license resources of the first non-statistical type that are currently still required by the first apparatus when the second request message carries the value of the license resources of the first non-statistical type that are currently still required by the first apparatus; and allocating, by the license server, resources from the remaining available resources in the license resources of the first non-statistical type to the first apparatus according to the value of the license resources of the first non-statistical type that are currently still required by the first apparatus when the value of the remaining available resources in the license resources of the first non-statistical type is greater than or equal to the value of the license resources of the first non-statistical type that are currently still required by the first apparatus; or allocating, by the license server, all the remaining available resources in the license resources of the first non-statistical type to the first apparatus when the value of the remaining available resources in the license resources of the first non-statistical type is less than the value of the license resources of the first non-statistical type that are currently still required by the first apparatus.

7. The method of claim 1, wherein after sending the first registration response to the first apparatus, the method further comprises:

receiving, by the license server from the first apparatus, a request for applying for license resources of a second non-statistical type, wherein the request for applying for the license resources of the second non-statistical type carries a value of the license resources of the second non-statistical type that the first apparatus applies for; and performing, by the license server, a resource allocation operation;

wherein the resource allocation operation comprises:

determining, by the license server, whether a value of remaining available resources in license resources of the second non-statistical type in the license is greater than or equal to the value of the license resources of the second non-statistical type that the first apparatus applies for; and allocating, by the license server, license resources of the second non-statistical type to the first apparatus according to the value of the license resources of the second non-statistical type that the first apparatus applies for when the value of the remaining available resources in the license resources of the second non-statistical type in the license is greater than or equal to the value of the license resources of the second non-statistical type that the first apparatus applies for.

8. The method of claim 7, wherein after allocating license resources of the second non-statistical type to the first apparatus, the method further comprises:
receiving, by the license server, a resource change request from the first apparatus, wherein the resource change request comprises a value of license resources of the second non-statistical type that are actually still required by the first apparatus;
using, by the license server, the value of the license resources of the second non-statistical type that are actually still required by the first apparatus as a new value of license resources of the second non-statistical type that the first apparatus applies for, wherein the value is carried in the resource change request; and
performing a resource allocation operation.

9. The method of claim 7, wherein after allocating license resources of the second non-statistical type to the first apparatus, the method further comprises:
receiving, by the license server, a resource change request from the first apparatus, wherein the resource change request comprises a total value of license resources of the second non-statistical type that are required by the first apparatus, wherein the total value of the license resources of the second non-statistical type that are required by the first apparatus is greater than a value of the license resources of the second non-statistical type that are already allocated to the first apparatus;
using, by the license server, a difference between the total value of the license resources of the second non-statistical type that are required by the first apparatus and the value of the license resources of the second non-statistical type that are already allocated to the first apparatus as a new value of license resources of the second non-statistical type that the first apparatus applies for; and
performing a resource allocation operation.

10. The method of claim 7, wherein after allocating license resources of the second non-statistical type to the first apparatus, the method further comprises:
receiving, by the license server, a resource change request from the first apparatus, wherein the resource change request comprises a total value of license resources of the second non-statistical type that are required by the first apparatus, wherein the total value of the license resources of the second non-statistical type that are required by the first apparatus is less than a value of the license resources of the second non-statistical type that are already allocated to the first apparatus;
subtracting, by the license server, the value of the license resources of the second non-statistical type that are already allocated to the first apparatus from the total value of the license resources of the second non-statistical type that are required in order to obtain a value of license resources of the second non-statistical type that need to be reduced; and
reducing, by the license server according to the value of the license resources of the second non-statistical type that need to be reduced, the license resources of the second non-statistical type that are allocated to the first apparatus.

11. A license server, comprising:
a receiver configured to receive a first registration request from a first apparatus, wherein the first registration request comprises an identity of the first apparatus, attribute information of a license used by the first apparatus, and information of a manufacturer of the first apparatus, wherein the manufacturer of the first apparatus is the same as a manufacturer of the license server;
a processor coupled to the receiver and configured to:
obtain, according to the attribute information of the license that is received by the receiver, license resources to be used by the first apparatus, wherein the license resources belong to one license in a license library;
establish an association relationship between the identity of the first apparatus and the license according to the license resources to be used by the first apparatus that are obtained by the processor and the identity of the first apparatus received by the receiver, wherein the license comprises license resources including at least one non-statistical type of license resources, the at least one non-statistical type of license resources including a quantity of relay stations; and
a transmitter coupled to the processor and configured to send a first registration response to the first apparatus, wherein the first registration response carries indication information, wherein the indication information is used to indicate that the first apparatus shares the license with a second apparatus, wherein the second apparatus is provided by the manufacturer of the first apparatus, and wherein a type of the second apparatus is the same as a type of the first apparatus,
wherein the processor is further configured to:
perform a classified statistics operation to obtain remaining available resources in license resources of each non-statistical type in the license, wherein performing the classified statistics operation comprises:
sending a first request message to the first apparatus and the second apparatus separately, wherein the first request message sent to the first apparatus is used to obtain license resources of each non-statistical type that are actually used by the first apparatus, and wherein the first request message sent to the second apparatus is used to obtain license resources of each non-statistical type that are actually used by the second apparatus;
receiving first license resources of each non-statistical type that are actually used by the first apparatus and sent by the first apparatus, wherein the received first license resources include a first quantity of relay stations used by the first apparatus;
receiving second license resources of each non-statistical type that are actually used by the second apparatus and sent by the second apparatus, wherein the received second license resources include a second quantity of relay stations used by the second apparatus;
summing the license resources of each non-statistical type that are actually used by the first apparatus and the license resources of each non-statistical type that are actually used by the second apparatus in order to obtain resources already used in the license resources of each non-statistical type in the license, wherein summing the license resources includes summing the first quantity of relay stations and the second quantity of relay stations; and obtaining the remaining available resources in the license resources of each non-statistical type in the license according to the resources already used in the license resources of each non-statistical type in the license; and allocate resources from the remaining available resources in the license resources of each non-statistical type to the first apparatus.

12. The license server of claim 11, wherein an address of the license server is preset on the first apparatus, and wherein the receiver is further configured to receive the first registration request from the first apparatus according to the address of the license server.

13. The license server of claim 12, wherein the first registration request further carries information of a customer using the first apparatus, and wherein before obtaining the license resources to be used by the first apparatus the processor is configured to determine, according to the information of the manufacturer of the first apparatus and the information of the customer using the first apparatus that are received by the receiver, that the first apparatus is authenticated successfully.

14. The license server of claim 12, wherein the transmitter is further configured to send a second registration request to a management apparatus before the receiver receives the first registration request from the first apparatus, wherein the second registration request comprises information indicating an access mode for accessing the management apparatus by the license server and information of the manufacturer of the license server, and wherein the receiver is further configured to receive a second registration success response sent by the management apparatus, wherein the second registration success response is sent after the management apparatus authenticates the access mode and the manufacturer of the license server successfully.

15. The license server of claim 14, wherein the management apparatus is an element management system (EMS) when the first apparatus is a physical network element, and wherein the management apparatus is an orchestrator and a virtualized network function manager (VNFM), or an orchestrator and a VNFM and an EMS when the first apparatus is a virtual network element.

16. A system, comprising:
a first apparatus comprising a first transmitter and a first receiver coupled to the first transmitter; and
a license server comprising a second transmitter, a second receiver, and a processor coupled to the second transmitter and the second receiver,
wherein the first transmitter is configured to send a first registration request to the license server, wherein the first registration request comprises an identity of the first apparatus, attribute information of a license used by the first apparatus, and information of a manufacturer of the first apparatus, wherein the manufacturer of the first apparatus is the same as a manufacturer of the license server, and wherein the license comprises license resources of at least one non-statistical type;
wherein the second receiver is configured to receive the first registration request from the first apparatus;
wherein the processor is configured to:
obtain, according to the attribute information of the license that is received by the second receiver, license resources to be used by the first apparatus, wherein the license resources belong to one license in a license library; and
establish an association relationship between the identity of the first apparatus and the license according to the license resources to be used by the first apparatus that are obtained by the processor and the identity of the first apparatus received by the second receiver, wherein the license comprises license resources including at least one non-statistical type of license resources, the at least one non-statistical type of license resources including a quantity of relay stations, wherein the second transmitter is configured to send a first registration response to the first apparatus, wherein the first registration response carries indication information, wherein the indication information is used to indicate that the first apparatus shares the license with a second apparatus, wherein the second apparatus is provided by the manufacturer of the first apparatus, and wherein a type of the second apparatus is the same as a type of the first apparatus, wherein the first receiver is in communication with the first transmitter and is configured to:
receive the first registration response from the license server, and
receive a first request message requesting the first apparatus to send license resources of each non-statistical type that are actually used by the first apparatus, wherein the license resources include a quantity of relay stations used by the first apparatus, wherein the first transmitter is further configured to send the license resources of each non-statistical type that are actually used by the first apparatus to the license server and wherein the processor is further configured to:
perform a classified statistics operation to obtain remaining available resources in license resources of each non-statistical type in the license, wherein performing the classified statistics operation comprises:
sending a first request message to the first apparatus and the second apparatus separately, wherein the first request message sent to the first apparatus is used to obtain license resources of each non-statistical type that are actually used by the first apparatus, and wherein the first request message sent to the second apparatus is used to obtain license resources of each non-statistical type that are actually used by the second apparatus;
receiving first license resources of each non-statistical type that are actually used by the first apparatus and sent by the first apparatus, wherein the received first license resources include a first quantity of relay stations used by the first apparatus;
receiving second license resources of each non-statistical type that are actually used by the second apparatus and sent by the second apparatus, wherein the received second license resources include a second quantity of relay stations used by the second apparatus;
summing the license resources of each non-statistical type that are actually used by the first apparatus and the license resources of each non-statistical type that are actually used by the second apparatus in order to obtain resources already used in the license resources of each non-statistical type in the license, wherein summing the license resources includes summing the first quantity of relay stations and the second quantity of relay stations; and obtaining the remaining available resources in the license resources of each non-statistical type in the license according to the resources already used in the license resources of each non-statistical type in the license; and allocate resources from the remaining available resources in the license resources of each non-statistical type to the first apparatus.

17. The system of claim 16, wherein an address of the license server is preset on the first apparatus, and wherein the first transmitter is further configured to send the first registration request to the license server according to the address of the license server.

18. The system of claim 16, wherein the first registration request further carries information of a customer using the first apparatus.

19. The system of claim 16, wherein when license resources of a first non-statistical type to be used by the first apparatus are insufficient, the transmitter is further configured to send a second request message to the license server, wherein the second request message is used to notify the license server that the license resources of the first non-statistical type to be used by the first apparatus are insufficient.

20. The system of claim 16, wherein the license comprises license resources of at least one non-statistical type, and wherein the transmitter is further configured to send a request for applying for license resources of a second non-statistical type to the license server after the receiver receives the first registration response sent by the license server, wherein the request for applying for the license resources of the second non- statistical type carries a value of the license resources of the second non-statistical type that the first apparatus applies for.

\* \* \* \* \*